(12) United States Patent
Uchida et al.

(10) Patent No.: US 12,504,680 B2
(45) Date of Patent: Dec. 23, 2025

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Tsuneo Uchida, Chiba (JP); Takuya Imaoka, Kanagawa (JP); Katsu Yamada, Osaka (JP); Satoshi Kuzuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 405 days.

(21) Appl. No.: 18/198,358

(22) Filed: May 17, 2023

(65) Prior Publication Data

US 2023/0288685 A1   Sep. 14, 2023

Related U.S. Application Data

(63) Continuation of application No. PCT/JP2021/040442, filed on Nov. 2, 2021.

(30) Foreign Application Priority Data

Nov. 20, 2020 (JP) ................... 2020-193740

(51) Int. Cl.
  *G03B 21/28* (2006.01)
  *G02B 13/16* (2006.01)
  (Continued)

(52) U.S. Cl.
  CPC ............. *G03B 21/28* (2013.01); *G02B 13/16* (2013.01); *G02B 13/18* (2013.01); *G02B 17/086* (2013.01)

(58) Field of Classification Search
  CPC ....................................... G03B 21/28
  See application file for complete search history.

(56) References Cited

U.S. PATENT DOCUMENTS 6,366,400 B1 * 4/2002 Ohzawa ............. G02B 27/0172
                                                             359/364
10,025,092 B1 * 7/2018 Lin ........................ G02B 13/16
(Continued)

FOREIGN PATENT DOCUMENTS

EP    3 605 181       2/2020
JP    2006-154364     6/2006
(Continued)

OTHER PUBLICATIONS

Extended European Search Report issued May 3, 2024 in European Patent Application No. 21894466.8.
(Continued)

*Primary Examiner* — Bao-Luan Q Le
(74) *Attorney, Agent, or Firm* — Wenderoth, Lind & Ponack, L.L.P.

(57) ABSTRACT

The optical system includes a first sub-optical system including an aperture stop and a second sub-optical system including a prism. The prism has a first transmission surface located on a reduction side, a second transmission surface located on a magnification side, and at least one reflection surface between the first transmission surface and the second transmission surface. The first sub-optical system includes a plurality of rotationally symmetric lens elements. When the axis passing through at least two centers of the rotationally symmetric lens element is defined as a reference optical axis, at least one optical surface of the prism is formed such that in a plane perpendicular to the reference optical axis, a maximum angle θmax and a minimum angle θmin in terms of an angle at which a principal ray of light rays having an image-forming relationship on a concentric circle centered
(Continued)

on an intersection of the reference optical axis and a reduction conjugate point of the rectangular region intersects a normal line of the plane at a position where the principal ray is made incident on the optical surface satisfy the following Expression (1): $45° > |\theta max| - |\theta min| > 0.014°$.

20 Claims, 36 Drawing Sheets

(51) Int. Cl.
  *G02B 13/18* (2006.01)
  *G02B 17/08* (2006.01)

(56) References Cited

U.S. PATENT DOCUMENTS

| | | | |
|---|---|---|---|
| 11,106,122 B2* | 8/2021 | Wang | G02B 13/007 |
| 2003/0137744 A1* | 7/2003 | Kuwa | G02B 13/16 |
| | | | 359/726 |
| 2006/0114576 A1 | 6/2006 | Togino | |
| 2008/0013191 A1 | 1/2008 | Togino et al. | |
| 2010/0208364 A1* | 8/2010 | Minefuji | G02B 17/0816 |
| | | | 359/731 |
| 2015/0346469 A1* | 12/2015 | Lin | G02B 13/16 |
| | | | 353/121 |
| 2016/0116830 A1* | 4/2016 | Lin | G02B 21/28 |
| | | | 353/97 |
| 2017/0332057 A1* | 11/2017 | Matsuo | G03B 21/147 |
| 2019/0056648 A1* | 2/2019 | Amano | G02B 27/0955 |
| 2019/0331999 A1* | 10/2019 | Lee | G03B 21/28 |
| 2020/0033574 A1* | 1/2020 | Morikuni | G02B 17/086 |
| 2020/0033715 A1* | 1/2020 | Morikuni | G02B 13/16 |
| 2020/0278595 A1* | 9/2020 | Yanagisawa | G03B 21/28 |
| 2020/0278600 A1* | 9/2020 | Yanagisawa | G02B 17/08 |
| 2020/0278601 A1* | 9/2020 | Yanagisawa | G02B 17/0856 |
| 2021/0033829 A1* | 2/2021 | Ishigame | G02B 17/08 |
| 2021/0232034 A1* | 7/2021 | Morikuni | G03B 21/28 |
| 2022/0066180 A1* | 3/2022 | Yanagisawa | G02B 17/0856 |
| 2022/0082805 A1* | 3/2022 | Uchida | G03B 17/17 |
| 2022/0326491 A1* | 10/2022 | Yanagisawa | G02B 9/64 |

FOREIGN PATENT DOCUMENTS

| | | |
|---|---|---|
| JP | 2006-259660 | 9/2006 |
| JP | 2006-276816 | 10/2006 |
| JP | 2006-284719 | 10/2006 |
| JP | 2006-292814 | 10/2006 |
| JP | 2007-328232 | 12/2007 |
| JP | 2019-133061 | 8/2019 |
| JP | 2020-20860 | 2/2020 |
| JP | 2020-24377 | 2/2020 |
| JP | 2020-42103 | 3/2020 |
| WO | 2019/151252 | 8/2019 |
| WO | 2020/240899 | 12/2020 |

OTHER PUBLICATIONS

International Search Report Jan. 18, 2022 in International (PCT) Application No. PCT/JP2021/040442.
English language translation of International Preliminary Report on Patentability issued May 25, 2023 in corresponding International (PCT) Patent Application No. PCT/JP2021/040442.

* cited by examiner

RELATION BETWEEN REF. LIGHT RAY Ref AND PRISM OPTICAL SURFACE

IMAGING POSITION OF REDUCTION CONJUGATION POINT FOR DETERMINING EFFECTIVE SIZE OF OPTICAL SURFACE

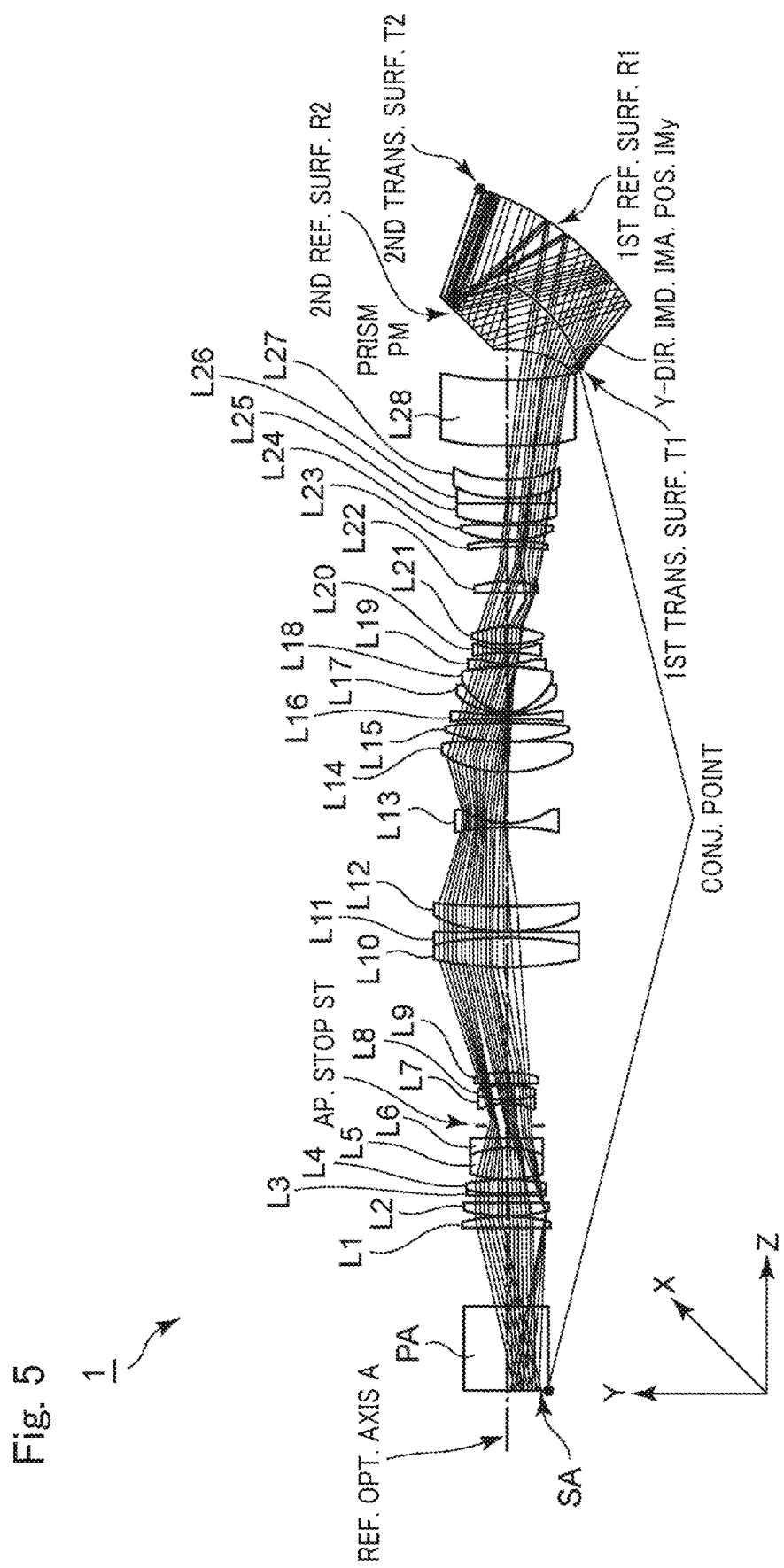

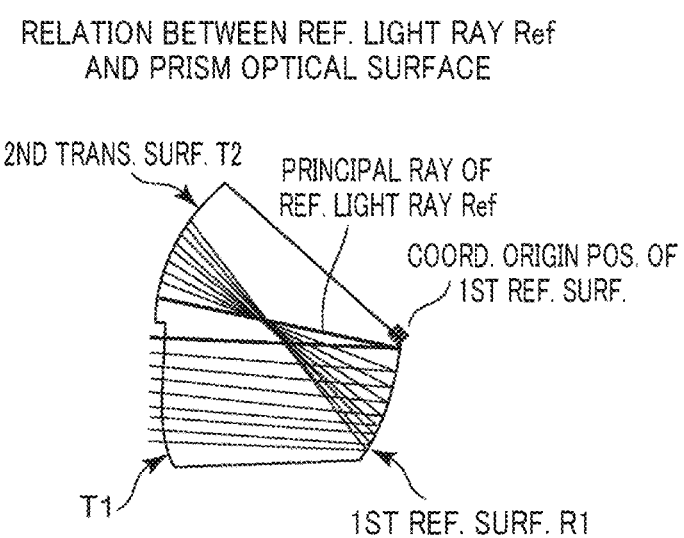
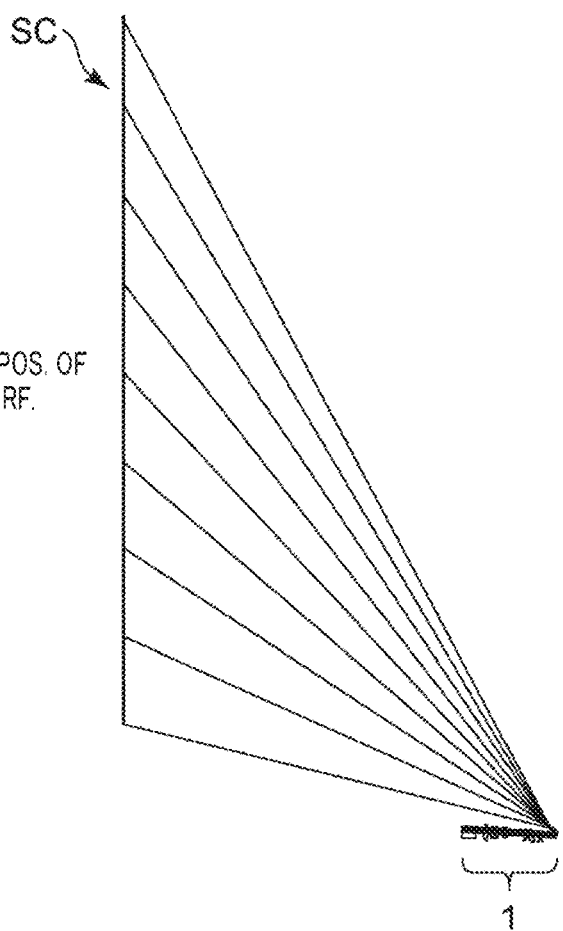

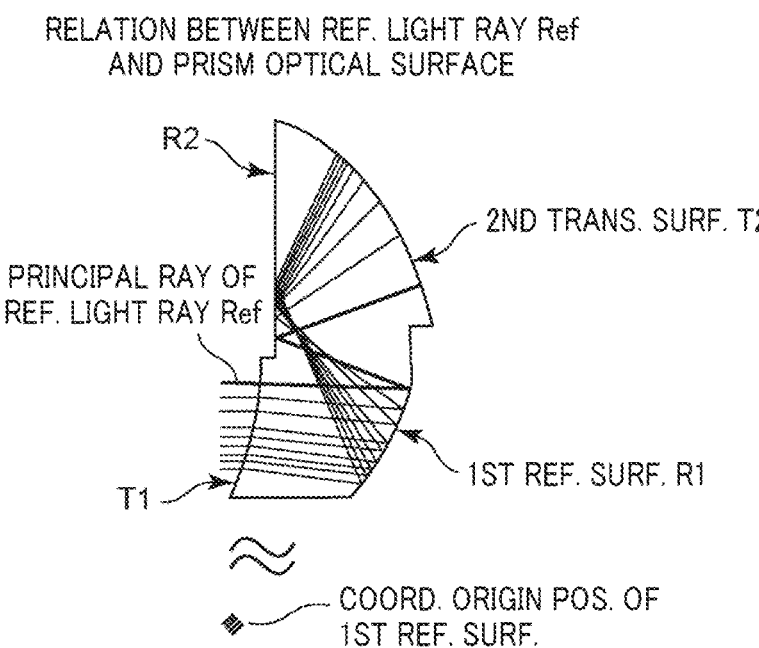
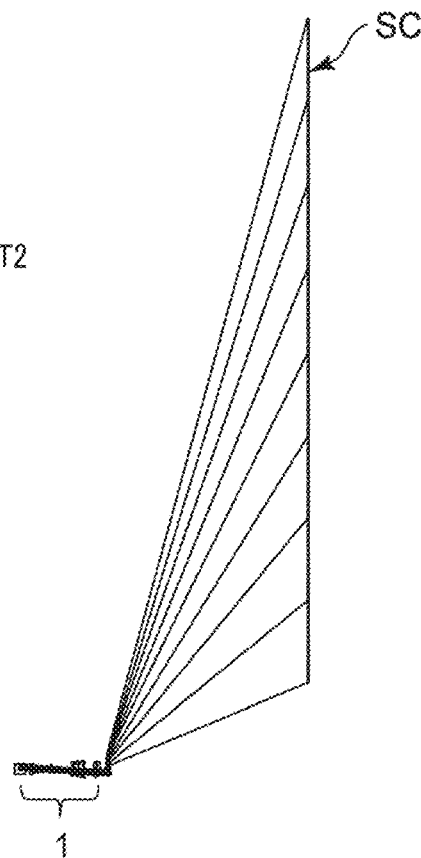
Fig. 15A
Fig. 15B

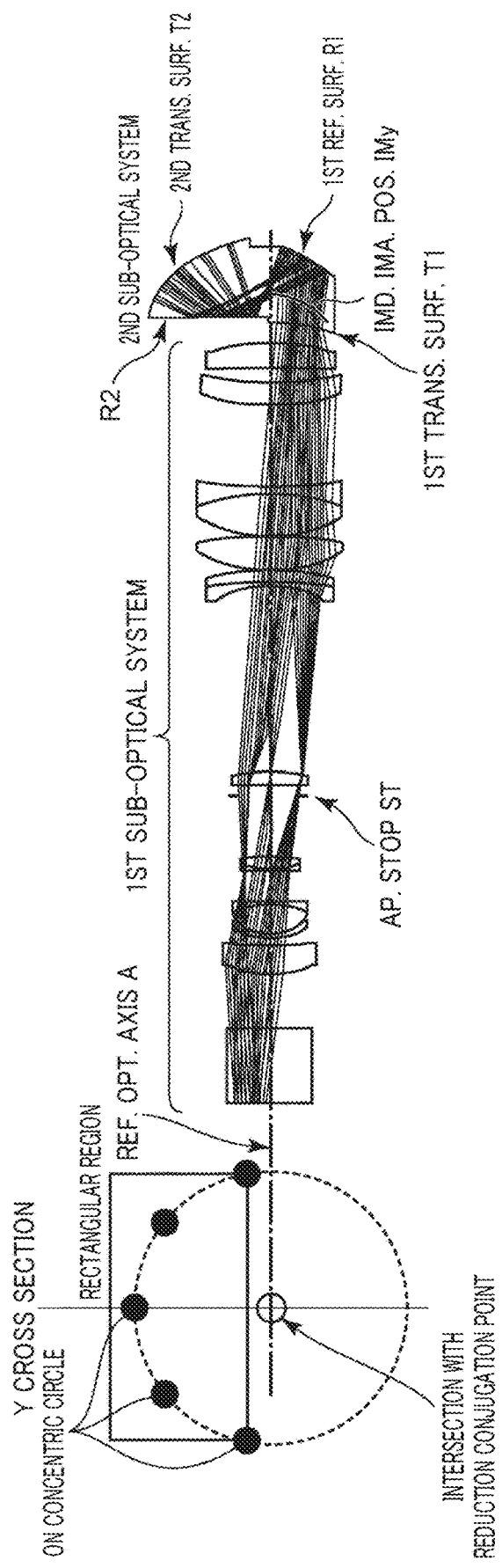

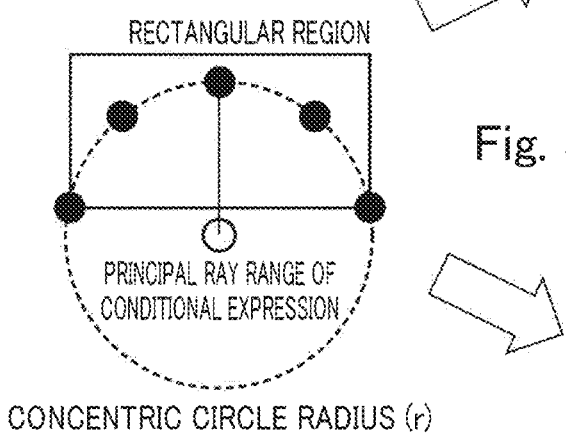
Fig. 31A
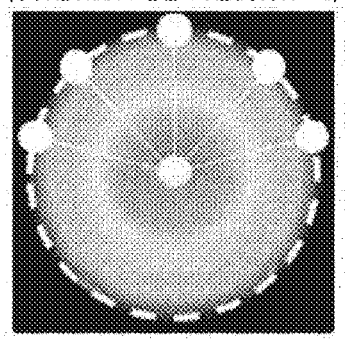
Fig. 31B ROTATIONALLY SYMMETRIC PRISM SURFACE (CONDITIONAL EXPRESSION = 0)
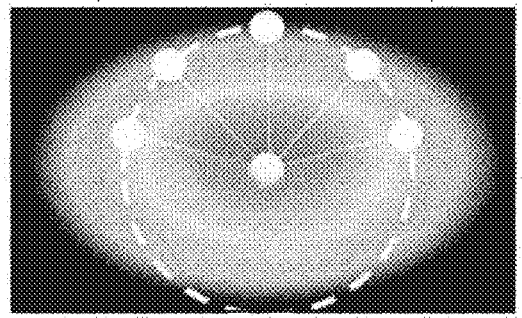
Fig. 31C FREE-FORM SURFACE PRISM SURFACE (CONDITIONAL EXPRESSION ≠ 0)
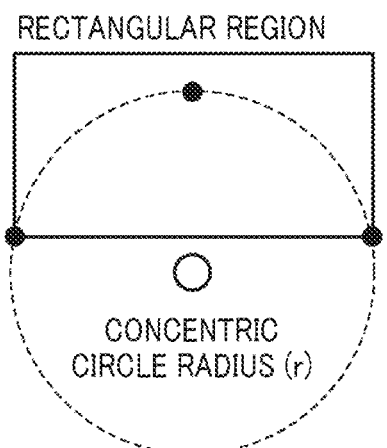
Fig. 32A
NO OPTICAL SHIFT
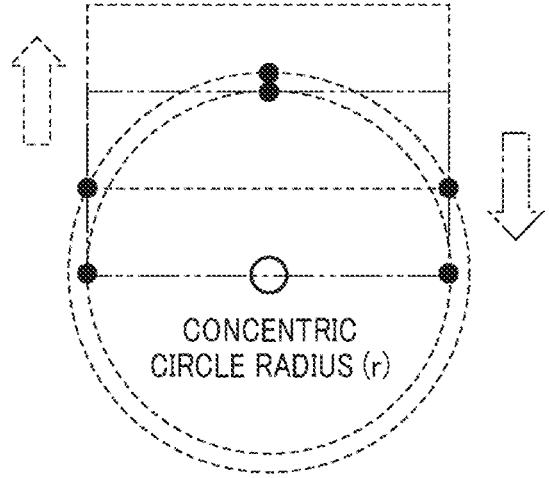
Fig. 32B
OPTICAL SHIFT Fig. 35A EXAMPLE 1
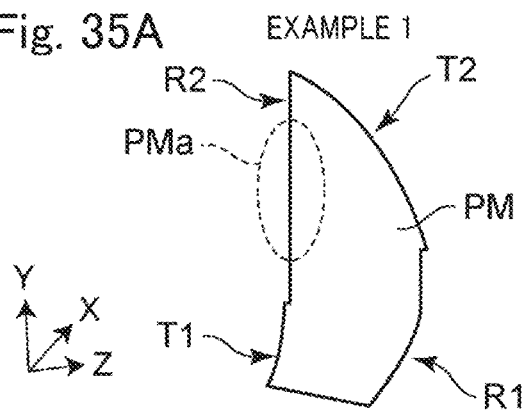
Fig. 35B EXAMPLE 2
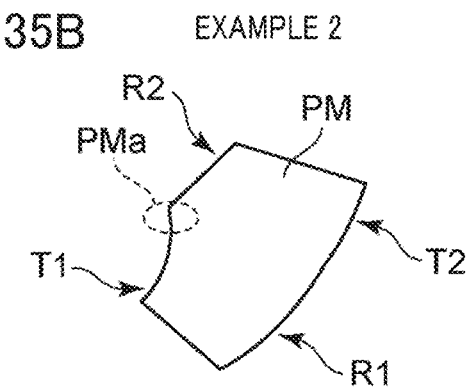
Fig. 35C EXAMPLE 3
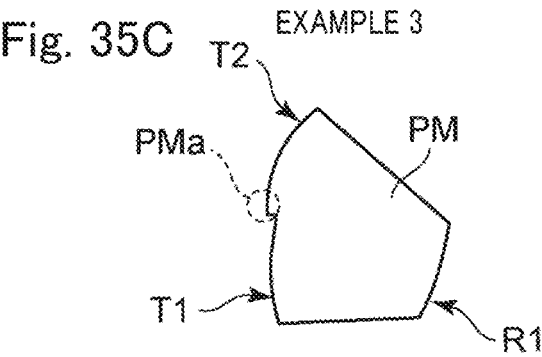
Fig. 35D EXAMPLE 4
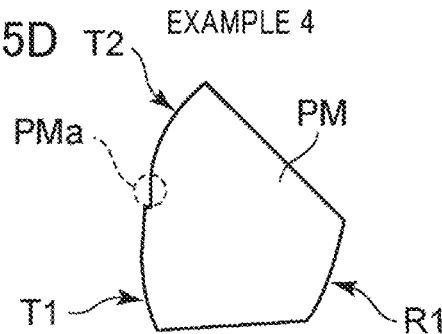
Fig. 35E EXAMPLE 5
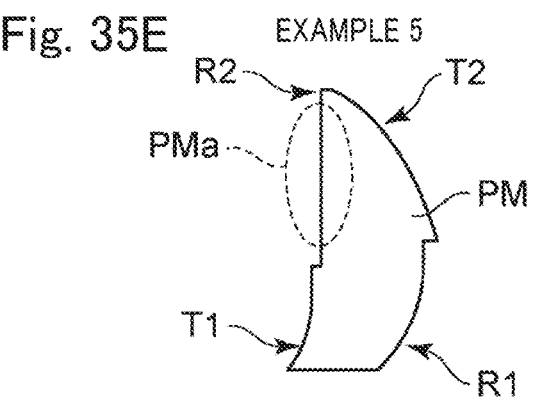
Fig. 35F EXAMPLE 6
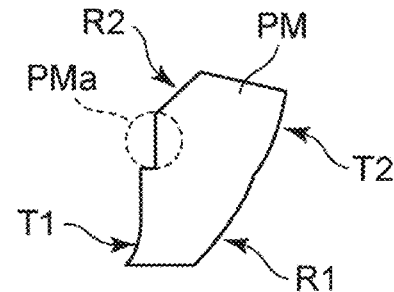
Fig. 35G EXAMPLE 7
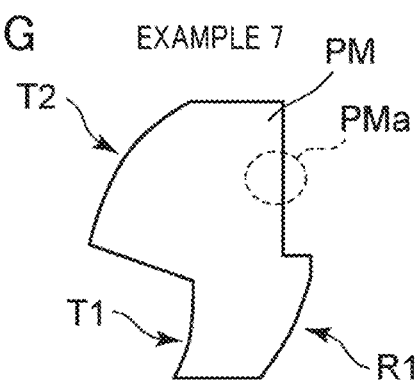
Fig. 35H EXAMPLE 8
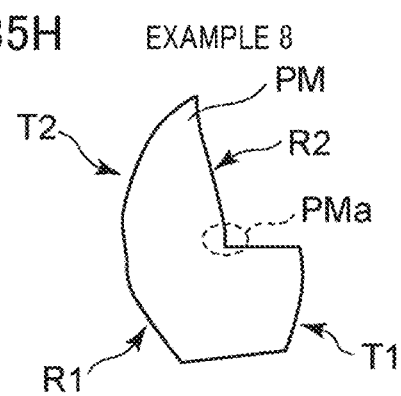

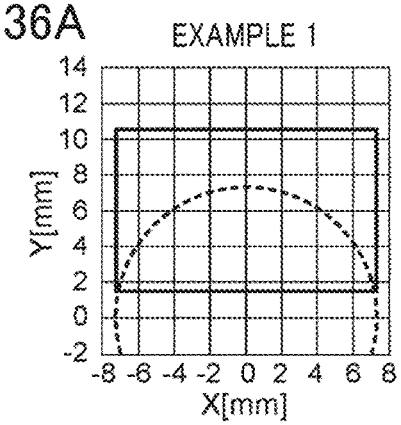
Fig. 36A EXAMPLE 1
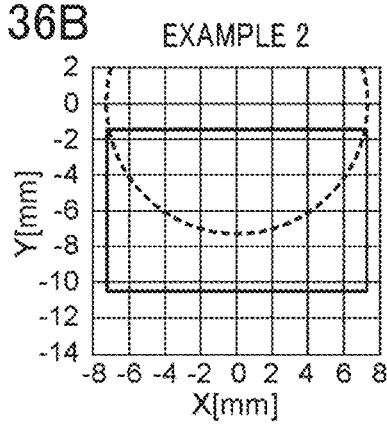
Fig. 36B EXAMPLE 2
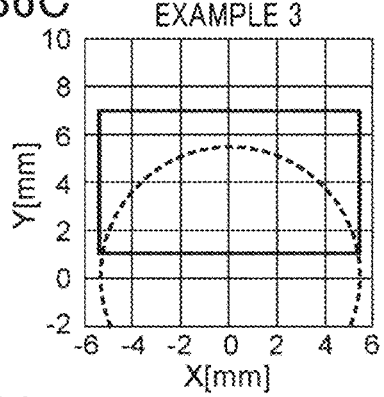
Fig. 36C EXAMPLE 3
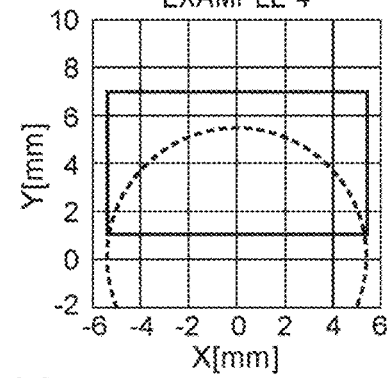
Fig. 36D EXAMPLE 4
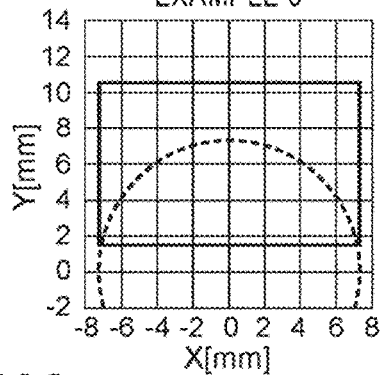
Fig. 36E EXAMPLE 5
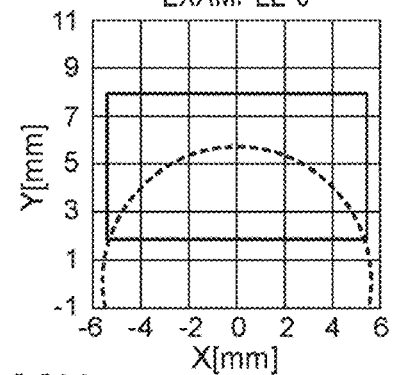
Fig. 36F EXAMPLE 6
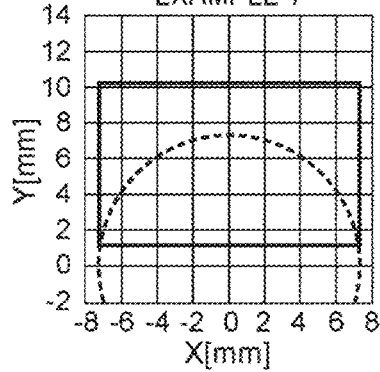
Fig. 36G EXAMPLE 7
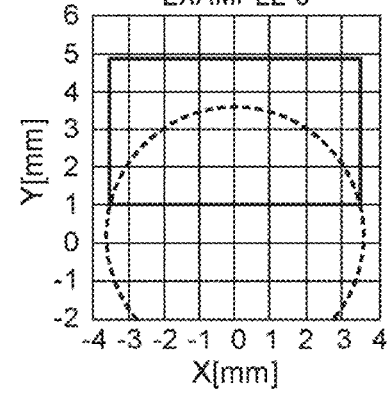
Fig. 36H EXAMPLE 8

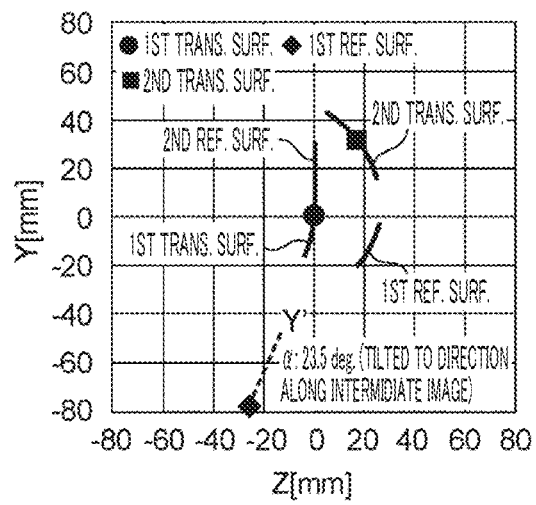
Fig. 37A EXAMPLE 1
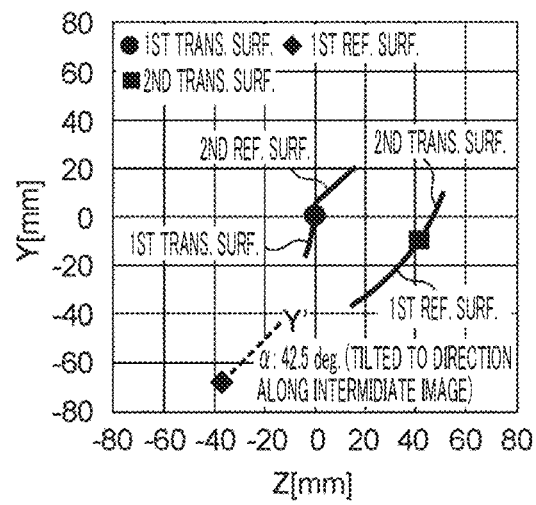
Fig. 37B EXAMPLE 2
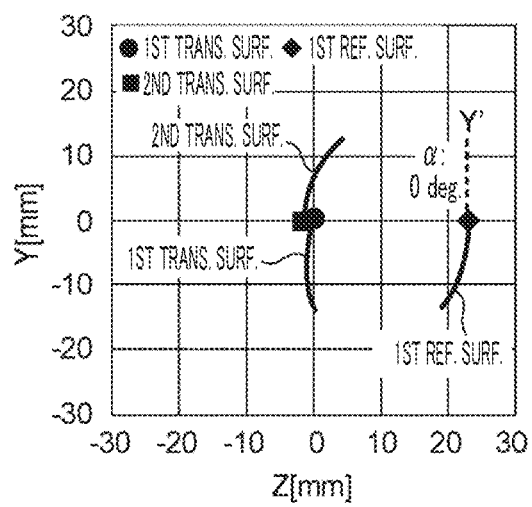
Fig. 37C EXAMPLE 3
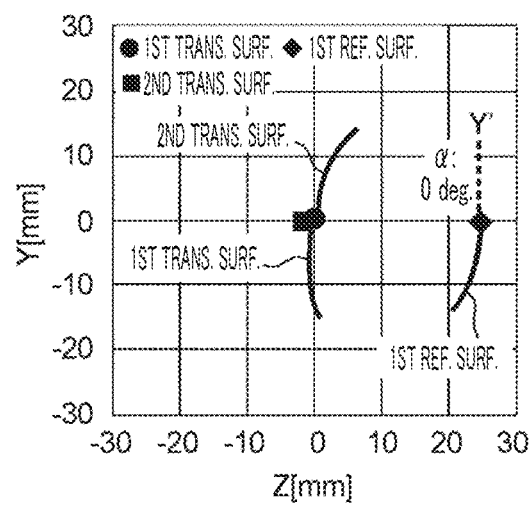
Fig. 37D EXAMPLE 4

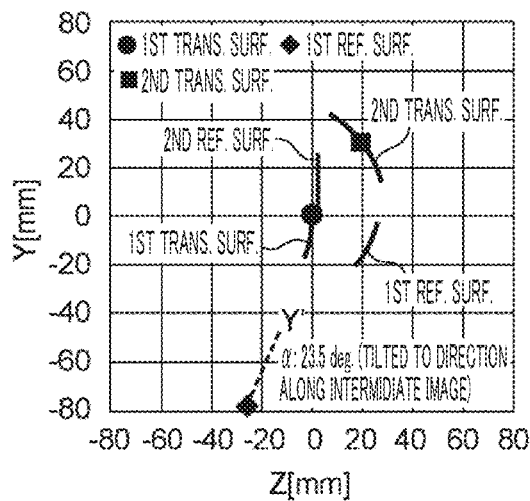
Fig. 38E EXAMPLE 5
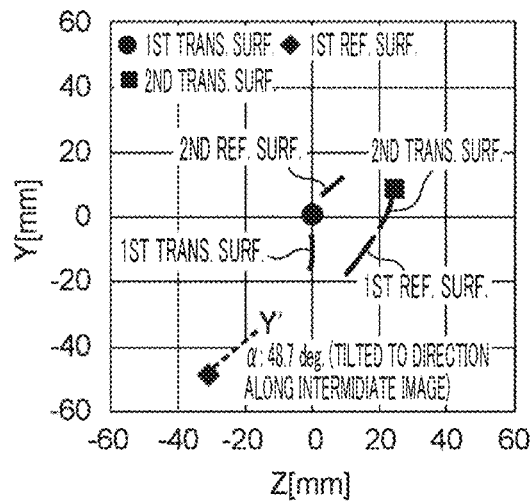
Fig. 38F EXAMPLE 6
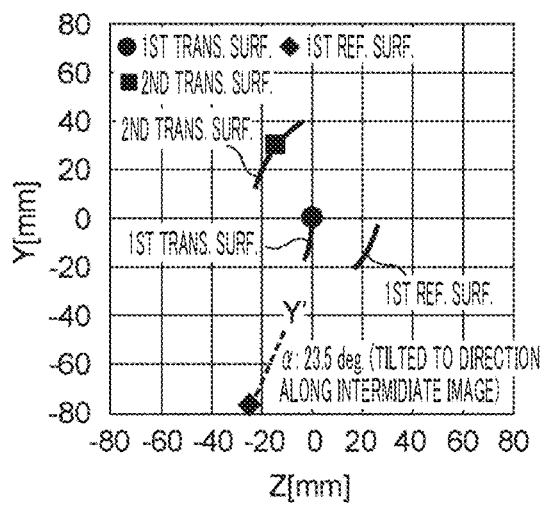
Fig. 38G EXAMPLE 7
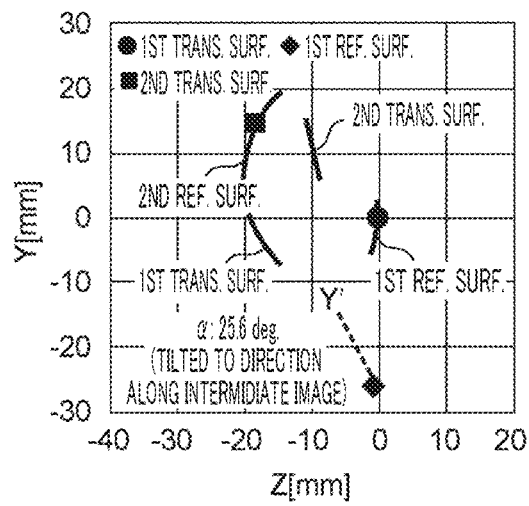
Fig. 38H EXAMPLE 8

Fig. 39A  EXAMPLE 1
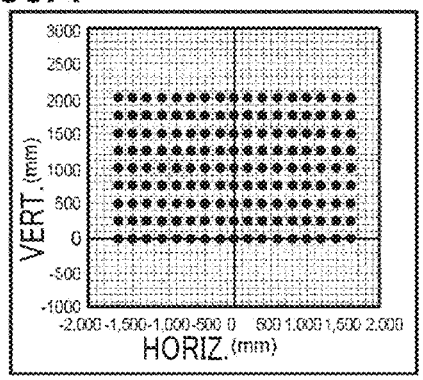
Fig. 39B  EXAMPLE 2
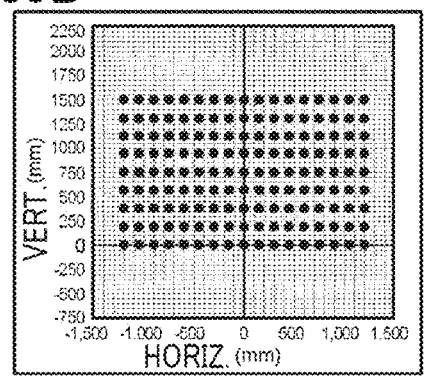
Fig. 39C  EXAMPLE 3
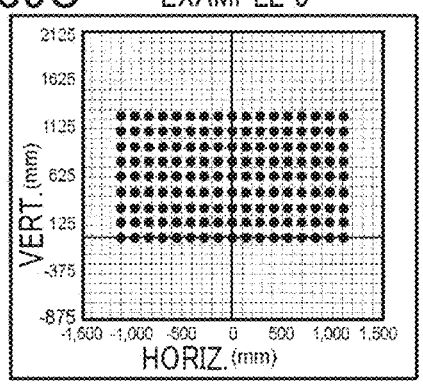
Fig. 39D  EXAMPLE 4
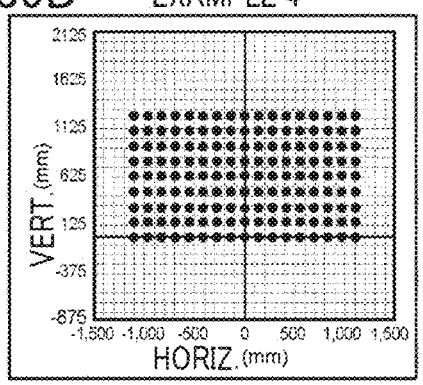
Fig. 39E  EXAMPLE 5
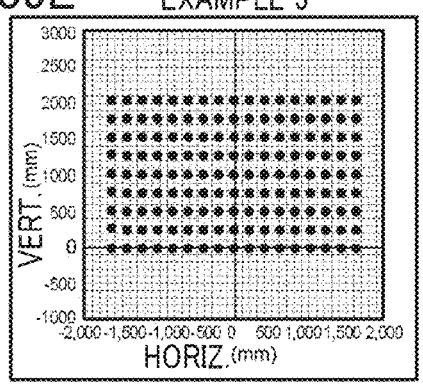
Fig. 39F  EXAMPLE 6
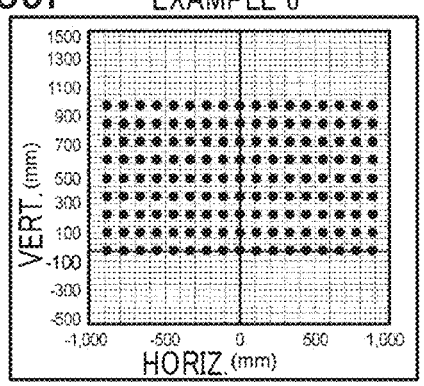
Fig. 39G  EXAMPLE 7
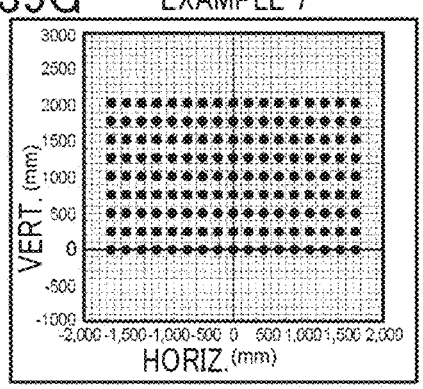
Fig. 39H  EXAMPLE 8
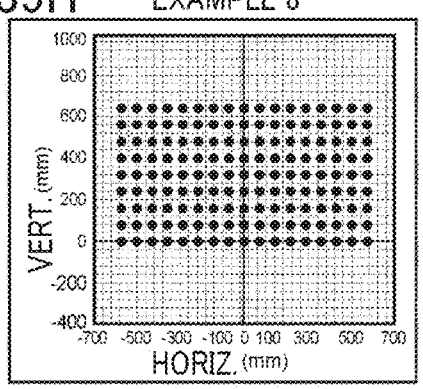

OPTICAL SYSTEM, IMAGE PROJECTION APPARATUS, AND IMAGING APPARATUS

CROSS-REFERENCE TO RELATED APPLICATIONS

This application is a continuation of International Patent Application No. PCT/JP2021/040442, filed on Nov. 2, 2021, which claims the benefit of Japanese Patent Application No. 2020-193740, filed on Nov. 20, 2020, the contents all of which are incorporated herein by reference.

TECHNICAL FIELD

The present disclosure relates to an optical system using a prism. The present disclosure also relates to an image projection apparatus and an imaging apparatus using such an optical system.

BACKGROUND ART

Patent Documents 1 to 3 disclose a projection optical system including an optical element on which a transmission surface and a reflection surface are integrated, wherein any one of the transmission and reflection surfaces may be aspherical.

PRIOR ART

[Patent Document 1] JP 2020-020860 A
[Patent Document 2] JP 2020-024377 A
[Patent Document 3] WO 2019/151252 A1

SUMMARY OF THE INVENTION

The present disclosure provides an optical system which can realize projection or imaging with a shorter focal length and a larger-sized screen using a small-sized prism. The present disclosure also provides an image projection apparatus and an imaging apparatus using such an optical system.

One aspect of the present disclosure is directed to an optical system having a reduction conjugate point on a reduction side and a magnification conjugate point on an magnification side, and internally having an intermediate imaging position that is conjugate with the reduction conjugate point and the magnification conjugate point. The reduction conjugate point has an image-forming relationship in a rectangular region having a longitudinal direction and a lateral direction. The optical system includes a first sub-optical system including an aperture stop defining a range in which a light flux can pass through the optical system, and a second sub-optical system provided closer to the magnification side than the first sub-optical system and including a prism formed of a transparent medium. The prism has a first transmission surface located on the reduction side, a second transmission surface located on the magnification side, and at least one reflection surface located on an optical path between the first transmission surface and the second transmission surface. The aperture stop is positioned between the reduction conjugate point and the intermediate imaging position. A portion or whole of an intermediate image formed at the intermediate imaging position is positioned between the first transmission surface and a first reflection surface located closest to the reduction side of the at least one reflection surface. The first reflection surface has a shape in which a concave surface is oriented in a direction in which light rays made incident on the first reflection surface are reflected. The first sub-optical system includes a plurality of rotationally symmetric lens elements. When an axis passing through at least two centers of the rotationally symmetric lens elements is defined as a reference optical axis, at least one optical surface among the first transmission surface, the second transmission surface, and the at least one reflection surface of the prism is formed such that, in a plane perpendicular to the reference optical axis, a maximum angle θmax and a minimum angle θmin in terms of an angle at which a principal ray of light rays having an image-forming relationship on a concentric circle centered on an intersection of the reference optical axis and a reduction conjugate point of the rectangular region intersects a normal line of the plane at a position where the principal ray is made incident on the optical surface satisfy the following Expression (1):

$$45° > |\theta max| - |\theta min| > 0.014° \qquad (1).$$

Further, one aspect of the present disclosure is directed to an optical system having a reduction conjugate point on a reduction side and an magnification conjugate point on an magnification side, and internally having an intermediate imaging position that is conjugate with the reduction conjugate point and the magnification conjugate point. The reduction conjugate point has an image-forming relationship in a rectangular region having a longitudinal direction and a lateral direction. The optical system includes a first sub-optical system including an aperture stop defining a range in which a light flux can pass through the optical system, and a second sub-optical system provided closer to the magnification side than the first sub-optical system and including a prism formed of a transparent medium. The prism has a first transmission surface located on the reduction side, a second transmission surface located on the magnification side, and at least one reflection surface located on an optical path between the first transmission surface and the second transmission surface. The aperture stop is positioned between the reduction conjugate point and the intermediate imaging position. A portion or whole of an intermediate image formed at the intermediate imaging position is positioned between the first transmission surface and a first reflection surface located closest to the reduction side of the at least one reflection surface. The first reflection surface has a shape in which a concave surface is oriented in a direction in which light rays made incident on the first reflection surface are reflected. The first sub-optical system includes a plurality of rotationally symmetric lens elements. When an axis passing through centers of at least two of the rotationally symmetric lens elements is defined as a reference optical axis, in a plane perpendicular to the reference optical axis, the principal ray of the light rays has an image-forming relationship on a concentric circle centered on an intersection of the reference optical axis and a reduction conjugate point of the rectangular region, and at least one optical surface among the first transmission surface, the second transmission surface, and the at least one reflection surface of the prism satisfies the following Expression (5):

$$10 > \Delta Smax/r > 0.001 \qquad (5)$$

where ΔSmax represents a maximum sag difference of a sag amount measured in a direction along the reference optical axis on the optical surface through which the principal ray passes, and r represents a radius of the concentric circle.

Furthermore, one aspect of the present disclosure is directed to an optical system having a reduction conjugate point on a reduction side and an magnification conjugate point on an magnification side, and internally has an intermediate imaging position that is conjugate with the reduction conjugate point and the magnification conjugate point. The reduction conjugate point has an image-forming relationship in a rectangular region having a longitudinal direction and a lateral direction. The optical system includes a first sub-optical system including an aperture stop defining a range in which a light flux can pass through the optical system, and a second sub-optical system provided closer to the magnification side than the first sub-optical system and including a prism formed of a transparent medium. The prism has a first transmission surface located on the reduction side, a second transmission surface located on the magnification side, and at least one reflection surface located on an optical path between the first transmission surface and the second transmission surface. The aperture stop is positioned between the reduction conjugate point and the intermediate imaging position. A portion or whole of an intermediate image formed at the intermediate imaging position is positioned between the first transmission surface and a first reflection surface located closest to the reduction side of the at least one reflection surface. The first reflection surface has a shape in which a concave surface is oriented in a direction in which light rays made incident on the first reflection surface are reflected. The first sub-optical system includes a plurality of rotationally symmetric lens elements. When an axis passing through centers of at least two of the rotationally symmetric lens elements is defined as a reference optical axis, in a plane perpendicular to the reference optical axis, the principal ray of the light ray has an image-forming relationship on a concentric circle centered on an intersection of the reference optical axis and a reduction conjugate point of the rectangular region, and a maximum optical path length difference ΔLmax of an optical path in which the principal ray passes through the inside of the prism satisfies the following Expression (9) using a radius r of the concentric circle:

$$3 > \Delta L \max / r > 0.005 \quad (9).$$

Further, an image projection apparatus according to another aspect of the present disclosure includes the above-described optical system and an image forming element that generates an image to be projected through the optical system onto a screen.

Still further, an imaging apparatus according to another aspect of the present disclosure includes the above-described optical system and an imaging element that receives an optical image formed by the optical system to convert the optical image into an electrical image signal.

In the optical system according to the present disclosure, the total length of the optical system can be shortened while the optical system disposed on the magnification side, including the reflection surface, is kept small. Furthermore, the optical performance including distortion can be excellently maintained in a wide imaging range of the magnification conjugate point. In addition, the distance between the magnification conjugate point and the optical system can be shortened. Therefore, projection or imaging with a shorter focal length and a larger-sized screen can be realized by using a small-sized prism.

BRIEF DESCRIPTION OF THE DRAWINGS

FIG. 4A illustrates a light flux distribution on the first transmission surface T1 of the prism PM according to Example 1, and FIG. 4B illustrates a light flux distribution on the first reflection surface R1, and FIG. 4C illustrates a light flux distribution on the second reflection surface R2, and FIG. 4D illustrates a light flux distribution on the second transmission surface T2.

FIG. 5 is an arrangement diagram illustrating an optical system 1 according to Example 2.

FIG. 7A illustrates a light flux distribution on the first transmission surface T1 of the prism PM according to Example 2, and FIG. 7B illustrates a light flux distribution on the first reflection surface R1, and FIG. 7C illustrates a light flux distribution on the second reflection surface R2, and FIG. 7D illustrates a light flux distribution on the second transmission surface T2.

FIG. 9A is a Y cross-sectional view illustrating an optical path through which the principal ray of the reference light ray Ref passes in the prism PM according to Example 3, and FIG. 9B is an explanatory view illustrating a usage mode of an image projection apparatus using the optical system 1 according to Example 3.

FIG. 10A illustrates a light flux distribution on the first transmission surface T1 of the prism PM according to Example 3, and FIG. 10B illustrates a light flux distribution on the first reflection surface R1, and FIG. 10C illustrates a light flux distribution on the second transmission surface T2.

FIG. 13A illustrates a light flux distribution on the first transmission surface T1 of the prism PM according to Example 4, and FIG. 13B illustrates a light flux distribution on the first reflection surface R1, and FIG. 13C illustrates a light flux distribution on the second transmission surface T2.

FIG. 15A is a Y cross-sectional view illustrating an optical path through which the principal ray of the reference light ray Ref passes in the prism PM according to Example 5, and FIG. 15B is an explanatory view illustrating a usage mode of an image projection apparatus using the optical system 1 according to Example 5.

FIG. 16A illustrates a light flux distribution on the first transmission surface T1 of the prism PM according to Example 5, and FIG. 16B illustrates a light flux distribution on the first reflection surface R1, and FIG. 16C illustrates a light flux distribution on the second reflection surface R2, and FIG. 16D illustrates a light flux distribution on the second transmission surface T2.

FIG. 19A illustrates a light flux distribution on the first transmission surface T1 of the prism PM according to Example 6, and FIG. 19B illustrates a light flux distribution on the first reflection surface R1, and FIG. 19C illustrates a light flux distribution on the second reflection surface R2, and FIG. 19D illustrates a light flux distribution on the second transmission surface T2.

FIG. 22A illustrates a light flux distribution on the first transmission surface T1 of the prism PM according to Example 7, and FIG. 22B illustrates a light flux distribution on the first reflection surface R1, and FIG. 22C illustrates a light flux distribution on the second transmission surface T2.

FIG. 25A illustrates a light flux distribution on the first transmission surface T1 of the prism PM according to Example 8, and FIG. 25B illustrates a light flux distribution on the first reflection surface R1, and FIG. 25C illustrates a light flux distribution on the second reflection surface R2, and FIG. 25D illustrates a light flux distribution on the second transmission surface T2.

FIG. 30A is an XY cross-sectional view illustrating the distribution of the principal ray of the light rays at the reduction conjugate point, and FIG. 30B is an arrangement diagram illustrating the optical system 1 according to Example 5, as an example.

FIG. 31A is an XY cross-sectional view illustrating the distribution of the principal ray of the light rays at the reduction conjugate point, and FIG. 31B is a conceptual view illustrating a state on the rotationally symmetric prism optical surface in which the principal ray of the light rays is made incident on the optical surface, and FIG. 31C is a conceptual view illustrating a state on the free-form surface prism optical surface in which the principal ray of the light rays is made incident on the optical surface.

FIG. 32A is an explanatory diagram illustrating arrangement of a concentric circle (radius r) and a rectangular region at the reduction conjugate point in a case where there is no optical shift, and FIG. 32B is an explanatory diagram illustrating arrangement of a concentric circle (radius r) and a rectangular region at the reduction conjugate point in a case where there is an optical shift.

FIGS. 35A to 35H are cross-sectional views in the Y direction illustrating various examples of the stepped structure of the prism PM according to Examples 1 to 8.

FIG. 36A to 36H are graphs showing shapes of a rectangular region at the reduction conjugate point and a concentric circle in each of Numerical Examples 1 to 8.

FIG. 37A to 37D are graphs showing cross-sectional shapes and coordinate origins of each of optical surfaces with respect to the coordinate system of the first transmission surface T1 in each of Numerical Examples 1 to 4.

FIG. 38E to 38H are graphs showing cross-sectional shapes and coordinate origins of each of optical surfaces with respect to the coordinate system of the first transmission surface T1 in each of Numerical Examples 5 to 8.

FIG. 39A to 39H are graphs showing distortion shapes at the magnification conjugate point, caused by distortion aberration of the optical system according to each of Numerical Examples 1 to 8.

DETAILED DESCRIPTION

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image SA obtained by spatially modulating incident light using an image forming element, such as liquid crystal or digital micromirror device (DMD), based on an image signal. In other words, the optical system according to the present disclosure can be used for magnifying the original image SA on the image forming element arranged on the reduction side to project the image onto the screen (not shown), which is arranged on an extension line on the magnification side. However, a projection surface is not limited to the screen. Examples of the projection surface includes walls, ceilings, floors, windows, etc. in houses, stores, or vehicles and airplanes used as means for transportation.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, an optical system according to a first embodiment of the present disclosure will be described below with reference to FIGS. 1 to 39.

Example 1

Figure 1:
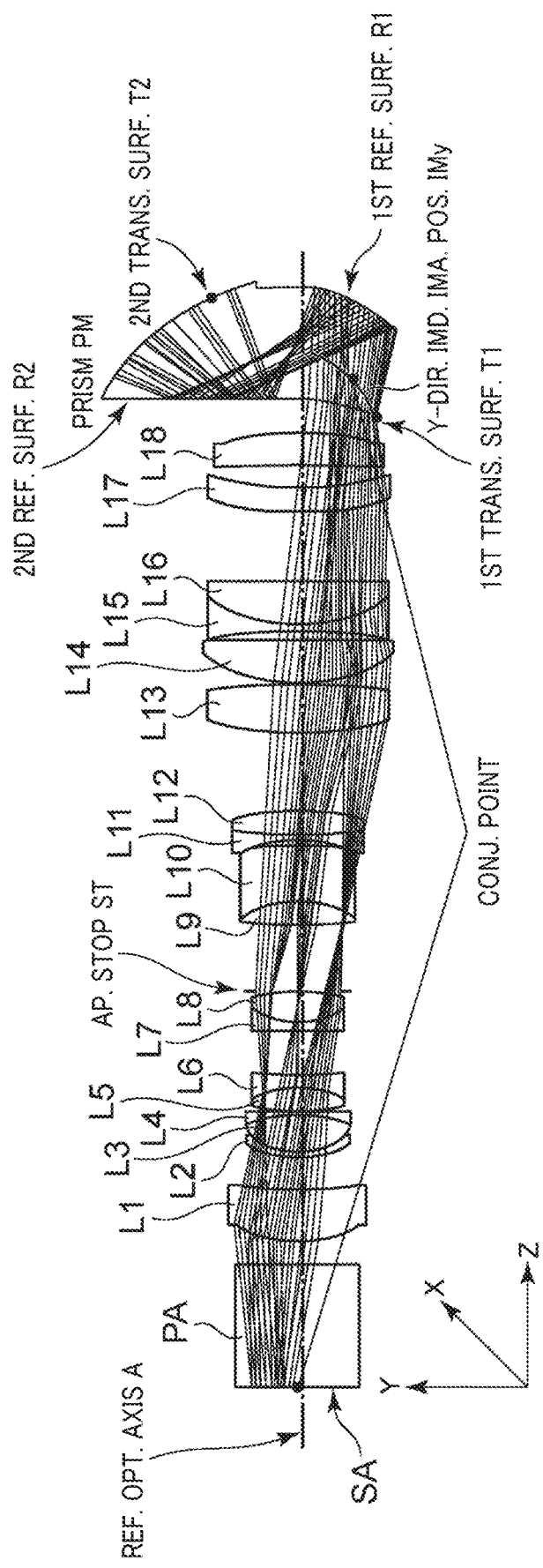
FIG. 1 is an arrangement diagram illustrating an optical system 1 according to Example 1.

FIG. 1 is an arrangement diagram illustrating an optical system 1 according to Example 1. The optical system 1 includes a first sub-optical system including an aperture stop ST and a second sub-optical system including a prism PM. In FIG. 1, a reduction conjugate point, which is an imaging position on the reduction side, is located on the lower side, and a magnification conjugate point, which is an imaging position on the magnification side, is located on the upper side. The second sub-optical system is provided closer to the magnification side than the first sub-optical system.

Figure 28:
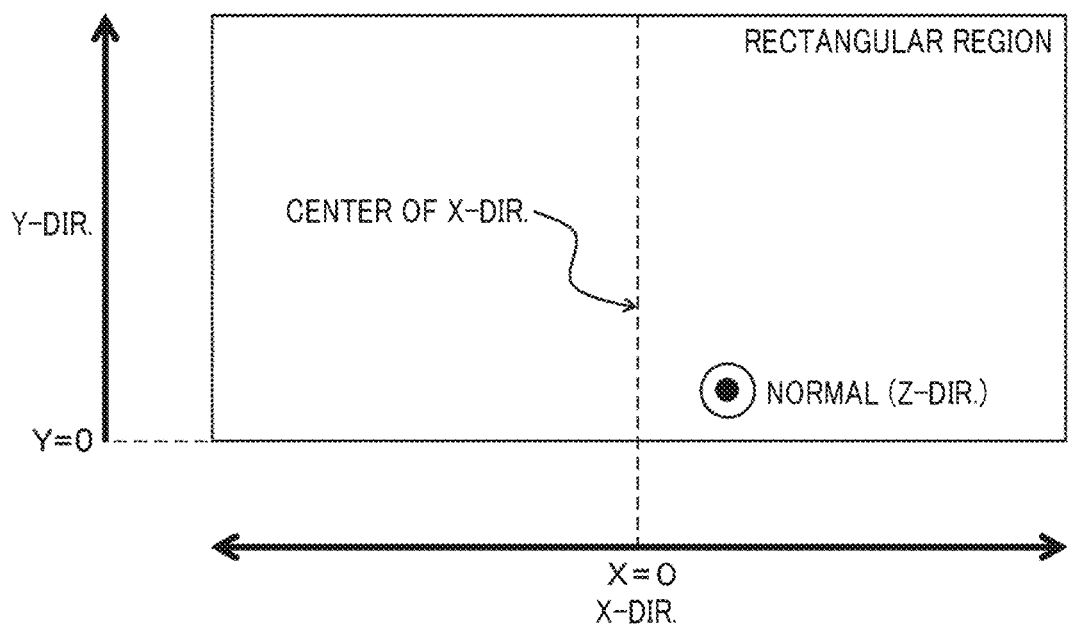
FIG. 28 is an explanatory diagram illustrating an example of an image region at the reduction conjugate point.

FIG. 28 is an explanatory diagram illustrating an example of an image region at the reduction conjugate point. The image region at the reduction conjugate point is defined as a rectangular region having a longitudinal direction (X-direction) and a lateral direction (Y-direction), and has an image-forming relationship that is optically conjugate with the image region at the magnification conjugate point. A light ray travels along a normal direction (Z-direction) of this rectangular region. This rectangular region has an aspect ratio such as 3:2, 4:3, 16:9, 16:10, 256:135, etc., corresponding to an image display region of an image forming element in the case of an image projection apparatus, or to an imaging region of an imaging element in the case of an imaging apparatus.

In addition, an intermediate imaging position that is conjugate with both of the reduction conjugate point and the magnification conjugate point is located inside the optical system 1. This intermediate imaging position is illustrated as a Y-direction intermediate image IMy in FIG. 1, but an X-direction intermediate image IMx is not illustrated.

The first sub-optical system includes an optical element PA and lens elements L1 to L18 in order from the reduction side to the magnification side. The optical element PA represents different optical elements, such as a total internal reflection (TIR) prism, a prism for color separation and color synthesis, an optical filter, a flat-parallel glass plate, a crystal low-pass filter, or an infrared cut filter. The end surface on the reduction side of the optical element PA is provided with the reduction conjugate point, and an original image SA is located thereon (surface 1). Regarding the surface number, see numerical examples described later.

The optical element PA has two parallel and flat transmission surfaces (surfaces 2, 3). The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are bonded to each other to constitute a compound lens. Lens element L5 has a biconvex shape (surfaces 10, 11). The lens element L6 has a biconcave shape (surfaces 11, 12). The lens elements L5 and L6 are bonded to each other to constitute a compound lens. The lens element L7 has a negative meniscus shape with the convex surfaces facing the reduction side (surfaces 13, 14). Lens element L8 has a biconvex shape (surfaces 14, 15). The lens elements L7 and L8 are bonded to each other to constitute a compound lens.

The aperture stop ST defines a range in which a light flux can pass through the optical system 1, and is positioned between the reduction conjugate point and the above-described intermediate imaging position. As an example, the aperture stop ST is located between the lens element L8 and the lens element L9 (surface 16).

The lens element L9 has a biconvex shape (surfaces 17, 18). The lens element L10 has a negative meniscus shape with the convex surfaces facing the magnification side (surfaces 18, 19). The lens elements L9 and L10 are bonded to each other to constitute a compound lens. The lens element L11 has a biconcave shape (surfaces 20, 21). The lens element L12 has a biconvex shape (surfaces 21, 22). The lens elements L11 and L12 are bonded to each other to constitute a compound lens. The lens element L13 has a biconvex shape (surfaces 23, 24). The lens element L14 has a positive meniscus shape with the convex surfaces facing the reduction side (surfaces 25, 26). The lens element L15 has a biconcave shape (surfaces 27, 28). The lens element L16 has a biconvex shape (surfaces 28, 29). The lens elements L15 and L16 are bonded to each other to constitute a compound lens. The lens element L17 has a positive meniscus shape with the convex surfaces facing the reduction side (surfaces 30, 31). The lens element L18 has a positive meniscus shape with the convex surfaces facing the magnification side (surfaces 32, 33). Since the first sub-optical system has the above-described lens element configuration, the first sub-optical system can suppress spread of light rays between the first sub-optical system and the second sub-optical system while maintaining good optical performance.

The second sub-optical system includes a prism PM formed of a transparent medium, for example, glass, synthetic resin, or the like. The prism PM has a first transmission surface T1 located on the reduction side, a second transmission surface T2 located on the magnification side, and a first reflection surface R1 and a second reflection surface R2 located on the optical path between the first transmission surface T1 and the second transmission surface T2. The first transmission surface T1 has a free-form surface shape with the concave surface facing the reduction side (surface 34). The first reflection surface R1 has a free-form surface shape with the concave surface facing a direction into which a light ray made incident on the first reflection surface R1 is reflected (surface 35). The second reflection surface R2 has a planar shape (surface 36). The second transmission surface T2 has a free-form surface shape with the convex surface facing the magnification side (surface 37).

In the prism PM, since the first transmission surface T1, the second transmission surface T2, the first reflection surface R1, and the second reflection surface R2 are integrated, assembly adjustment between optical components can be reduced, and the cost can be suppressed. In addition, the optical surfaces having the power of the prism PM, for example, the first transmission surface T1, the second transmission surface T2, and the first reflection surface R1 do not have rotationally symmetric axes, that is, are formed as free-form surfaces having different curvatures on the X-axis and the Y-axis. By using free-form surfaces capable of defining different curvatures on the X-axis and the Y-axis for the optical surfaces of the prism, the degree of freedom for satisfactorily correcting distortion is increased, so that the effect of shortening the entire length of the first sub-optical system can also be expected. In addition, the weight of the head portion of the optical system 1 can be reduced, the center of gravity of the optical system can be arranged in a well-balanced manner, and the configuration of the coupling unit that holds the lens barrel of the optical system in the housing of the optical system can be simplified.

Figure 29A:
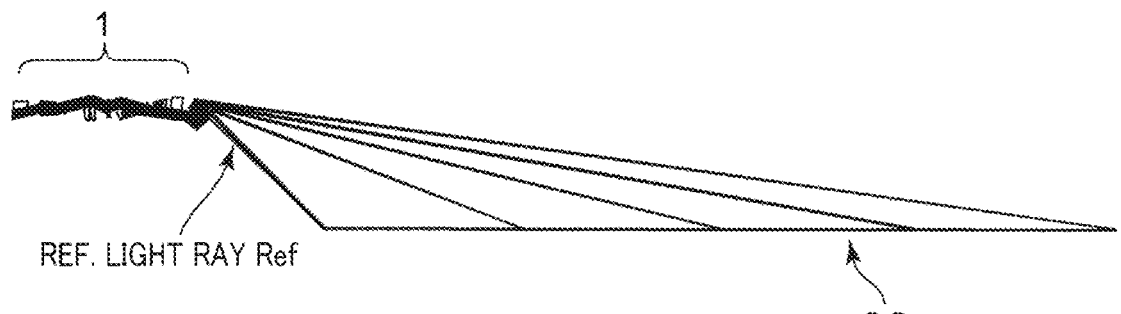
FIG. 29A is a side view for explaining the definition of a reference light ray Ref.
Figure 29B:
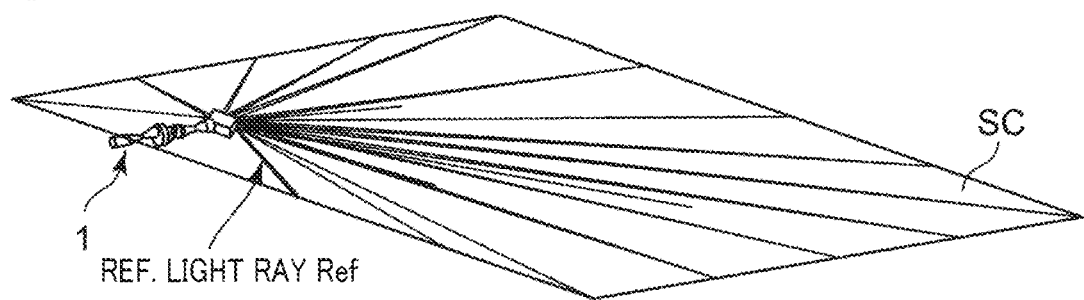
FIG. 29B is a perspective view thereof.

FIG. 29A is a side view for explaining the definition of a reference light ray Ref, and FIG. 29B is a perspective view thereof. The reference light ray Ref is defined as a light ray that forms an image at a position closest to the optical system in the magnification conjugate point on the screen SC.

Figure 2A:
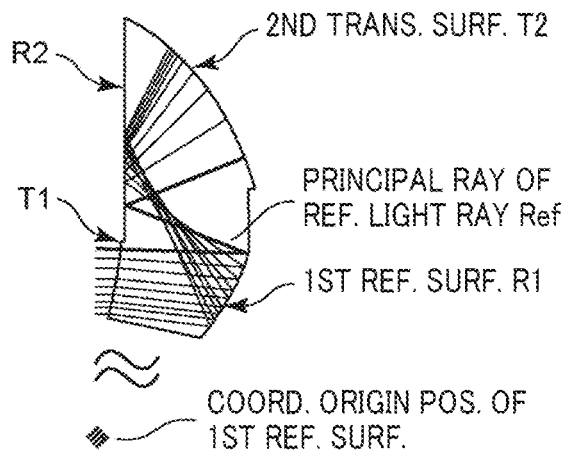
FIG. 2A is a Y cross-sectional view illustrating an optical path through which the principal ray of the reference light ray Ref passes in the prism PM according to Example 1.
Figure 2B:
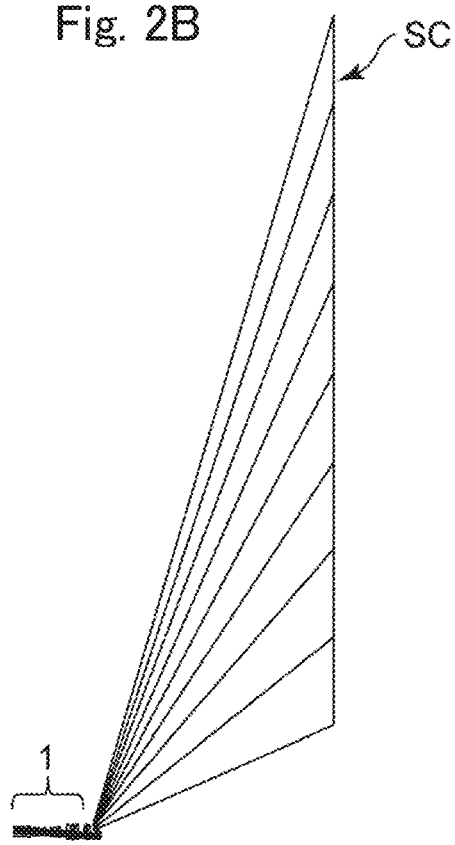
FIG. 2B is an explanatory view illustrating a usage mode of an image projection apparatus using the optical system 1 according to Example 1.

FIG. 2A is a Y cross-sectional view illustrating an optical path through which the principal ray of the reference light ray Ref passes in the prism PM according to Example 1. FIG. 2B is an explanatory view illustrating a usage mode of an image projection apparatus using the optical system 1 according to Example 1. The image projection apparatus including the optical system 1 is horizontally disposed on a support table, such as a table, or on a floor. The screen SC is installed vertically upward at a position away from the support table by a relatively short horizontal distance, e.g. 0.7 m. The light generated from the optical system 1 is projected forward and obliquely upward to realize projection with a shorter focal length and a larger-sized screen.

Figure 3:
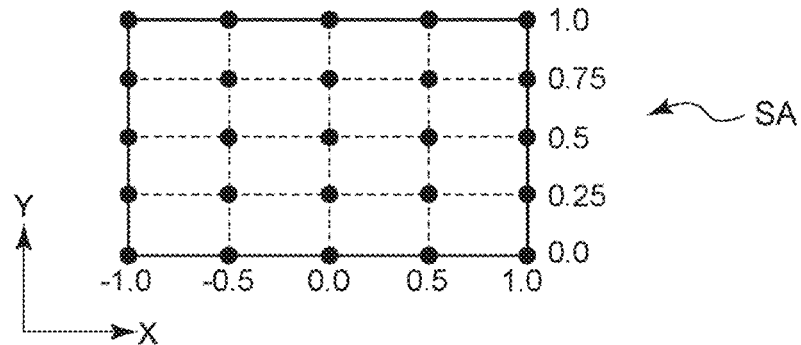
FIG. 3 is an explanatory diagram illustrating imaging positions on a reduction conjugate point for determining the effective size of an optical surface.

FIG. 3 is an explanatory diagram illustrating imaging positions on a reduction conjugate point for determining the effective size of an optical surface. An original image SA located at the reduction conjugate point has a rectangular area. As an example, relative X coordinates of the imaging positions are set at an interval 0.5 in a range of −1.0 to 1.0, relative Y coordinates are set at an interval 0.25 in a range of 0.0 to 1.0, and a total of 25 coordinates are arranged.

Figure 4A:
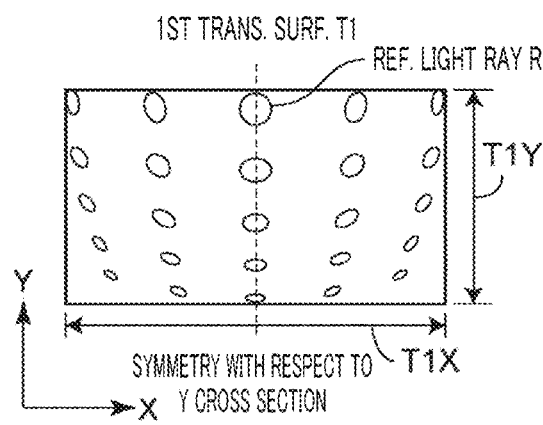
FIGS. 4A to 4D illustrate passing positions and shapes of light fluxes corresponding to respective imaging positions illustrated in FIG. 3.
Figure 4B:
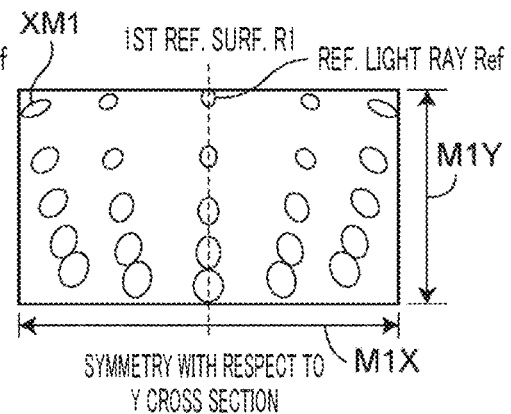
Figure 4C:
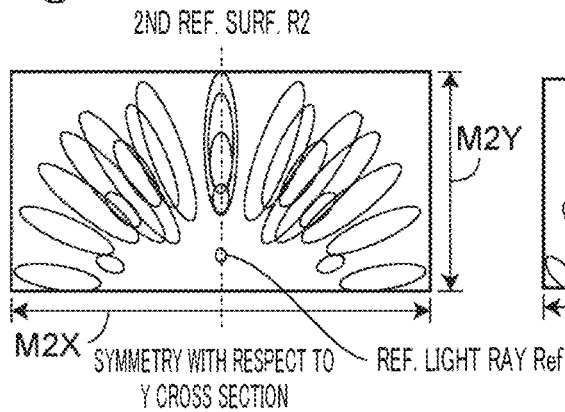
Figure 4D:
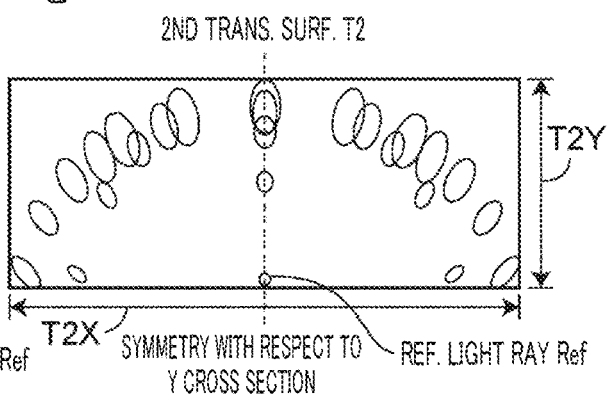

FIGS. 4A to 4D illustrate passing positions and shapes of light fluxes corresponding to respective imaging positions illustrated in FIG. 3. FIG. 4A illustrates a light flux distribution on the first transmission surface T1 of the prism PM according to Example 1. FIG. 4B illustrates a light flux distribution on the first reflection surface R1. FIG. 4C illustrates a light flux distribution on the second reflection surface R2. FIG. 4D illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, M2X defines an X effective range of the second reflection surface R2 when measured parallel to the X cross-section, M2Y defines a Y effective range of the second reflection surface R2 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 2

FIG. 5 is an arrangement diagram illustrating an optical system 1 according to Example 2. The optical system 1 has a configuration similar to that of Example 1, but also has an intermediate image inside the first sub-optical system, which means the optical system 1 has two intermediate imaging positions. The first sub-optical system includes lens elements L1 to L28, and the second sub-optical system including prism PM projects in an oblique direction in the case of the image projection apparatus. Hereinafter, the description overlapping with Example 1 will be omitted.

The lens element L1 has a positive meniscus shape with the convex surfaces facing the magnification side (surfaces 4, 5). The lens element L2 has a biconvex shape (surfaces 6, 7). The lens element L3 has a negative meniscus shape with the convex surfaces facing the reduction side (surfaces 8, 9). The lens element L4 has a biconvex shape (surfaces 10, 11). The lens element L5 has a biconvex shape (surfaces 12, 13). The lens element L6 has a biconcave shape (surfaces 13, 14). The lens elements L5 and L6 are bonded to each other to constitute a compound lens. The aperture stop ST is located between the lens element L6 and the lens element L7 (surface 15).

The lens element L7 has a biconcave shape (surfaces 16, 17). The lens element L8 has a biconvex shape (surfaces 17, 18). The lens elements L7 and L8 are bonded to each other to constitute a compound lens. The lens element L9 has a positive meniscus shape with the convex surfaces facing the magnification side (surfaces 19, 20). The lens element L10 has a biconvex shape (surfaces 21, 22). The lens element L11 has a negative meniscus shape with the convex surfaces facing the magnification side (surfaces 23, 24). The lens element L12 has a positive meniscus shape with the convex surfaces facing the reduction side (surfaces 25, 26). The lens element L13 has a biconcave shape (surfaces 27, 28). The lens element L14 has a biconvex shape (surfaces 29, 30). The lens element L15 has a biconvex shape (surfaces 31, 32). The lens element L16 has a positive meniscus shape with the convex surfaces facing the magnification side (surfaces 33, 34). The lens element L17 has a negative meniscus shape with the convex surfaces facing the reduction side (surfaces 35, 36). The lens element L18 has a biconvex shape (surfaces 36, 37). The lens elements L17 and L18 are bonded to each other to constitute a compound lens. The lens element L19 has a biconcave shape (surfaces 38, 39). The lens element L20 has a biconcave shape (surfaces 40, 41). The lens element L21 has a biconvex shape (surfaces 42, 43). The lens element L22 has a biconvex shape (surfaces 44, 45). The lens element L23 has a negative meniscus shape with the convex surfaces facing the magnification side (surfaces 46, 47). The lens element L24 has a biconvex shape (surfaces 48, 49). The lens element L25 has a biconvex shape (surfaces 50, 51). The lens element L26 has a biconcave shape (surfaces 52, 53). The lens element L27 has a positive meniscus shape with the convex surfaces facing the reduction side (surfaces 54, 55). The lens element L28 has a biconvex shape (surfaces 56, 57). Since the first sub-optical system has the above-described lens element configuration, the first sub-optical system can suppress spread of light rays between the first sub-optical system and the second sub-optical system while maintaining good optical performance.

The prism PM has a first transmission surface T1 located on the reduction side, a second transmission surface T2 located on the magnification side, and a first reflection surface R1 and a second reflection surface R2 located on the optical path between the first transmission surface T1 and the second transmission surface T2. The first transmission surface T1 has a free-form surface shape with the concave surface facing the reduction side (surface 58). The first reflection surface R1 has a free-form surface shape with the concave surface facing a direction in which a light ray incident on the first reflection surface R1 is reflected (surface 59). The second reflection surface R2 has a planar shape (surface 60). The second transmission surface T2 has a free-form surface shape with the convex surface facing the magnification side (surface 61).

Figure 6A:
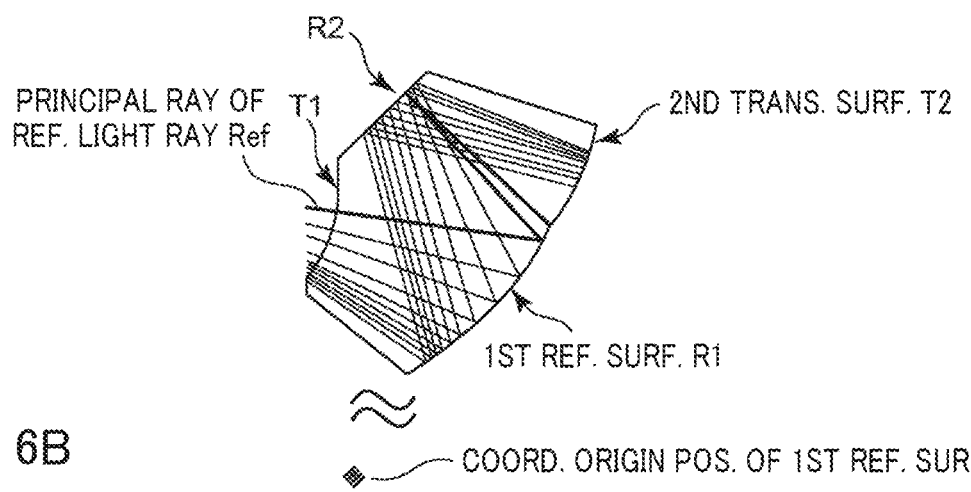
FIG. 6A is a Y cross-sectional view illustrating an optical path through which the principal ray of the reference light ray Ref passes in the prism PM according to Example 2.
Figure 6B:
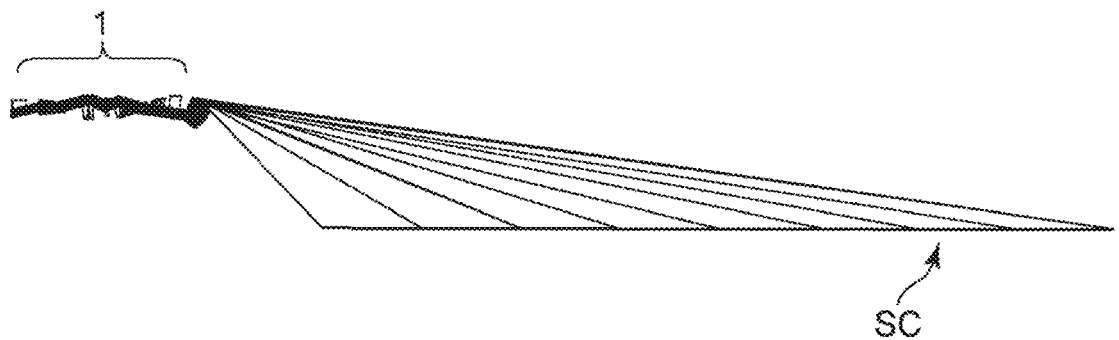
FIG. 6B is an explanatory view illustrating a usage mode of an image projection apparatus using the optical system 1 according to Example 2.

FIG. 6A is a Y cross-sectional view illustrating an optical path through which the principal ray of the reference light ray Ref passes in the prism PM according to Example 2. FIG. 6B is an explanatory view illustrating a usage mode of an image projection apparatus using the optical system 1 according to Example 2. The image projection apparatus including the optical system 1 is horizontally disposed on a support table, such as a table, or on a floor. The screen SC is installed horizontally forward at a position away from the support table by a relatively short horizontal distance, e.g. 0.2 m. The light generated from the optical system 1 is projected forward and obliquely downward to realize projection with a shorter focal length and a larger-sized screen.

Figure 7A:
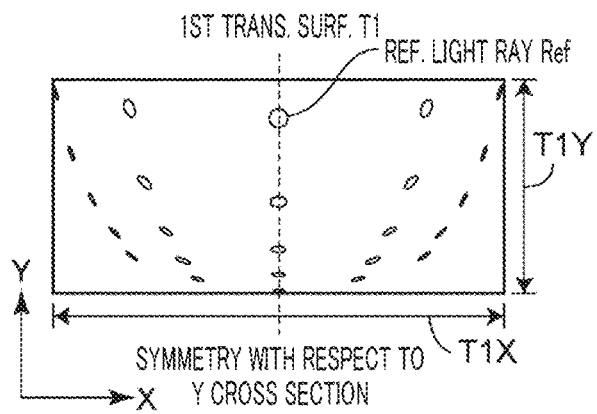
FIGS. 7A to 7D illustrate passing positions and shapes of light fluxes corresponding to respective imaging positions illustrated in FIG. 3.
Figure 7B:
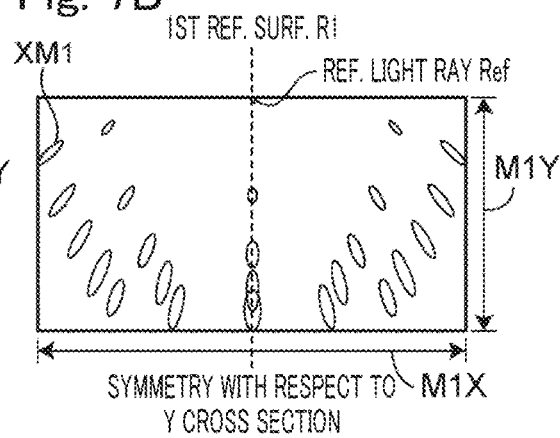
Figure 7C:
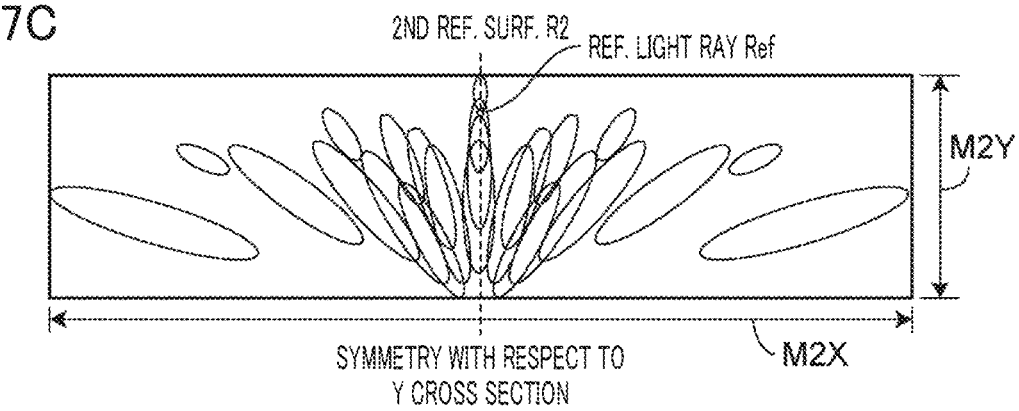
Figure 7D:
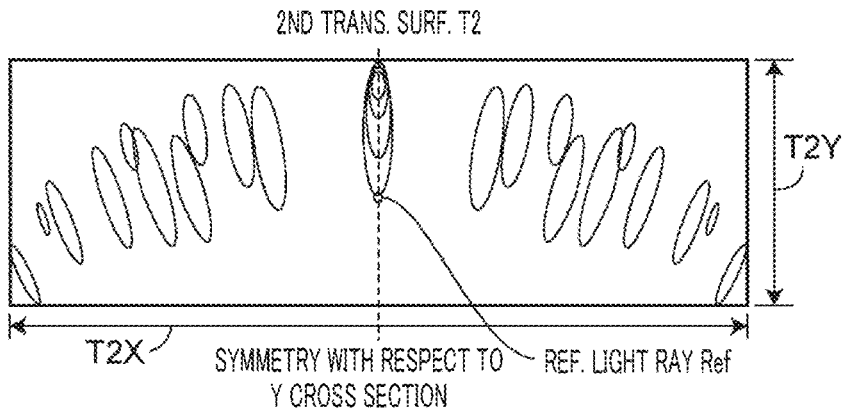

FIGS. 7A to 7D illustrate passing positions and shapes of light fluxes corresponding to respective imaging positions illustrated in FIG. 3. FIG. 7A illustrates a light flux distribution on the first transmission surface T1 of the prism PM according to Example 2. FIG. 7B illustrates a light flux distribution on the first reflection surface R1, FIG. 7C illustrates a light flux distribution on the second reflection surface R2. FIG. 7D illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, M2X defines an X effective range of the second reflection surface R2 when measured parallel to the X cross-section, M2Y defines a Y effective range of the second reflection surface R2 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 3

Figure 8:
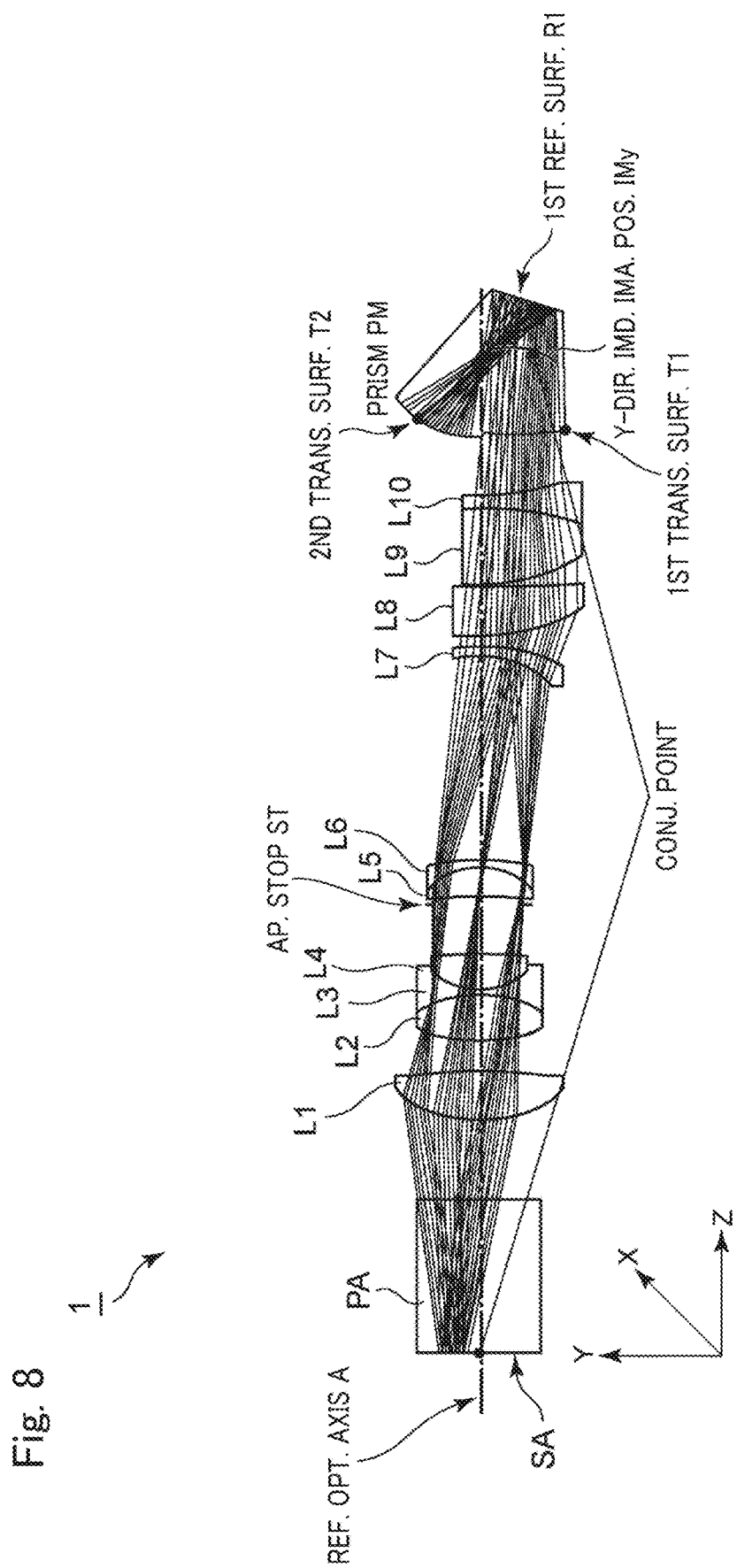
FIG. 8 is an arrangement diagram illustrating an optical system 1 according to Example 3.

FIG. 8 is an arrangement diagram illustrating an optical system 1 according to Example 3. The optical system 1 has a configuration similar to that of Example 1, but a first sub-optical system includes lens elements L1 to L10, and a second sub-optical system including prism PM projects in an oblique direction in the case of the image projection apparatus. Hereinafter, the description overlapping with Example 1 will be omitted.

The lens element L1 has a biconvex shape (surfaces 4, 5). The lens element L2 has a biconvex shape (surfaces 6, 7). The lens element L3 has a biconcave shape (surfaces 7, 8). The lens element L4 has a biconvex shape (surfaces 8, 9). The lens elements L2 to L4 are bonded to each other to constitute a compound lens. The aperture stop ST is located between the lens element L4 and the lens element L5 (surface 10).

The lens element L5 has a positive meniscus shape with the convex surfaces facing the magnification side (surfaces 11, 12). The lens element L6 has a negative meniscus shape with the convex surfaces facing the magnification side (surfaces 12, 13). The lens elements L5 and L6 are bonded to each other to constitute a compound lens. The lens element L7 has a negative meniscus shape with the convex surfaces facing the magnification side (surfaces 14, 15). The lens element L8 has a positive meniscus shape with the convex surfaces facing the reduction side (surfaces 16, 17). The lens element L9 has a biconvex shape (surfaces 18, 19). The lens element L10 has a biconcave shape (surfaces 19, 20). The lens elements L9 and L10 are bonded to each other to constitute a compound lens. Since the first sub-optical system has the above-described lens element configuration, the first sub-optical system can suppress spread of light rays between the first sub-optical system and the second sub-optical system while maintaining good optical performance.

The prism PM has a first transmission surface T1 located on the reduction side, a second transmission surface T2 located on the magnification side, and a first reflection surface R1 located on the optical path between the first transmission surface T1 and the second transmission surface T2. The first transmission surface T1 has a free-form surface shape with the concave surface facing the reduction side (surface 21). The first reflection surface R1 has a free-form surface shape with the concave surface facing a direction in which a light ray made incident on the first reflection surface R1 is reflected (surface 22). The second transmission surface T2 has a free-form surface shape with the convex surface facing the magnification side (surface 23).

FIG. 9A is a Y cross-sectional view illustrating an optical path through which the principal ray of the reference light ray Ref passes in the prism PM according to Example 3. FIG. 9B is an explanatory view illustrating a usage mode of an image projection apparatus using the optical system 1 according to Example 3. The image projection apparatus including the optical system 1 is horizontally disposed on a support table, such as a table, or on a floor. The screen SC is installed vertically upward at a position away from the support table rearward by a relatively short horizontal distance, e.g. 0.8 m. The light generated from the optical system 1 is projected rearward and obliquely upward to realize projection with a shorter focal length and a larger-sized screen.

Figure 10A:
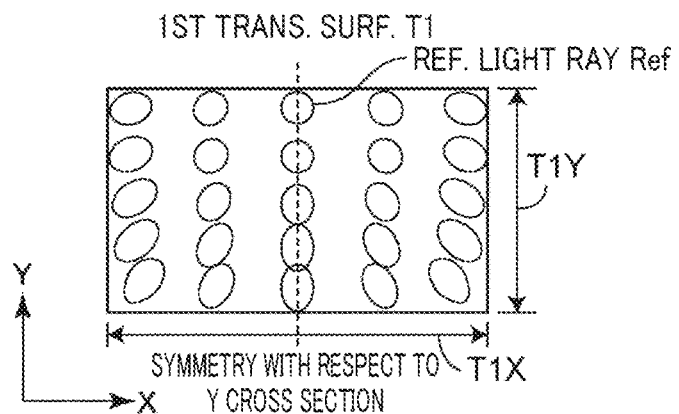
FIGS. 10A to 10C illustrate passing positions and shapes of light fluxes corresponding to respective imaging positions illustrated in FIG. 3.
Figure 10B:
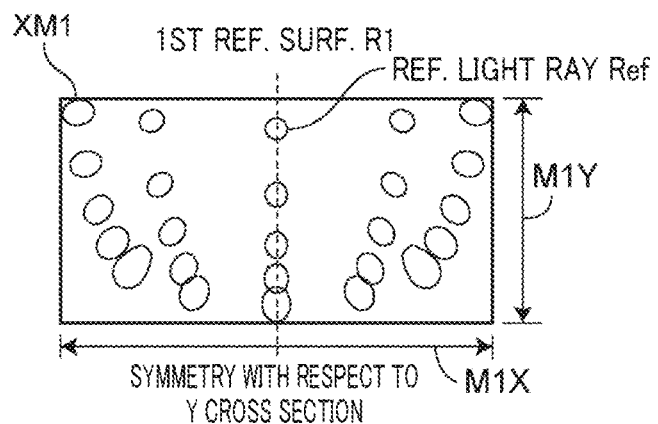
Figure 10C:
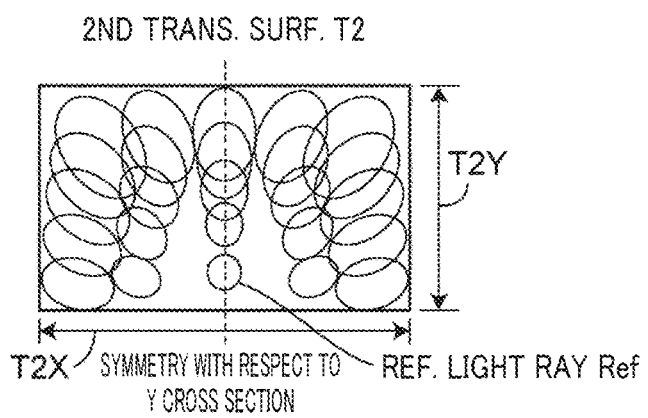

FIGS. 10A to 10C illustrate passing positions and shapes of light fluxes corresponding to respective imaging positions illustrated in FIG. 3. FIG. 10A illustrates a light flux distribution on the first transmission surface T1 of the prism PM according to Example 3. FIG. 10B illustrates a light flux distribution on the first reflection surface R1. FIG. 10C illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 4

Figure 11:
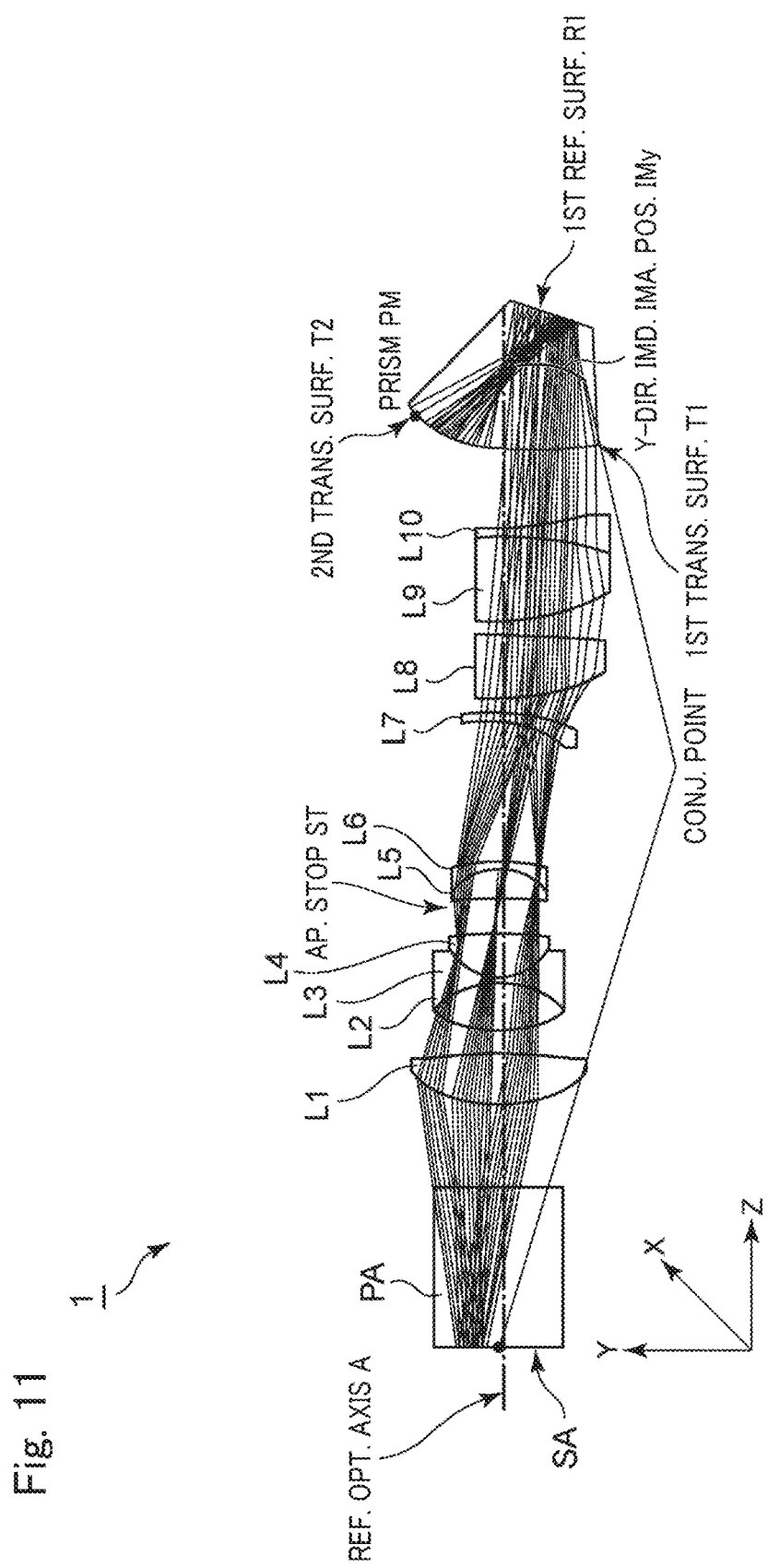
FIG. 11 is an arrangement diagram illustrating an optical system 1 according to Example 4.

FIG. 11 is an arrangement diagram illustrating an optical system 1 according to Example 4. The optical system 1 has a configuration similar to that of Example 1, but a first sub-optical system includes lens elements L1 to L10, and a second sub-optical system including prism PM projects in an oblique direction in the case of the image projection apparatus. Hereinafter, the description overlapping with Example 1 will be omitted.

The lens element L1 has a biconvex shape (surfaces 4, 5). The lens element L2 has a biconvex shape (surfaces 6, 7). The lens element L3 has a biconcave shape (surfaces 7, 8). The lens element L4 has a positive meniscus shape with the convex surfaces facing the reduction side (surfaces 8, 9). The lens elements L2 to L4 are bonded to each other to constitute a compound lens. The aperture stop ST is located between the lens element L4 and the lens element L5 (surface 10).

The lens element L5 has a positive meniscus shape with the convex surfaces facing the magnification side (surfaces 11, 12). The lens element L6 has a negative meniscus shape with the convex surfaces facing the magnification side (surfaces 12, 13). The lens elements L5 and L6 are bonded to each other to constitute a compound lens. The lens element L7 has a negative meniscus shape with the convex surfaces facing the magnification side (surfaces 14, 15). The lens element L8 has a biconvex shape (surfaces 16, 17). The lens element L9 has a biconvex shape (surfaces 18, 19). The lens element L10 has a biconcave shape (surfaces 19, 20). The lens elements L9 and L10 are bonded to each other to constitute a compound lens. Since the first sub-optical system has the above-described lens element configuration, the first sub-optical system can suppress spread of light rays between the first sub-optical system and the second sub-optical system while maintaining good optical performance.

The prism PM has a first transmission surface T1 located on the reduction side, a second transmission surface T2 located on the magnification side, and a first reflection surface R1 located on the optical path between the first transmission surface T1 and the second transmission surface T2. The first transmission surface T1 has a free-form surface shape with the concave surface facing the reduction side (surface 21). The first reflection surface R1 has a free-form surface shape with the concave surface facing a direction in which a light ray made incident on the first reflection surface R1 is reflected (surface 22). The second transmission surface T2 has a free-form surface shape with the convex surface facing the magnification side (surface 23).

Figure 12A:
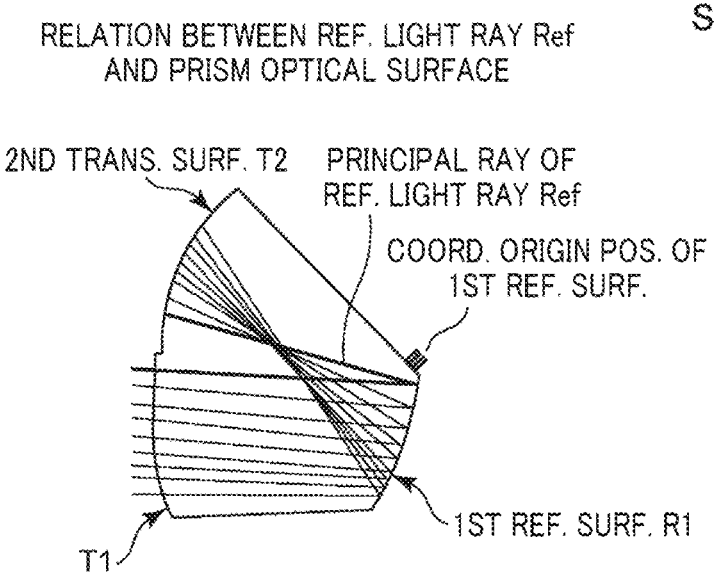
FIG. 12A is a Y cross-sectional view illustrating an optical path through which the principal ray of the reference light ray Ref passes in the prism PM according to Example 4.
Figure 12B:
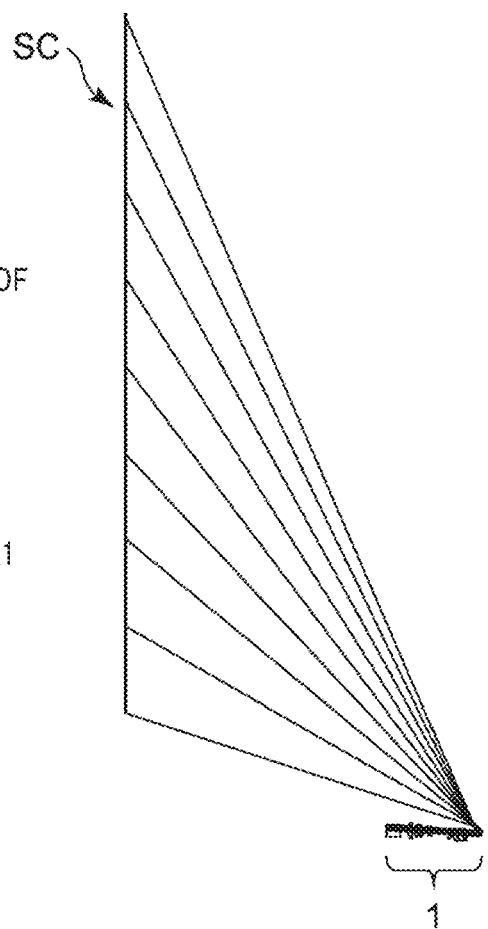
FIG. 12B is an explanatory view illustrating a usage mode of an image projection apparatus using the optical system 1 according to Example 4.

FIG. 12A is a Y cross-sectional view illustrating an optical path through which the principal ray of the reference light ray Ref passes in the prism PM according to Example 4. FIG. 12B is an explanatory view illustrating a usage mode of an image projection apparatus using the optical system 1 according to Example 4. The image projection apparatus including the optical system 1 is horizontally disposed on a support table, such as a table, or on a floor. The screen SC is installed vertically upward at a position away from the support table rearward by a relatively short horizontal distance, e.g. 0.6 m. The light generated from the optical system 1 is projected rearward and obliquely upward to realize projection with a shorter focal length and a larger-sized screen.

Figure 13A:
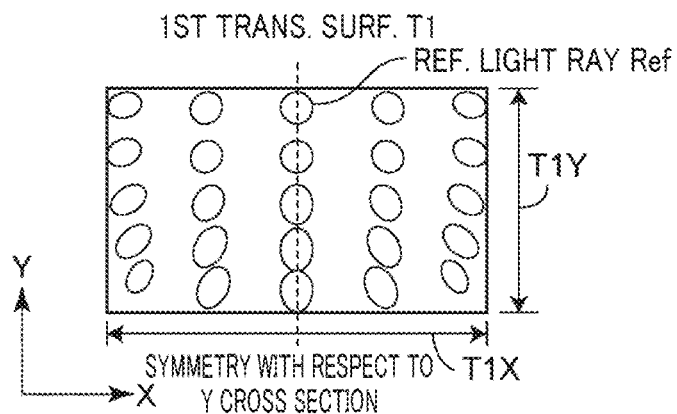
FIGS. 13A to 13C illustrate passing positions and shapes of a light fluxes corresponding to respective imaging positions illustrated in FIG. 3.
Figure 13B:
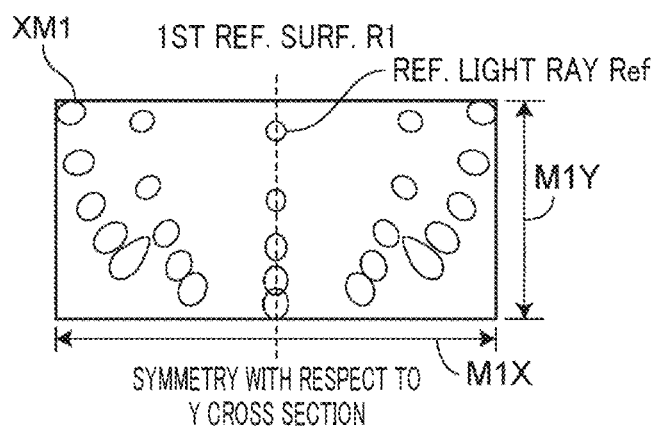
Figure 13C:
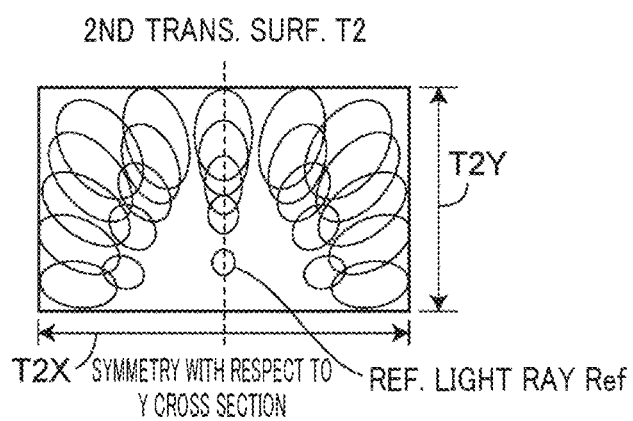

FIGS. 13A to 13C illustrate passing positions and shapes of a light fluxes corresponding to respective imaging positions illustrated in FIG. 3. FIG. 13A illustrates a light flux distribution on the first transmission surface T1 of the prism PM according to Example 4. FIG. 13B illustrates a light flux distribution on the first reflection surface R1. FIG. 13C illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 5

Figure 14:
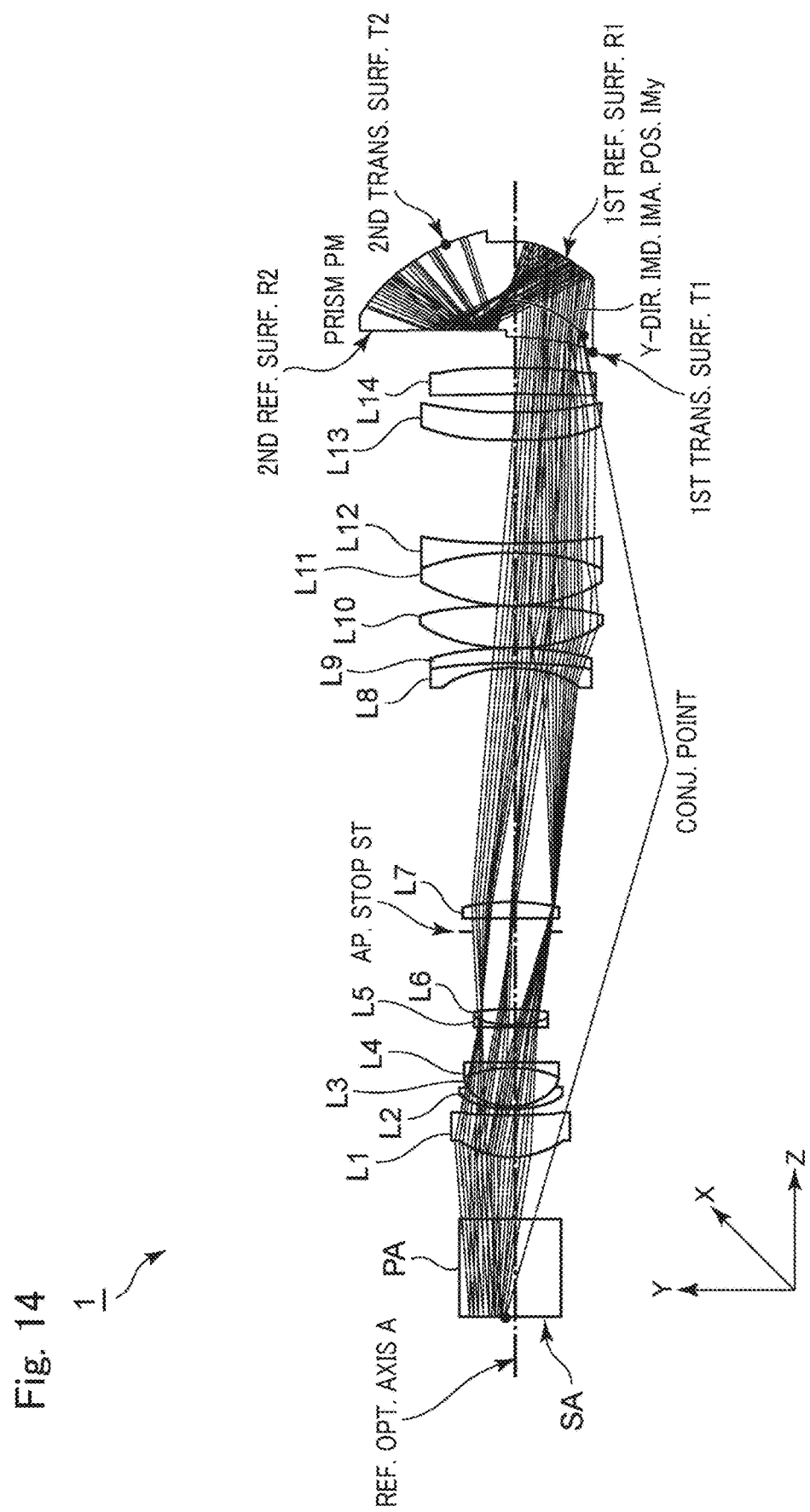
FIG. 14 is an arrangement diagram illustrating an optical system 1 according to Example 5.

FIG. 14 is an arrangement diagram illustrating an optical system 1 according to Example 5. The optical system 1 has a configuration similar to that of Example 1, but a first sub-optical system includes lens elements L1 to L14, and a second sub-optical system including prism PM projects in an oblique direction in the case of the image projection apparatus. Hereinafter, the description overlapping with Example 1 will be omitted.

The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are bonded to each other to constitute a compound lens. The lens element L5 has a biconvex shape (surfaces 10, 11). The lens element L6 has a biconvex shape (surfaces 11, 12). The lens elements L5 and LE are bonded to each other to constitute a compound lens. The aperture stop ST is located between the lens element L6 and the lens element L7 (surface 13).

The lens element L7 has a biconvex shape (surfaces 14, 15). The lens element L8 has a negative meniscus shape with the convex surfaces facing the magnification side (surfaces 16, 17). The lens element L9 has a positive meniscus shape with the convex surfaces facing the magnification side (surfaces 17, 18). The lens elements L8 and L9 are bonded to each other to constitute a compound lens. The lens element L10 has a biconvex shape (surfaces 19, 20). The lens element L11 has a biconvex shape (surfaces 21, 22). The lens element L12 has a biconcave shape (surfaces 22, 23). The lens elements L11 and L12 are bonded to each other to constitute a compound lens. The lens element L13 has a negative meniscus shape with the convex surfaces facing the reduction side (surfaces 24, 25). The lens element L14 has a positive meniscus shape with the convex surfaces facing the magnification side (surfaces 26, 27). Since the first sub-optical system has the above-described lens element configuration, the first sub-optical system can suppress spread of light rays between the first sub-optical system and the second sub-optical system while maintaining good optical performance.

The prism PM has a first transmission surface T1 located on the reduction side, a second transmission surface T2 located on the magnification side, and a first reflection surface R1 and a second reflection surface R2 located on the optical path between the first transmission surface T1 and the second transmission surface T2. The first transmission surface T1 has a free-form surface shape with the concave surface facing the reduction side (surface 28). The first reflection surface R1 has a free-form surface shape with the concave surface facing a direction in which a light ray made incident on the first reflection surface R1 is reflected (surface 29). The second reflection surface R2 has a planar shape (surface 30). The second transmission surface T2 has a free-form surface shape with the convex surface facing the magnification side (surface 31).

FIG. 15A is a Y cross-sectional view illustrating an optical path through which the principal ray of the reference light ray Ref passes in the prism PM according to Example 5. FIG. 15B is an explanatory view illustrating a usage mode of an image projection apparatus using the optical system 1 according to Example 5. The image projection apparatus including the optical system 1 is horizontally disposed on a support table, such as a table, or on a floor. The screen SC is installed vertically upward at a position away from the support table by a relatively short horizontal distance, e.g. 0.6 m. The light generated from the optical system 1 is projected forward and obliquely upward to realize projection with a shorter focal length and a larger-sized screen.

Figure 16A:
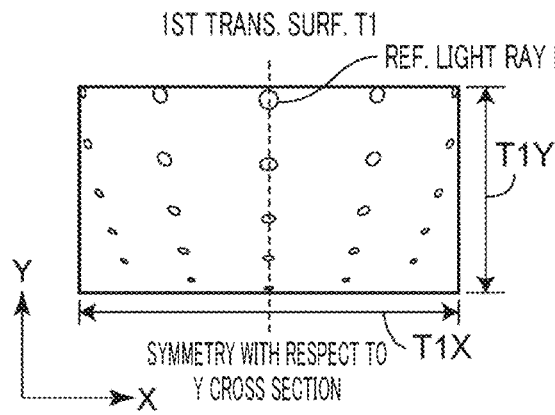
FIGS. 16A to 16D illustrate passing positions and shapes of light fluxes corresponding to respective imaging positions illustrated in FIG. 3.
Figure 16B:
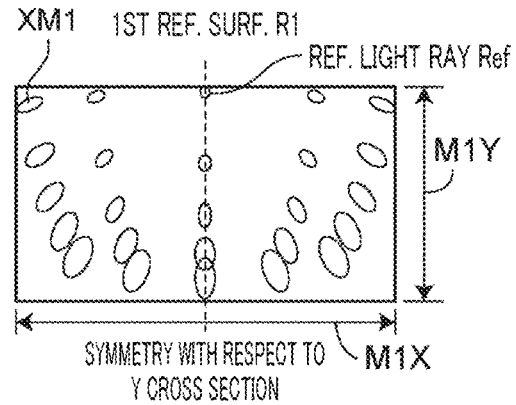
Figure 16C:
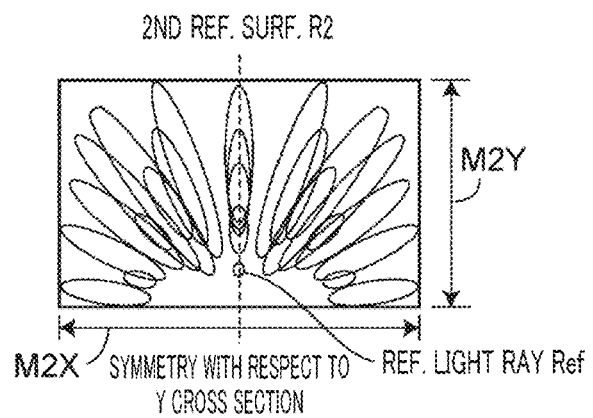
Figure 16D:
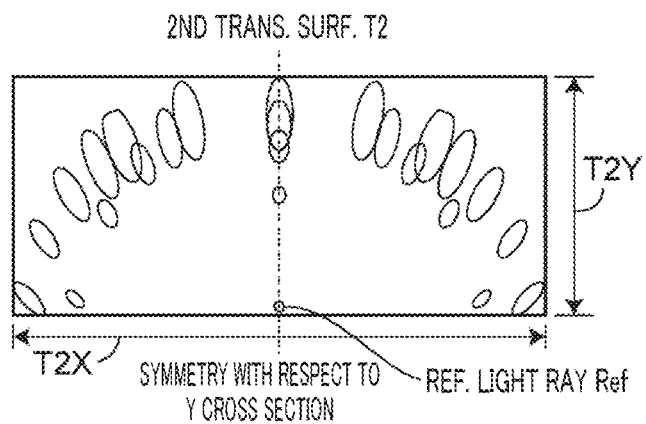

FIGS. 16A to 16D illustrate passing positions and shapes of light fluxes corresponding to respective imaging positions illustrated in FIG. 3. FIG. 16A illustrates a light flux distribution on the first transmission surface T1 of the prism PM according to Example 5. FIG. 16B illustrates a light flux distribution on the first reflection surface R1. FIG. 16C illustrates a light flux distribution on the second reflection surface R2. FIG. 16D illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, M2X defines an X effective range of the second reflection surface R2 when measured parallel to the X cross-section, M2Y defines a Y effective range of the second reflection surface R2 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 6

Figure 17:
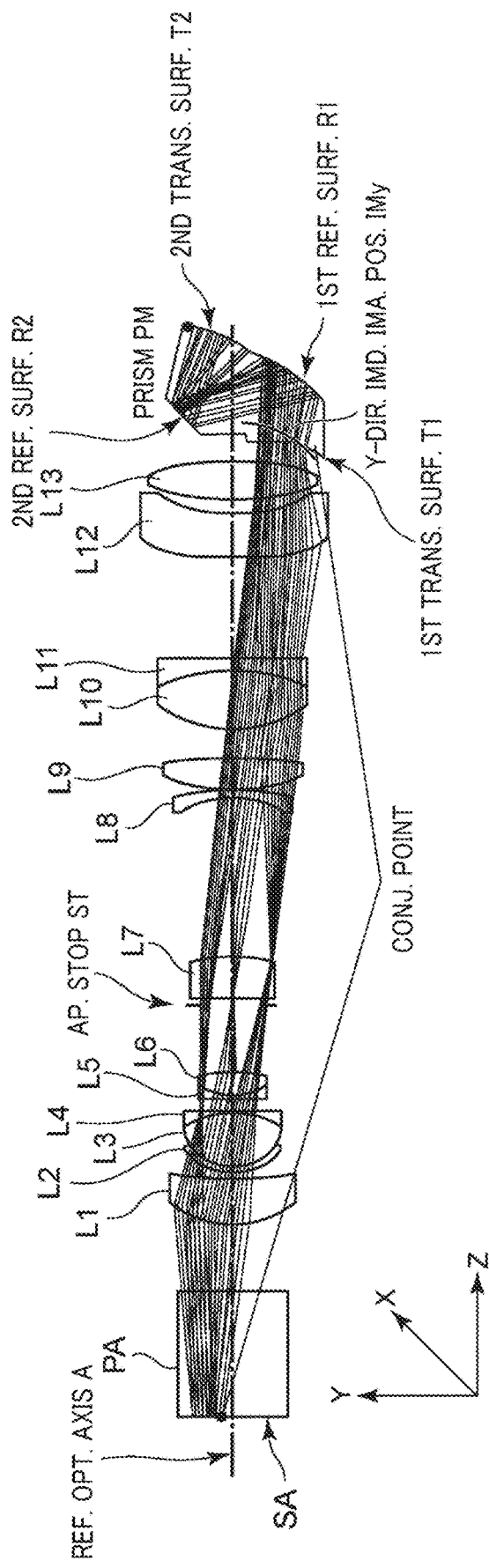
FIG. 17 is an arrangement diagram illustrating an optical system 1 according to Example 6.

FIG. 17 is an arrangement diagram illustrating an optical system 1 according to Example 6. The optical system 1 has a configuration similar to that of Example 1, but a first sub-optical system includes lens elements L1 to L13, and a second sub-optical system including prism PM projects in an oblique direction in the case of the image projection apparatus. Hereinafter, the description overlapping with Example 1 will be omitted.

The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are bonded to each other to constitute a compound lens. The lens element L5 has a biconcave shape (surfaces 10, 11). The lens element L6 has a biconvex shape (surfaces 11, 12). The lens elements L5 and L6 are bonded to each other to constitute a compound lens. The aperture stop ST is located between the lens element L6 and the lens element L7 (surface 13).

The lens element L7 has a biconvex shape (surfaces 14, 15). The lens element L8 has a negative meniscus shape with the convex surfaces facing the magnification side (surfaces 16, 17). The lens element L9 has a biconvex shape (surfaces 18, 19). The lens element L10 has a biconvex shape (surfaces 20, 21). The lens element L11 has a biconcave shape (surfaces 21, 22). The lens elements L10 and L11 are bonded to each other to constitute a compound lens. The lens element L12 has a negative meniscus shape with the convex surfaces facing the reduction side (surfaces 23, 24). The lens element L13 has a biconvex shape (surfaces 25, 26). Since the first sub-optical system has the above-described lens element configuration, the first sub-optical system can suppress spread of light rays between the first sub-optical system and the second sub-optical system while maintaining good optical performance.

The prism PM has a first transmission surface T1 located on the reduction side, a second transmission surface T2 located on the magnification side, and a first reflection surface R1 and a second reflection surface R2 located on the optical path between the first transmission surface T1 and the second transmission surface T2. The first transmission surface T1 has a free-form surface shape with the concave surface facing the reduction side (surface 27). The first reflection surface R1 has a free-form surface shape with the concave surface facing a direction in which a light ray made incident on the first reflection surface R1 is reflected (surface 28). The second reflection surface R2 has a planar shape (surface 29). The second transmission surface T2 has a free-form surface shape with the convex surface facing the magnification side (surface 30).

Figure 18A:
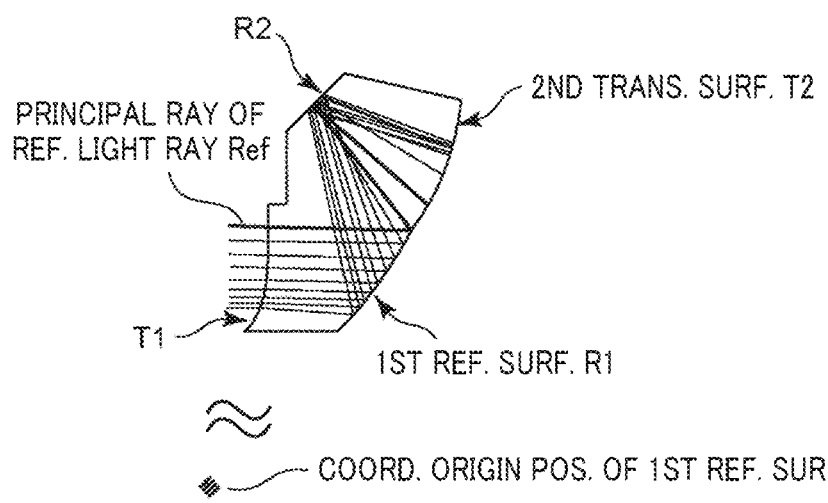
FIG. 18A is a Y cross-sectional view illustrating an optical path through which the principal ray of the reference light ray Ref passes in the prism PM according to Example 6.
Figure 18B:
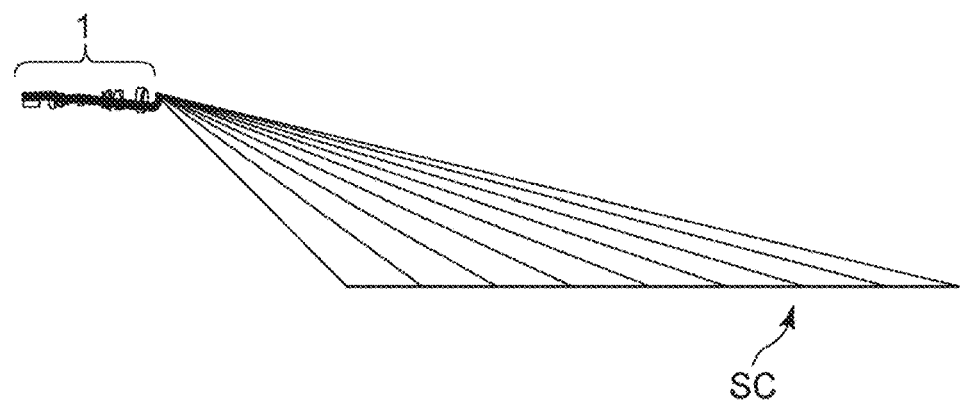
FIG. 18B is an explanatory view illustrating a usage mode of an image projection apparatus using the optical system 1 according to Example 6.

FIG. 18A is a Y cross-sectional view illustrating an optical path through which the principal ray of the reference light ray Ref passes in the prism PM according to Example 6. FIG. 18B is an explanatory view illustrating a usage mode of an image projection apparatus using the optical system 1 according to Example 6. The image projection apparatus including the optical system 1 is horizontally disposed on a support table, such as a table, or on a floor. The screen SC is installed horizontally forward at a position away from the support table by a relatively short horizontal distance, e.g. 0.6 m. The light generated from the optical system 1 is projected forward and obliquely downward to realize projection with a shorter focal length and a larger-sized screen.

Figure 19A:
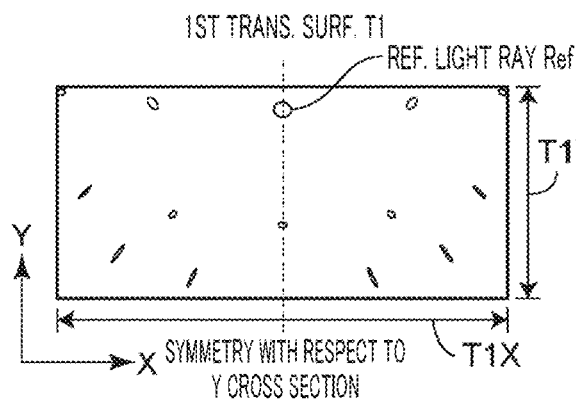
FIGS. 19A to 19D illustrate passing positions and shapes of light fluxes corresponding to respective imaging positions illustrated in FIG. 3.
Figure 19B:
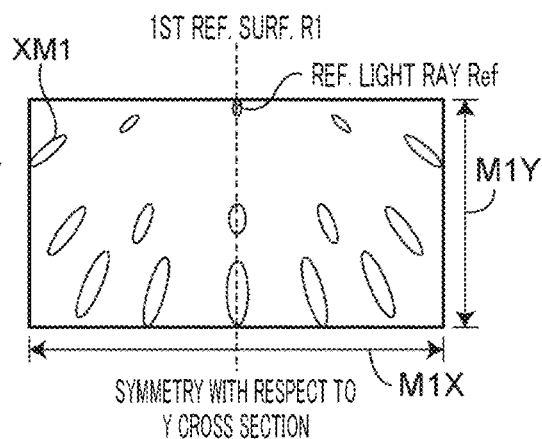
Figure 19C:
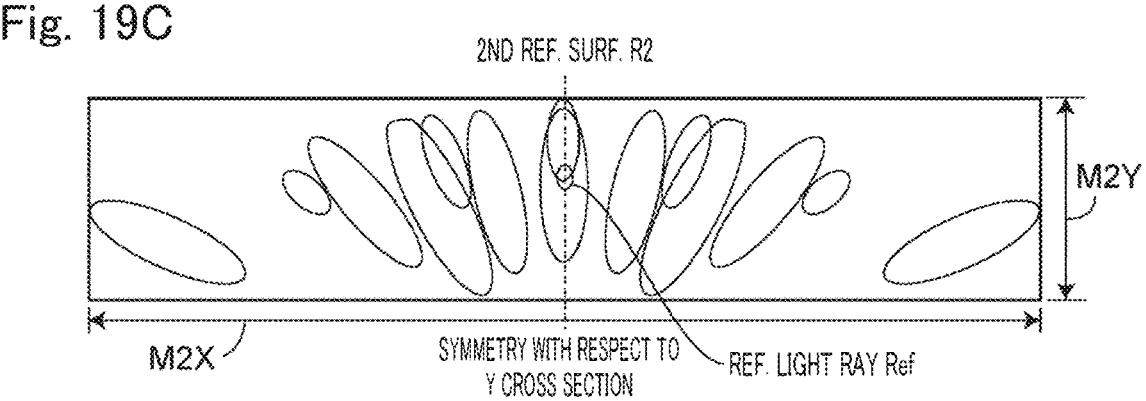
Figure 19D:
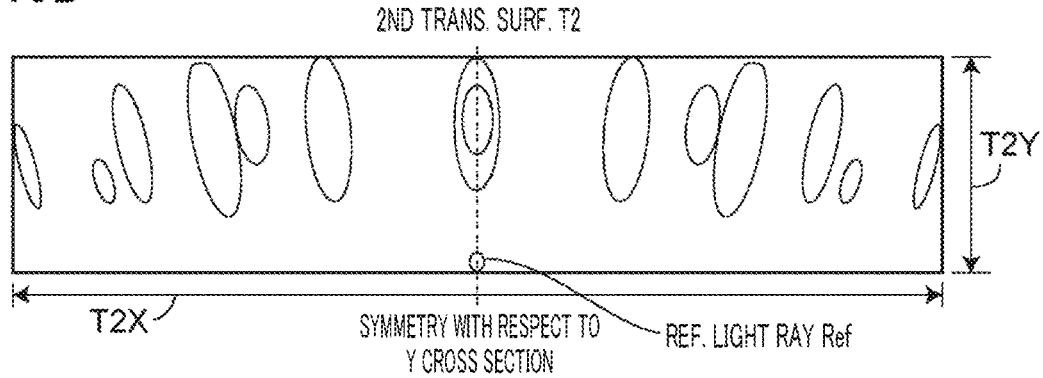

FIGS. 19A to 19D illustrate passing positions and shapes of light fluxes corresponding to respective imaging positions illustrated in FIG. 3. FIG. 19A illustrates a light flux distribution on the first transmission surface T1 of the prism PM according to Example 6. FIG. 19B illustrates a light flux distribution on the first reflection surface R1. FIG. 19C illustrates a light flux distribution on the second reflection surface R2. FIG. 19D illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, M2X defines an X effective range of the second reflection surface R2 when measured parallel to the X cross-section, M2Y defines a Y effective range of the second reflection surface R2 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 7

Figure 20:
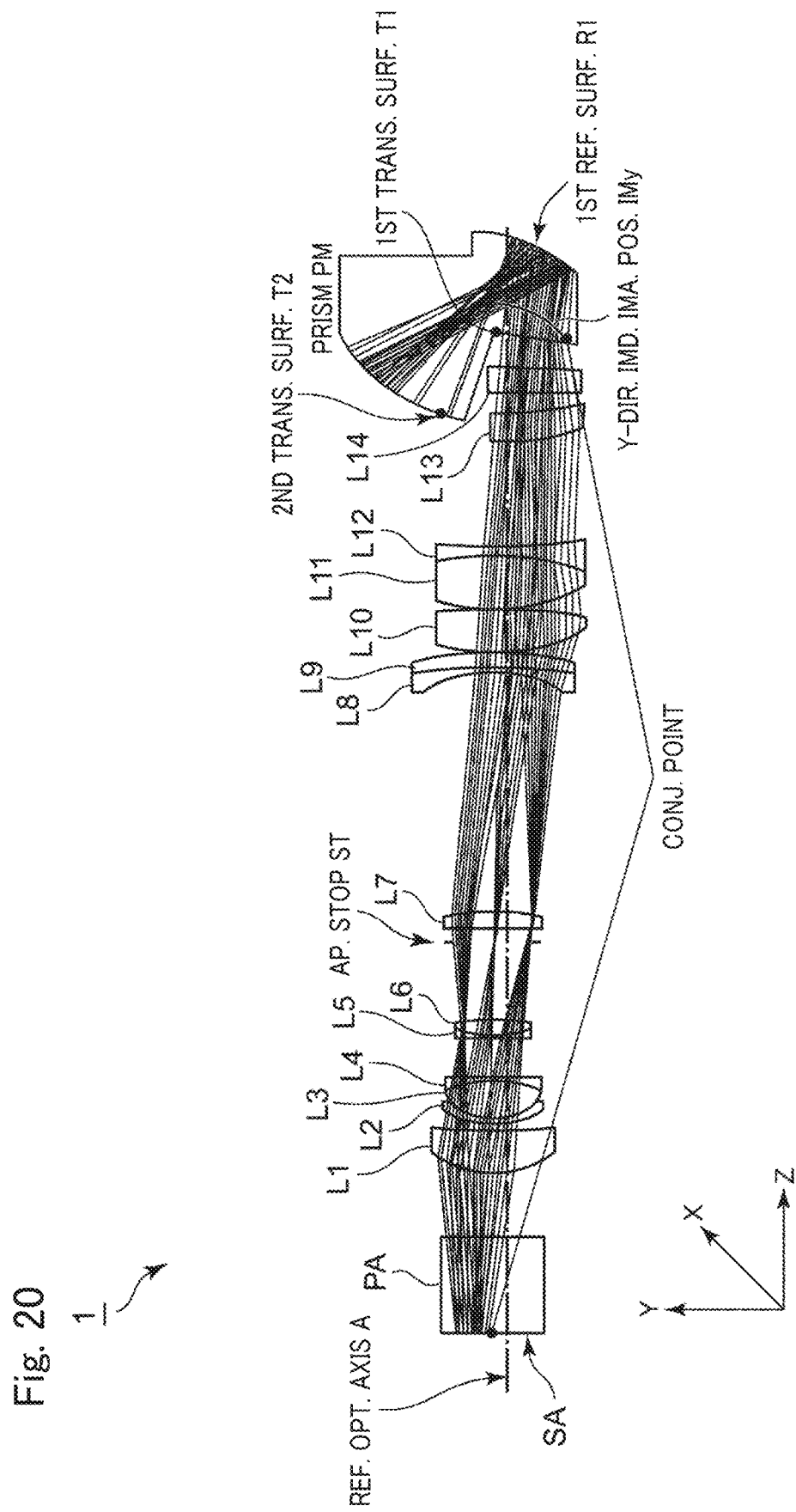
FIG. 20 is an arrangement diagram illustrating an optical system 1 according to Example 7.

FIG. 20 is an arrangement diagram illustrating an optical system 1 according to Example 7. The optical system 1 has a configuration similar to that of Example 1, but a first sub-optical system includes lens elements L1 to L14, and a second sub-optical system including prism PM projects in an oblique direction in the case of the image projection apparatus. Hereinafter, the description overlapping with Example 1 will be omitted.

The lens element L1 has a positive meniscus shape with the convex surfaces facing the reduction side (surfaces 4, 5). The lens element L2 has a negative meniscus shape with the convex surfaces facing the reduction side (surfaces 6, 7). The lens element L3 has a biconvex shape (surfaces 7, 8). The lens element L4 has a negative meniscus shape with the convex surfaces facing the magnification side (surfaces 8, 9). The lens elements L2 to L4 are bonded to each other to constitute a compound lens. The lens element L5 has a biconcave shape (surfaces 10, 11). The lens element L6 has a biconvex shape (surfaces 11, 12). The lens elements L5 and L6 are bonded to each other to constitute a compound lens. The aperture stop ST is located between the lens element L4 and the lens element L5 (surface 13).

The lens element L7 has a biconvex shape (surfaces 14, 15). The lens element L8 has a negative meniscus shape with the convex surfaces facing the magnification side (surfaces 16, 17). The lens element L9 has a positive meniscus shape with the convex surfaces facing the magnification side (surfaces 17, 18). The lens elements L8 and L9 are bonded to each other to constitute a compound lens. The lens element L10 has a biconvex shape (surfaces 19, 20). The lens element L11 has a biconvex shape (surfaces 21, 22). The lens element L12 has a biconcave shape (surfaces 22, 23). The lens elements L11 and L12 are bonded to each other to constitute a compound lens. The lens element L13 has a negative meniscus shape with the convex surfaces facing the reduction side (surfaces 24, 25). The lens element L14 has a positive meniscus shape with the convex surfaces facing the magnification side (surfaces 26, 27). Since the first sub-optical system has the above-described lens element configuration, the first sub-optical system can suppress spread of light rays between the first sub-optical system and the second sub-optical system while maintaining good optical performance.

The prism PM has a first transmission surface T1 located on the reduction side, a second transmission surface T2 located on the magnification side, and a first reflection surface R1 located on the optical path between the first transmission surface T1 and the second transmission surface T2. The first transmission surface T1 has a free-form surface shape with the concave surface facing the reduction side (surface 28). The first reflection surface R1 has a free-form surface shape with the concave surface facing a direction in which a light ray made incident on the first reflection surface R1 is reflected (surface 29). The second transmission surface T2 has a free-form surface shape with the convex surface facing the magnification side (surface 30).

Figure 21A:
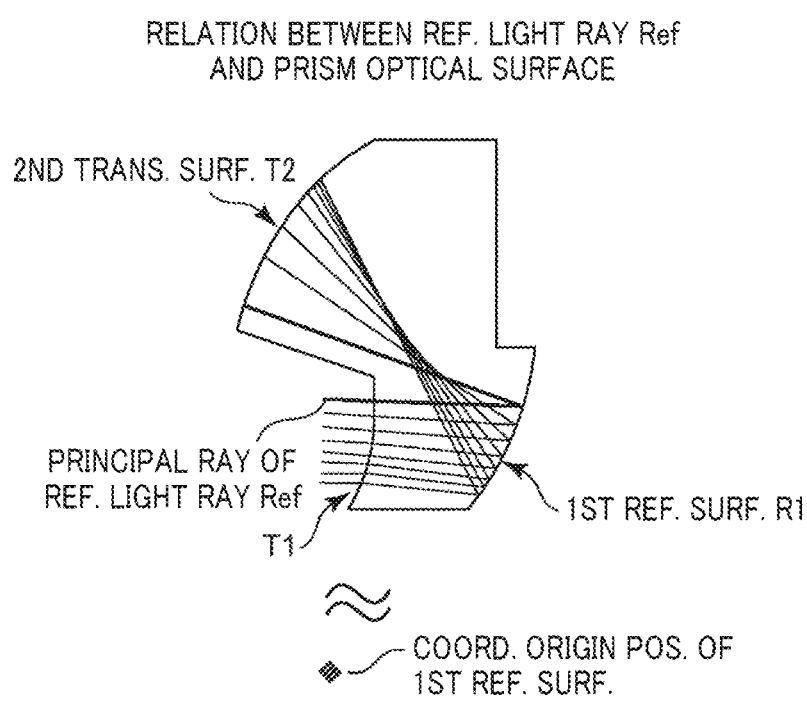
FIG. 21A is a Y cross-sectional view illustrating an optical path through which the principal ray of the reference light ray Ref passes in the prism PM according to Example 7.
Figure 21B:
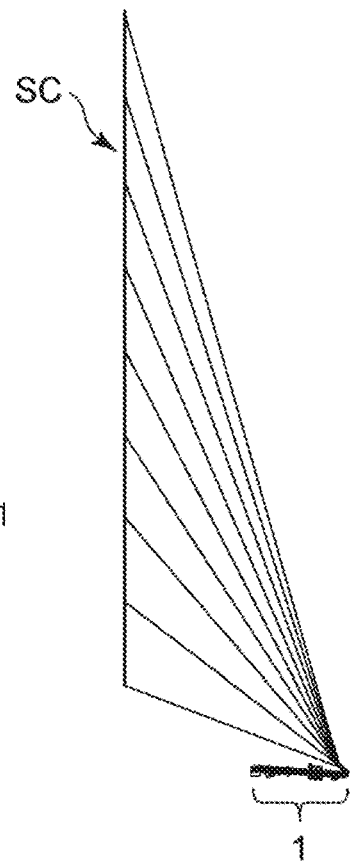
FIG. 21B is an explanatory view illustrating a usage mode of an image projection apparatus using the optical system 1 according to Example 7.

FIG. 21A is a Y cross-sectional view illustrating an optical path through which the principal ray of the reference light ray Ref passes in the prism PM according to Example 7. FIG. 21B is an explanatory view illustrating a usage mode of an image projection apparatus using the optical system 1 according to Example 7. The image projection apparatus including the optical system 1 is horizontally disposed on a support table, such as a table, or on a floor. The screen SC is installed vertically upward at a position away from the support table rearward by a relatively short horizontal distance, e.g. 0.6 m. The light generated from the optical system 1 is projected rearward and obliquely upward to realize projection with a shorter focal length and a larger-sized screen.

Figure 22A:
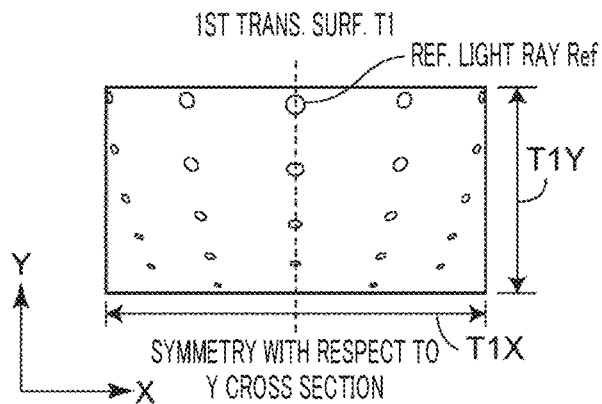
FIGS. 22A to 22C illustrate passing positions and shapes of light fluxes corresponding to respective imaging positions illustrated in FIG. 3.
Figure 22B:
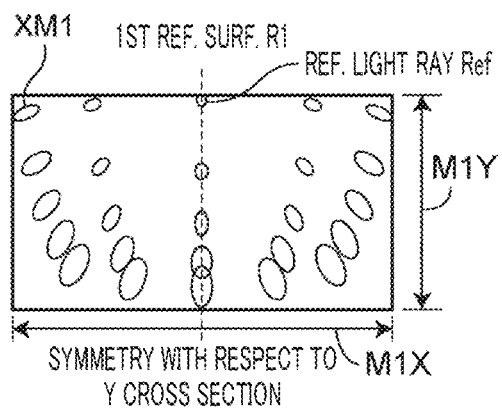
Figure 22C:
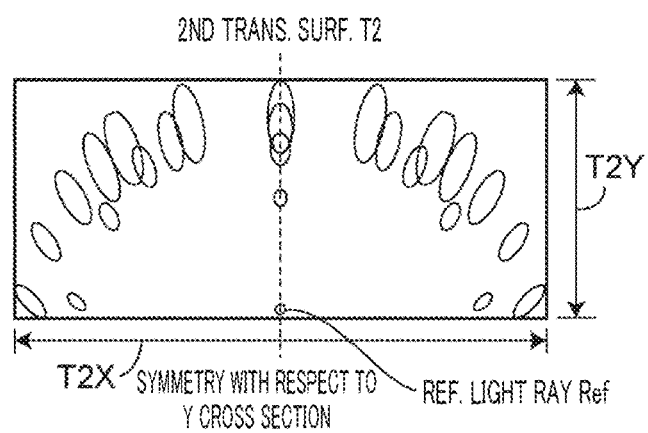

FIGS. 22A to 22C illustrate passing positions and shapes of light fluxes corresponding to respective imaging positions illustrated in FIG. 3. FIG. 22A illustrates a light flux distribution on the first transmission surface T1 of the prism PM according to Example 7. FIG. 22B illustrates a light flux distribution on the first reflection surface R1. FIG. 22C illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 8

Figure 23:
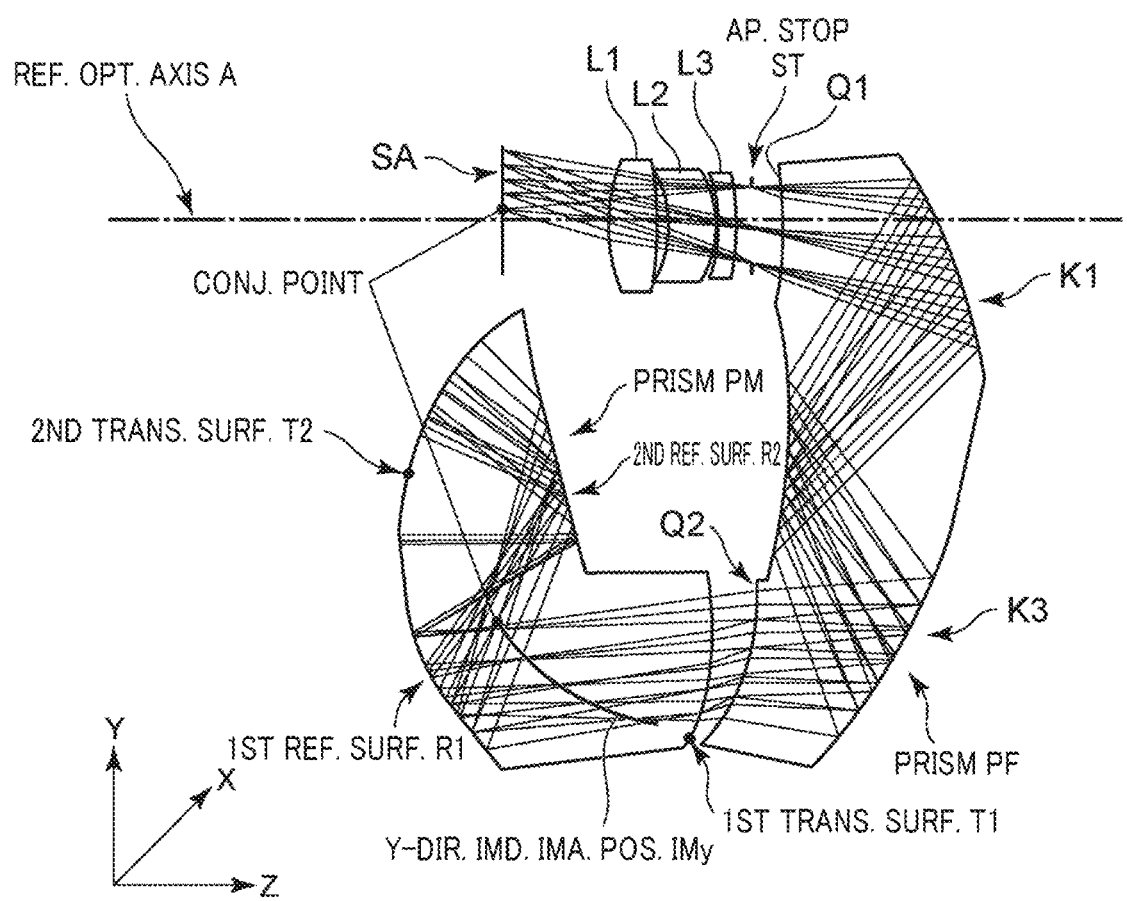
FIG. 23 is an arrangement diagram illustrating an optical system 1 according to Example 8.

FIG. 23 is an arrangement diagram illustrating an optical system 1 according to Example 8. The optical system 1 has a configuration similar to that of Example 1, but a first sub-optical system includes lens elements L1 to L3 and prism PF, and a second sub-optical system including prism PM projects in an oblique direction in the case of the image projection apparatus. Hereinafter, the description overlapping with Example 1 will be omitted.

The lens element L1 has a biconvex shape (surfaces 2, 3). The lens element L2 has a negative meniscus shape with the convex surfaces facing the magnification side (surfaces 4, 5). The lens element L3 has a negative meniscus shape with the convex surfaces facing the magnification side (surfaces 6, 7). The aperture stop ST is located between the lens element L3 and the prism PF (surface 8). Since the first sub-optical system has the above-described lens element configuration, the first sub-optical system can suppress spread of light rays between the first sub-optical system and the second sub-optical system while maintaining good optical performance.

Similar to the prism PM, the prism PF is formed of a transparent medium, for example, glass, synthetic resin, or the like. The prism PF has a transmission surface Q1 located on the reduction side, a transmission surface Q2 located on the magnification side, and three reflection surfaces K1, K2, and K3 located on the optical path between the transmission surface Q1 and the transmission surface Q2. The transmission surface Q1 has a free-form surface shape with the concave surface facing the reduction side (surface 9). The reflection surface K1 has a free-form surface shape with the concave surface facing the reduction side and the magnification side (surface 10). The reflection surface K2 has a free-form surface shape with the convex surface facing the reduction side and the magnification side (surface 11). The reflection surface K3 has a free-form surface shape with the concave surface facing the reduction side and the magnification side (surface 12). The transmission surface Q2 has a free-form surface shape with the convex surface facing the reduction side (surface 13).

The prism PM has a first transmission surface T1 located on the reduction side, a second transmission surface T2 located on the magnification side, and a first reflection surface R1 and a second reflection surface R2 located on the optical path between the first transmission surface T1 and the second transmission surface T2. The first transmission surface T1 has a free-form surface shape with the convex surface facing the reduction side (surface 14). The first reflection surface R1 has a free-form surface shape with the concave surface facing the reduction side and the magnification side (surface 15). The second reflection surface R2 has a free-form surface shape with the convex surface facing a direction in which a light ray made incident on the second reflection surface R2 is reflected (surface 16). The second transmission surface T2 has a free-form surface shape with the convex surface facing the magnification side (surface 17).

Figure 24A:
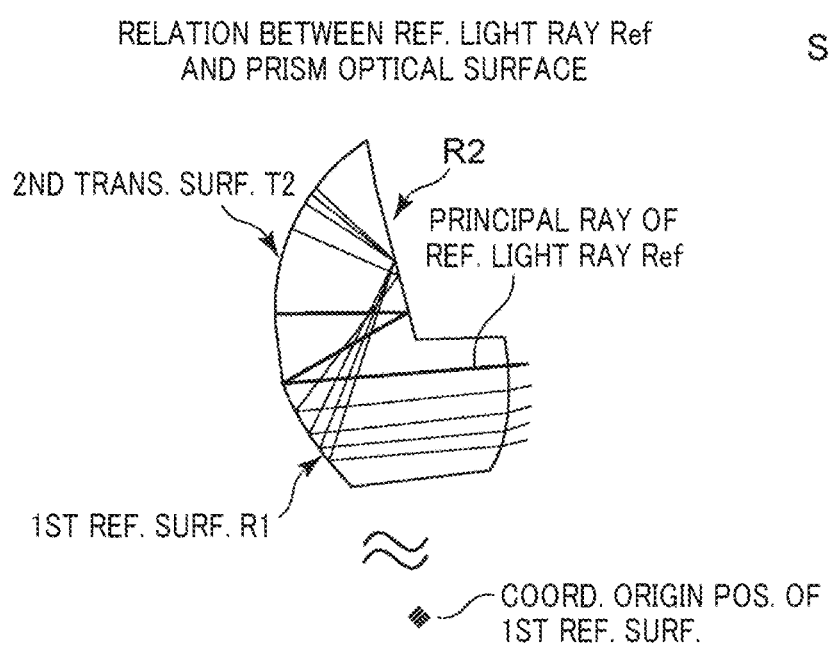
FIG. 24A is a Y cross-sectional view illustrating an optical path through which the principal ray of the reference light ray Ref passes in the prism PM according to Example 8.
Figure 24B:
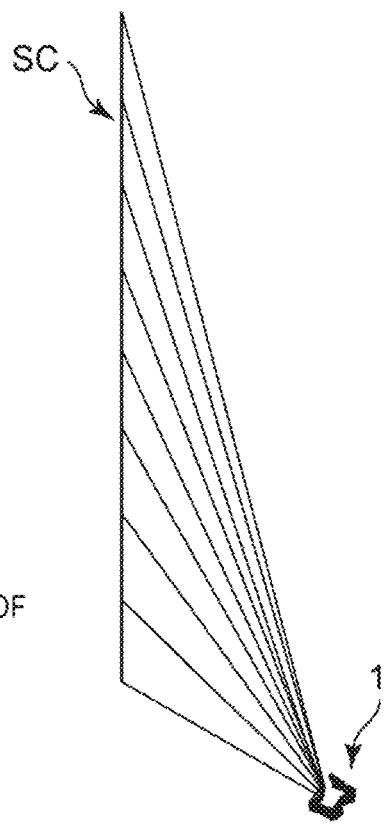
FIG. 24B is an explanatory view illustrating a usage mode of an image projection apparatus using the optical system 1 according to Example 8.

FIG. 24A is a Y cross-sectional view illustrating an optical path through which the principal ray of the reference light ray Ref passes in the prism PM according to Example 8. FIG. 24B is an explanatory view illustrating a usage mode of an image projection apparatus using the optical system 1 according to Example 8. The image projection apparatus including the optical system 1 is horizontally disposed on a support table, such as a table, or on a floor. The screen SC is installed vertically upward at a position away from the support table rearward by a relatively short horizontal distance, e.g. 0.2 m. The light generated from the optical system 1 is projected rearward and obliquely upward to realize projection with a shorter focal length and a larger-sized screen.

Figure 25A:
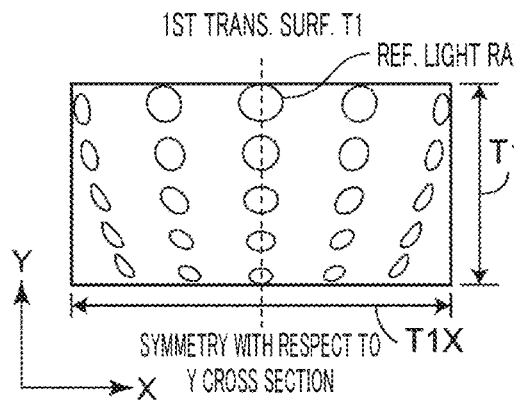
FIGS. 25A to 25D illustrate passing positions and shapes of light fluxes corresponding to respective imaging positions illustrated in FIG. 3.
Figure 25B:
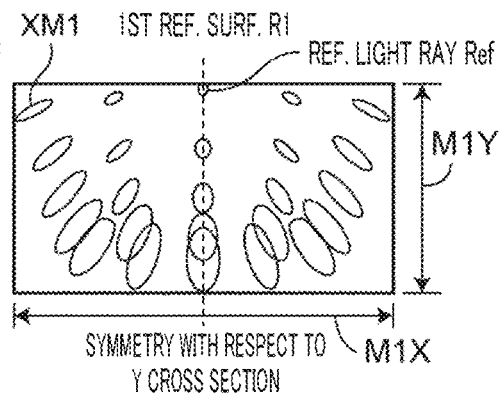
Figure 25C:
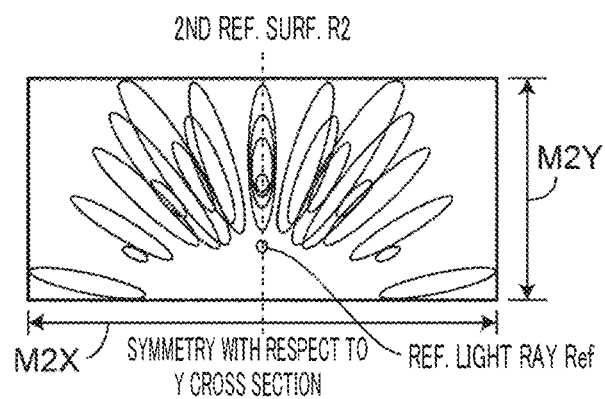
Figure 25D:
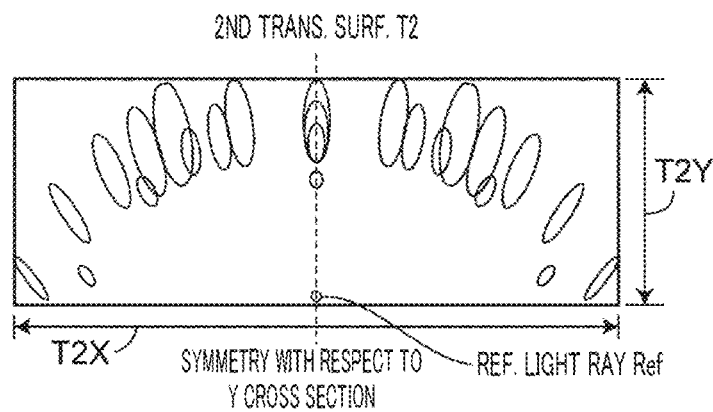

FIGS. 25A to 25D illustrate passing positions and shapes of light fluxes corresponding to respective imaging positions illustrated in FIG. 3. FIG. 25A illustrates a light flux distribution on the first transmission surface T1 of the prism PM according to Example 8. FIG. 25B illustrates a light flux distribution on the first reflection surface R1. FIG. 25C illustrates a light flux distribution on the second reflection surface R2. FIG. 25O illustrates a light flux distribution on the second transmission surface T2. Here, T1X defines an X effective range of the first transmission surface T1 when measured parallel to the X cross-section, T1Y defines a Y effective range of the first transmission surface T1 when measured parallel to the Y cross-section, M1X defines an X effective range of the first reflection surface R1 when measured parallel to the X cross-section, M1Y defines a Y effective range of the first reflection surface R1 when measured parallel to the Y cross-section, M2X defines an X effective range of the second reflection surface R2 when measured parallel to the X cross-section, M2Y defines a Y effective range of the second reflection surface R2 when measured parallel to the Y cross-section, T2X defines an X effective range of the second transmission surface T2 when measured parallel to the X cross-section, and T2Y defines a Y effective range of the second transmission surface T2 when measured parallel to the when measured parallel to the Y cross-section. The effective range of each optical surface is determined at a position where the outermost part of the light flux distribution is in contact with the rectangular region in the rectangular regions of the X coordinate and the Y coordinate. Here, the X coordinate and the Y coordinate are based on a coordinate system forming each optical surface.

Example 9

Figure 26A:
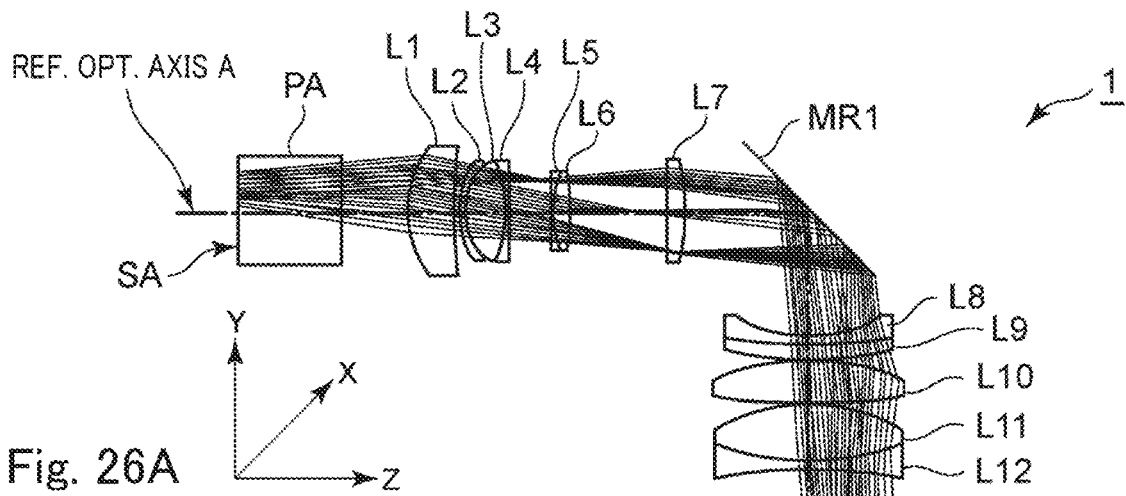
FIG. 26A is an arrangement diagram illustrating an optical system 1 according to Example 9.

FIG. 26A is an arrangement diagram illustrating an optical system 1 according to Example 9. The optical system 1 has the same optical design as that of Example 5, but the reference optical axis A is bent at a right angle in YZ-plane with a plane mirror MR1 interposed between a lens element L7 and a lens element L8. The reference light ray Ref is also bent in YZ-plane with the plane mirror MR1 interposed therebetween.

Figure 26B:
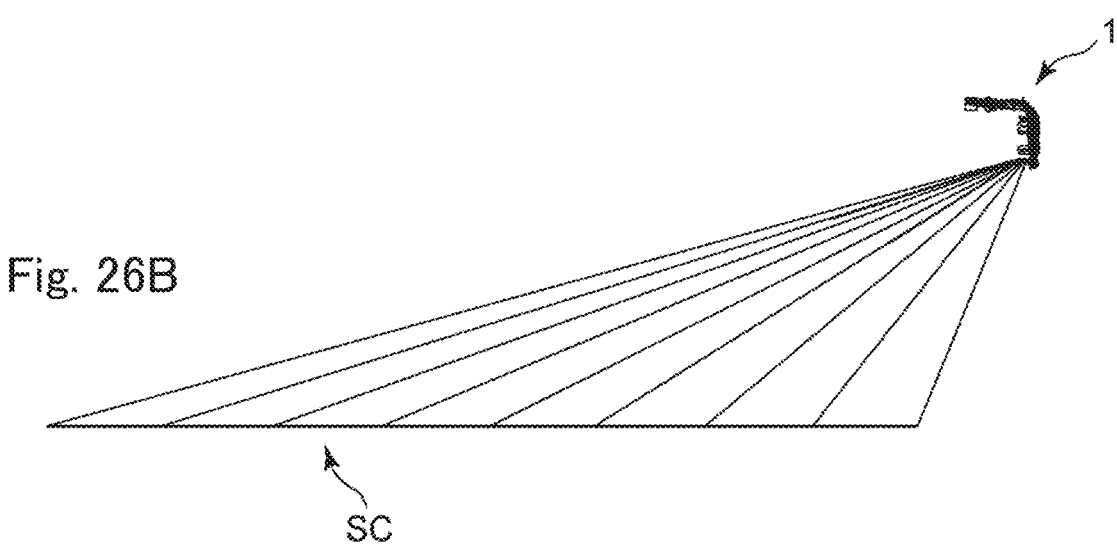
FIG. 26B is an explanatory view illustrating a usage mode of an image projection apparatus using the optical system 1 according to Example 9.

FIG. 26B is an explanatory view illustrating a usage mode of an image projection apparatus using the optical system 1 according to Example 9. The image projection apparatus including the optical system 1 is horizontally disposed on a support table, such as a table, or on a floor. The screen SC is installed parallel to ZX-plane at a position away from the support table by a relatively short horizontal distance, e.g. 0.6 m. The light generated from the optical system 1 is projected in an oblique direction to realize projection with a shorter focal length and a larger-sized screen.

Example 10

Figure 27A:
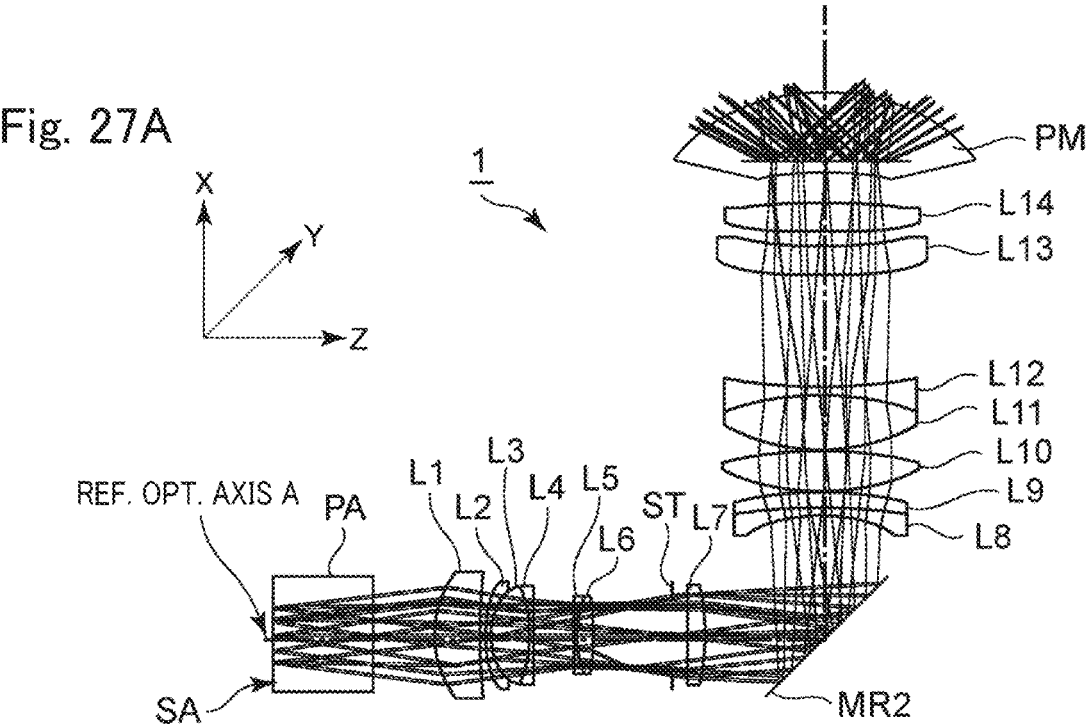
FIG. 27A is an arrangement diagram illustrating an optical system 1 according to Example 10.

FIG. 27A is an arrangement diagram illustrating an optical system 1 according to Example 10. The optical system 1 has the same optical design as that of Example 5, but a reference optical axis A is bent at a right angle in ZX-plane with a plane mirror MR2 interposed between a lens element L7 and a lens element L8. A reference light ray Ref is also bent in ZX-plane with the plane mirror MR2 interposed therebetween.

Figure 27B:
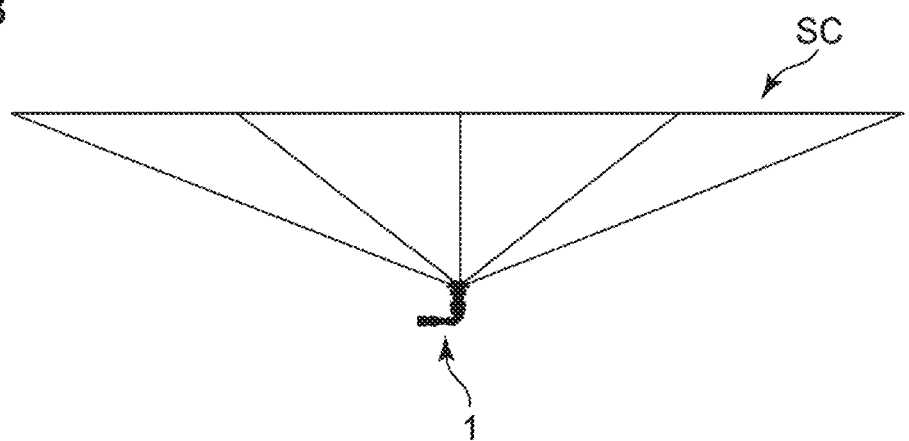
FIG. 27B is an explanatory view illustrating a usage mode of an image projection apparatus using the optical system 1 according to Example 10.

FIG. 27B is an explanatory view illustrating a usage mode of an image projection apparatus using the optical system 1 according to Example 10. The image projection apparatus including the optical system 1 is horizontally disposed on a support table, such as a table, or on a floor. The screen SC is installed parallel to YZ-plane at a position away from the support table by a relatively short horizontal distance, e.g. 0.6 m. The light generated from the optical system 1 is projected in an oblique direction to realize projection with a shorter focal length and a larger-sized screen.

The first sub-optical system included in each of Examples 1 to 7 and Examples 9 to 10 includes three or more convex lenses between the aperture stop and the reduction side conjugate point and between the aperture stop and the intermediate imaging position, respectively. In a case where the image forming element is disposed on the reduction conjugate point side, it is desirable to arrange a substantially telecentric optical system on the side of the reduction conjugate point in order to uniformly guide light from the image forming element to the first sub-optical system. In addition, in a case where light is guided to the second sub-optical system, a substantially telecentric optical system is arranged on the side of the magnification conjugate point within the first sub-optical system in order to suppress spread of light rays made incident on the second sub-optical system, thereby advantageously reducing the size of the second sub-optical system.

Furthermore, for the optical element having a power, arranged closest to the reduction conjugate point side in the first sub-optical system, a positive lens is arranged so as not to broaden the light rays on the side of the reduction conjugate point, thereby further enhancing the substantially telecentric effect.

The second reflection surface of the prism PM included in Examples 1 and 2, Examples 5 and 6, and Examples 9 and 10 is not limited to a flat surface, and may be configured of a reflection surface having a curvature. With use of such a reflection surface having a curvature, the degree of freedom in the direction on the side of the magnification conjugate point is increased, and the shape accuracy of the reflection surface can be excellently maintained at the time of processing the prism PM. Furthermore, a plane reflection mirror, obtained by applying aluminum vapor deposition to a glass substrate made planar by polishing, may be bonded onto the outside of the second reflection surface of the prism PM can be thus substituted as a second reflection surface. In that case, the second reflection surface with high plane accuracy can be obtained, and the post-processing shape accuracy of the prism PM can be kept good.

Examples 1 and 2, Examples 5 and 6, and Examples 8 to 10 each have the second reflection surface, and both the convex surfaces of the first reflection surface and the second transmission surface are arranged toward the magnification conjugate point side. With this configuration, it is possible to satisfactorily correct distortion while further reducing the height of the prism PM. In this case, it is desirable that the normal line of the second reflection surface be directed toward the magnification conjugate point side.

In the light flux distribution of the optical surface arranged closer to the magnification side with respect to the intermediate imaging position inside the prism PM included in the second sub-optical system, the light flux size of the reference light ray Ref formed at the position closest to the optical system in the magnification conjugate point on the screen SC becomes the smallest. Thus, the size of the light flux is increased in proportion to the distance between the light flux passing through the prism PM and the magnification conjugate point, so that the distortion on the magnification side and the reduction side can be favorably maintained. Furthermore, by forming each light flux distribution on the optical surface arranged on the magnification side with respect to the intermediate imaging position inside the prism PM into a substantially elliptical shape having a major axis in an azimuth projected in XY-plane in the traveling direction of each light flux, it is possible to obtain an effect of satisfactorily correcting the distortion on the magnification conjugate point side.

The prism PM has a configuration in which a reflection surface is formed on a part of a lens element or the like having an optical surface of a free-form surface shape, and at least one reflection surface is located on an optical path between the first transmission surface and the second transmission surface, so that the same effect as that of the prism PM can be obtained.

The prism PM has a configuration in which a reflection surface is formed on a part of a lens element or the like having an eccentric optical surface, and at least one reflection surface is located on an optical path between the first transmission surface and the second transmission surface, so that the same effect as that of the prism PM can be obtained.

The prism PM has a configuration in which a reflection surface is formed on a part of a lens element or the like having an optical surface of an eccentric free-form surface shape, and at least one reflection surface is located on an optical path between the first transmission surface and the second transmission surface, so that the same effect as that of the prism PM can be obtained.

Next, conditions that can be satisfied by the optical system according to the present embodiment will be described below. Note that, although a plurality of conditions are defined for the optical system according to each example, all of the plurality of conditions may be satisfied or individual conditions may be satisfied, whereby corresponding effects can be obtained.

The optical system according to the present embodiment has a reduction conjugate point on a reduction side and a magnification conjugate point on an magnification side, and internally has an intermediate imaging position that is conjugate with the reduction conjugate point and the magnification conjugate point, wherein the reduction conjugate point has an image-forming relationship in a rectangular region having a longitudinal direction and a lateral direction, wherein the optical system includes a first sub-optical system including an aperture stop defining a range in which a light flux can pass through the optical system, and a second sub-optical system provided closer to the magnification side than the first sub-optical system and including a prism formed of a transparent medium, wherein the prism has a first transmission surface located on the reduction side, a second transmission surface located on the magnification side, and at least one reflection surface located on an optical path between the first transmission surface and the second transmission surface, wherein the aperture stop is positioned between the reduction conjugate point and the intermediate imaging position, wherein a portion or whole of an intermediate image formed at the intermediate imaging position is positioned between the first transmission surface and a first reflection surface located closest to the reduction side of the at least one reflection surface, wherein the first reflection surface has a shape in which a concave surface is oriented in a direction in which light rays made incident on the first reflection surface are reflected, wherein the first sub-optical system includes a plurality of rotationally symmetric lens elements, wherein, when an axis passing through at least two centers of the rotationally symmetric lens elements is defined as a reference optical axis A, at least one optical surface among the first transmission surface, the second transmission surface, and the at least one reflection surface of the prism may be formed such that, in a plane perpendicular to the reference optical axis A, a maximum angle θmax and a minimum angle θmin in terms of an angle at which a principal ray of light rays having an image-forming relationship on a concentric circle centered on an intersection of the reference optical axis A and a reduction conjugate point of the rectangular region intersects a normal line of the plane at a position where the principal ray is made incident on the optical surface satisfy the following Expression (1).

$$45° > |\theta max| - |\theta min| > 0.014° \quad (1)$$

FIG. 30A is an XY cross-sectional view illustrating the distribution of the principal ray of the light rays at the reduction conjugate point. FIG. 30B is an arrangement diagram illustrating the optical system 1 according to Example 5, as an example. The reduction conjugate point has an image-forming relationship in a rectangular region having a longitudinal direction and a lateral direction. The principal ray of the light rays has an image-forming relationship on a concentric circle centered on the intersection of the reference optical axis A and the reduction conjugate point. In addition, the angle of intersection with the normal line of the surface at the position where the principal ray of the light rays is made incident on the optical surface changes between the maximum angle and the minimum angle. In this case the shape of the optical surface is designed such that the difference between the absolute value of the maximum angle and the absolute value of the minimum angle satisfies Expression (1).

According to such a configuration, the total length of the optical system can be shortened while the optical system disposed on the magnification side, including the reflection surface, is kept small. Furthermore, the optical performance including distortion can be excellently maintained in a wide imaging range of the magnification conjugate point. In addition, the distance between the magnification conjugate point and the optical system can be shortened. Therefore, the second sub-optical system can be downsized by using a small prism, and projection or imaging can be realized with a shorter focal length and a larger-sized screen. If exceeding the upper limit value of Expression (1), obliquely incident light rays in which a light ray is made incident on the reflection surface at an acute angle are increased, the area of the light flux is increased, and the influence of the shape accuracy of the optical surface is undesirably increased. In addition, distortion must be excessively corrected, so that it is difficult to maintain good optical performance. If falling below the lower limit value of Expression (1), the optical surface having different curvatures in the X direction and the Y direction perpendicular to the reference optical axis A cannot be utilized, thus it becomes difficult to shorten the entire length of the optical system, and an imaging range having good optical performance is narrowed at the magnification conjugate point.

FIG. 31A is an XY cross-sectional view illustrating the distribution of the principal ray of the light rays at the reduction conjugate point. FIG. 31B is a conceptual view illustrating a state on the rotationally symmetric prism optical surface in which the principal ray of the light rays is made incident on the optical surface. FIG. 31C is a conceptual view illustrating a state on the free-form surface prism optical surface in which the principal ray of the light rays is made incident on the optical surface.

In the rotationally symmetric prism optical surface illustrated in FIG. 31B, it can be seen that the angle at which the principal ray of the light rays intersects the normal line of the optical surface is always constant. Therefore, |θmax|−|θmin| in Expression (1) is zero. On the other hand, in the free-form surface prism optical surface illustrated in FIG. 31C, the angle at which the principal ray of the light rays intersects the normal line of the optical surface is not constant, and changes between the maximum angle and the minimum angle. It is found that |θmax|−|θmin| in Expression (1) is larger than zero.

FIG. 32A is an explanatory diagram illustrating arrangement of a concentric circle (radius r) and a rectangular region at the reduction conjugate point in a case where there is no optical shift. FIG. 32B is an explanatory diagram illustrating arrangement of a concentric circle (radius r) and a rectangular region at the reduction conjugate point in a case where there is an optical shift. Depending on the optical shift, the position of the concentric circle through which the principal ray of the light rays passes can be defined.

Figure 33:
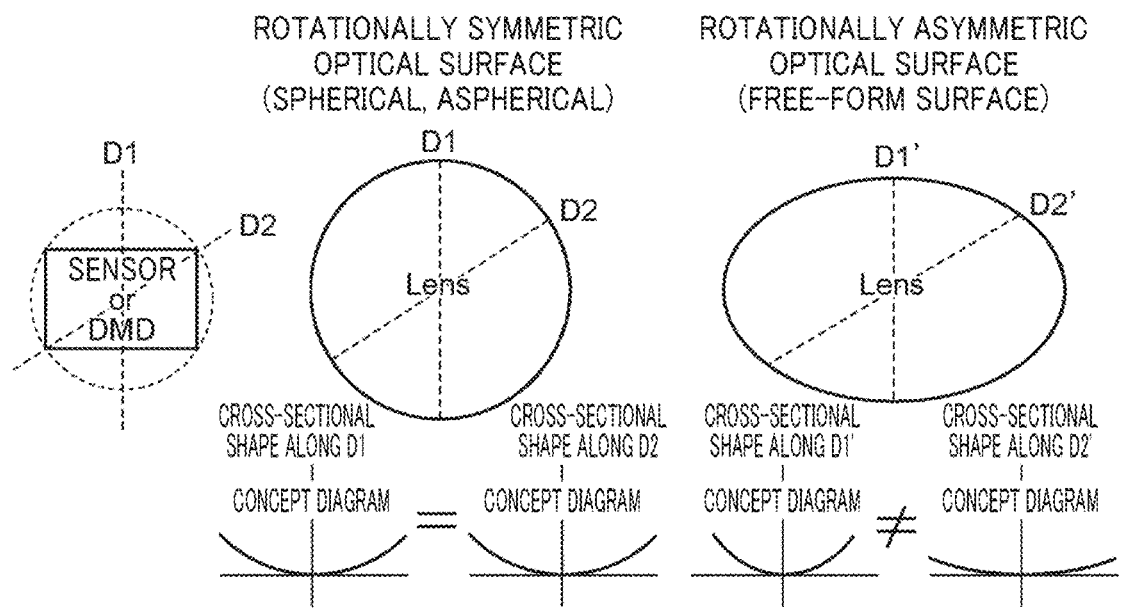
FIG. 33 is an explanatory diagram illustrating concepts of a rotationally symmetric optical surface (spherical, aspherical, or the like) and a rotationally asymmetric optical surface (free-form surface or the like).

FIG. 33 is an explanatory diagram illustrating concepts of a rotationally symmetric optical surface (spherical, aspherical, or the like) and a rotationally asymmetric optical surface (free-form surface or the like). For example, an imaging sensor, a DMD, or the like is installed at the reduction conjugate point, and has an image-forming relationship in a rectangular region having a longitudinal direction and a lateral direction. An azimuth D1 along the lateral direction of the rectangular region and an azimuth D2 along the diagonal direction of the rectangular region can be assumed.

In the rotationally symmetric optical surface, the cross-sectional shape along the azimuth D1 and the cross-sectional shape along the azimuth D2 coincide with each other. On the other hand, in the rotationally asymmetric optical surface, the cross-sectional shape along the azimuth D1 and the cross-sectional shape along the azimuth D2 do not coincide with each other.

Figure 34:
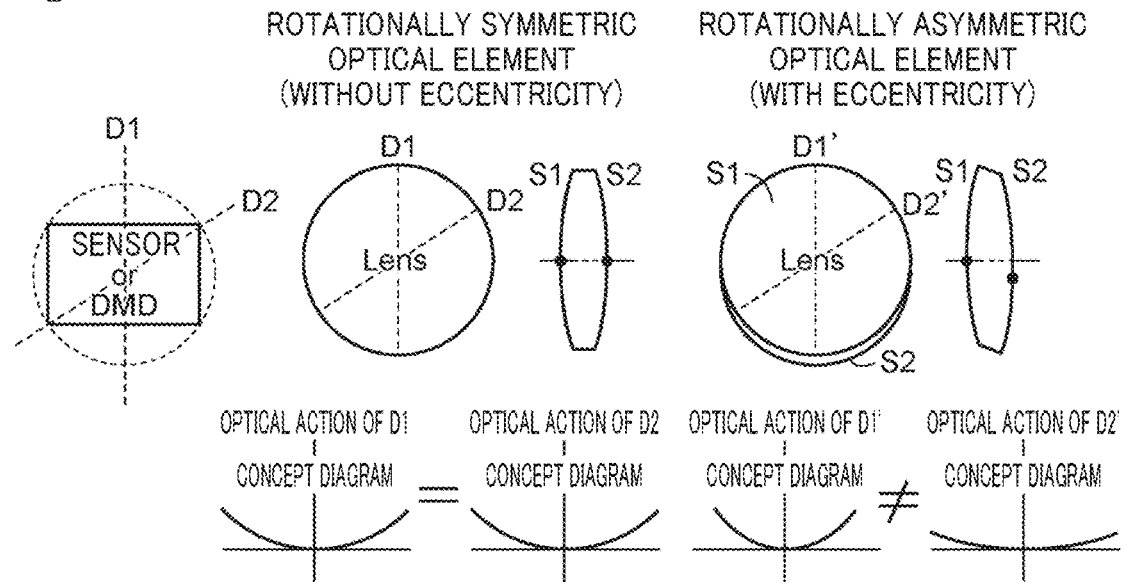
FIG. 34 is an explanatory diagram illustrating concepts of a rotationally symmetric optical element (without eccentricity) and a rotationally asymmetric optical element (with eccentricity).

FIG. 34 is an explanatory diagram illustrating concepts of a rotationally symmetric optical element (without eccentricity) and a rotationally asymmetric optical element (with eccentricity). Similarly to FIG. 33, an imaging sensor, a DMD, or the like is installed at the reduction conjugate point, and has an image-forming relationship in a rectangular region having a longitudinal direction and a lateral direction, for example. An azimuth D1 along the lateral direction of the rectangular region and an azimuth D2 along the diagonal direction of the rectangular region can be assumed.

In the rotationally symmetric optical element, the optical axes of a left side surface S1 and a right side surface S2 coincide with each other, and the optical action along the azimuth D1 and the optical action along the azimuth D2 coincide with each other. On the other hand, in the rotationally asymmetric optical element, the optical axes of the left side surface S1 and the right side surface S2 are shifted from each other, and the optical action along the azimuth D1 and the optical action along the azimuth D2 do not coincide with each other.

In the optical system according to the present embodiment, the optical surface is the second transmission surface, and the following Expression (2) may be satisfied.

$$20° > |\theta max| - |\theta min| > 0.020° \tag{2}$$

Further, the optical system may satisfy the following expression.

$$17° > |\theta max| - |\theta min| > 0.024° \tag{2a}$$

In the optical system according to the present embodiment, the optical surface is the first transmission surface, and the following Expression (3) may be satisfied.

$$10° > |\theta max| - |\theta min| > 0.020° \tag{3}$$

Further, the optical system may satisfy the following expression.

$$5.5° > |\theta max| - |\theta min| > 0.050° \tag{3a}$$

In the optical system according to the present embodiment, the optical surface is the first reflection surface, and the following Expression (4) may be satisfied.

$$2° > |\theta max| - |\theta min| > 0.014° \tag{4}$$

Further, the optical system may satisfy the following expression.

$$1.50° > |\theta max| - |\theta min| > 0.100° \tag{4a}$$

Further, the optical system may satisfy the following expression.

$$1.25° > |\theta max| - |\theta min| > 0.200° \tag{4b}$$

Further, the optical system may satisfy the following expression.

$$1.00° > |\theta max| - |\theta min| > 0.300° \tag{4c}$$

The optical system according to the present embodiment has a reduction conjugate point on a reduction side and an magnification conjugate point on an magnification side, and internally has an intermediate imaging position that is conjugate with the reduction conjugate point and the magnification conjugate point,
  wherein the reduction conjugate point has an image-forming relationship in a rectangular region having a longitudinal direction and a lateral direction,
  wherein the optical system includes a first sub-optical system including an aperture stop defining a range in which a light flux can pass through the optical system, and a second sub-optical system provided closer to the magnification side than the first sub-optical system and including a prism formed of a transparent medium,
  wherein the prism has a first transmission surface located on the reduction side, a second transmission surface located on the magnification side, and at least one reflection surface located on an optical path between the first transmission surface and the second transmission surface,
  wherein the aperture stop is positioned between the reduction conjugate point and the intermediate imaging position,
  wherein a portion or whole of an intermediate image formed at the intermediate imaging position is positioned between the first transmission surface and a first reflection surface located closest to the reduction side of the at least one reflection surface,
  wherein the first reflection surface has a shape in which a concave surface is oriented in a direction in which light rays made incident on the first reflection surface are reflected,
  wherein the first sub-optical system includes a plurality of rotationally symmetric lens elements,
  wherein, when an axis passing through centers of at least two of the rotationally symmetric lens elements is defined as a reference optical axis A, in a plane perpendicular to the reference optical axis A, the principal ray of the light rays has an image-forming relationship on a concentric circle centered on an intersection of the reference optical axis A and a reduction conjugate point of the rectangular region, and at least one optical surface among the first transmission surface, the second transmission surface, and the at least one reflection surface of the prism may satisfy the following Expression (5):

$$10 > \Delta Smax/r > 0.001 \tag{5}$$

where $\Delta Smax$ represents a maximum sag difference of a sag amount measured in a direction along the reference optical axis A on the optical surface through which the principal ray passes, and r represents a radius of the concentric circle.

In the optical system according to the present embodiment, when the optical surface through which the principal ray passes is the second transmission surface, the following Expression (6) may be satisfied.

$$10 > \Delta Smax/r > 0.001 \qquad (6)$$

In the optical system according to the present embodiment, when the optical surface through which the principal ray passes is the first transmission surface, the following Expression (7) may be satisfied.

$$3 > \Delta Smax/r > 0.001 \qquad (7)$$

In the optical system according to the present embodiment, when the optical surface through which the principal ray passes is the first reflection surface, the following Expression (8) may be satisfied.

$$1 > \Delta Smax/r > 0.001 \qquad (8)$$

Further, the optical system may satisfy the following expression.

$$0.8 > \Delta Smax/r > 0.002 \qquad (8a)$$

Further, the optical system may satisfy the following expression.

$$0.6 > \Delta Smax/r > 0.004 \qquad (8b)$$

Further, the optical system may satisfy the following expression.

$$0.4 > \Delta Smax/r > 0.006 \qquad (8c)$$

The optical system according to the present embodiment has a reduction conjugate point on a reduction side and an magnification conjugate point on an magnification side, and internally has an intermediate imaging position that is conjugate with the reduction conjugate point and the magnification conjugate point,
wherein the reduction conjugate point has an image-forming relationship in a rectangular region having a longitudinal direction and a lateral direction,
wherein the optical system includes a first sub-optical system including an aperture stop defining a range in which a light flux can pass through the optical system, and a second sub-optical system provided closer to the magnification side than the first sub-optical system and including a prism formed of a transparent medium,
wherein the prism has a first transmission surface located on the reduction side, a second transmission surface located on the magnification side, and at least one reflection surface located on an optical path between the first transmission surface and the second transmission surface,
wherein the aperture stop is positioned between the reduction conjugate point and the intermediate imaging position,
wherein a portion or whole of an intermediate image formed at the intermediate imaging position is positioned between the first transmission surface and a first reflection surface located closest to the reduction side of the at least one reflection surface,
wherein the first reflection surface has a shape in which a concave surface is oriented in a direction in which light rays made incident on the first reflection surface are reflected,
wherein the first sub-optical system includes a plurality of rotationally symmetric lens elements,
wherein, when an axis passing through centers of at least two of the rotationally symmetric lens elements is defined as a reference optical axis A, in a plane perpendicular to the reference optical axis A, the principal ray of the light ray has an image-forming relationship on a concentric circle centered on an intersection of the reference optical axis A and a reduction conjugate point of the rectangular region, and a maximum optical path length difference ΔLmax of an optical path in which the principal ray passes through the inside of the prism may satisfy the following Expression (9) using a radius r of the concentric circle.

$$3 > \Delta Lmax/r > 0.005 \qquad (9)$$

Further, the optical system may satisfy the following expression.

$$2.5 > \Delta Lmax/r > 0.002 \qquad (9a)$$

Further, the optical system may satisfy the following expression.

$$2.0 > \Delta Lmax/r > 0.004 \qquad (9b)$$

$$1.5 > \Delta Lmax/r > 0.006 \qquad (9c)$$

Further, the optical system may satisfy the following expression.

$$1.5 > \Delta Lmax/r > 0.006 \qquad (9c)$$

The maximum optical path length Lmax of the optical path in which the principal ray passes through the inside of the prism may satisfy the following expression (10) using the radius r of the concentric circle.

$$30 > Lmax/r > 2 \qquad (10)$$

According to such a configuration, the second sub-optical system can be downsized by using a small prism, and projection or imaging can be realized with a shorter focal length and a larger-sized screen. If exceeding the upper limit value of Expression (10), it is difficult to downsize the optical system arranged on the magnification side. In particular, the effective range of the second transmission surface is increased. When the prism becomes large, the molding time becomes long, and the cost increases. If falling below the lower limit value of Expression (10), it is difficult to form a necessary optical surface in order to maintain good optical performance including distortion.

The optical system according to the present embodiment may satisfy the following Expression (11):

$$2.00 > SP/LP > 0.10 \qquad (11)$$

where SP represents a distance between the reduction conjugate point and the aperture stop along a principal ray optical path of the reference light ray Ref defined as a light ray that forms an image at a position closest to the optical system in the magnification conjugate point, and LP represents a distance between the aperture stop and an magnification side end of the first sub-optical system along the principal ray optical path of the reference light ray Ref.

According to such a configuration, in the wide imaging range of the magnification conjugate point, the optical performance including distortion can be excellently maintained, and the distance between the magnification conjugate point and the optical system can be shortened. If exceeding the upper limit value of Expression (11), the optical surface having different curvatures in the X direction and the Y direction perpendicular to the reference optical axis A cannot be utilized, it becomes difficult to shorten the entire length of the optical system, and an imaging range having good optical performance is narrowed at the magnification conjugate point. If falling below the lower limit value of Expression (11), distortion is excessively corrected, and it is difficult to maintain good optical performance.

The optical system according to the present embodiment may satisfy the following Expression (12), where a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section:

$$0.20 > (XM1 - \text{RefM1})/r > -3.00 \quad (12)$$

where XM1 represents a Y coordinate of a principal ray at an X end of the first reflection surface R1 in a first reflection surface coordinate system, RefM1 represents a Y coordinate of the reference light ray Ref on the first reflection surface R1 in the first reflection surface coordinate system, and r represents a radius of the concentric circle.

According to such a configuration, spread of light rays between the first sub-optical system and the second sub-optical system can be suppressed, and the optical system disposed on the magnification side including the reflection surface can be downsized. In addition, the light rays at the reduction side conjugate point can be made substantially telecentric. If exceeding the upper limit value of Expression (12), it is difficult to suppress spread of light rays between the first sub-optical system and the second sub-optical system, and the optical system disposed on the magnification side including the reflection surface becomes larger. If falling below the lower limit value of Expression (12), an image is formed at the reduction conjugate point with oblique incidence. Therefore, for example, in a case where an image forming element, such as a DMD, is disposed on the reduction side, it is difficult to uniformly capture light rays, and optical performance of uniform brightness cannot be excellently maintained.

The optical system according to the present embodiment may satisfy the following Expression (13), where a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section:

$$1.90 > M1X/M1Y > 1.00 \quad (13)$$

where M1X represents an X effective range of the first reflection surface when measured parallel to the X cross-section, and M1Y represents a Y effective range of the first reflection surface when measured parallel to the Y cross-section.

According to such a configuration, the total length of the optical system can be shortened while the optical system disposed on the magnification side including the reflection surface is kept small. Furthermore, the optical performance including distortion can be excellently maintained in a wide imaging range of the magnification conjugate point. In addition, the distance between the magnification conjugate point and the optical system can be shortened. If exceeding the upper limit value of Expression (13), the optical surface having different curvatures in the X direction and the Y direction perpendicular to the reference optical axis A cannot be utilized, it becomes difficult to shorten the entire length of the optical system, and the imaging range having good optical performance is narrowed at the magnification conjugate point. If falling below the lower limit value of Expression (13), distortion is excessively corrected, and it is difficult to maintain good optical performance. In addition, inclination of the optical surface at the peripheral portion in the X direction becomes larger, and processing becomes difficult.

The optical system according to the present embodiment may satisfy the following Expression (14), where a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section:

$$6.00 > T2X/T2Y > 2.00 \quad (14)$$

where T2X represents an X effective range of the second transmission surface when measured parallel to the X cross-section, and T2Y represents a Y effective range of the second transmission surface when measured parallel to the Y cross-section.

According to such a configuration, the total length of the optical system can be shortened while the optical system disposed on the magnification side including the reflection surface is kept small. Furthermore, the optical performance including distortion can be excellently maintained in a wide imaging range of the magnification side conjugate point. In addition, the distance between the magnification conjugate point and the optical system can be shortened. If exceeding the upper limit value of Expression (14), distortion is excessively corrected, and it is difficult to maintain good optical performance. In addition, inclination of the optical surface at the peripheral portion in the X direction becomes larger, and processing becomes difficult. If falling below the lower limit value of Expression (14), the optical surface having different curvatures in the X direction and the Y direction perpendicular to the reference optical axis A cannot be utilized, it becomes difficult to shorten the entire length of the optical system, and the imaging range having good optical performance is narrowed at the magnification conjugate point.

In the optical system according to the present embodiment, when a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section, an optical surface having a finite radius of curvature among the optical surfaces may have a symmetrical shape only with respect to the Y cross-section.

According to such a configuration, there is no distortion from side to side (X direction), and imaging performance can be excellently maintained.

In the optical system according to the present embodiment, when a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section, in the Y cross-section, a plurality of principal rays may be included between the position where the principal ray of the reference light ray Ref is reflected by the first reflection surface and the coordinate origin position of the first reflection surface.

According to such a configuration, the total length of the optical system can be shortened while the optical system disposed on the magnification side including the reflection surface is kept small. Furthermore, the optical performance including distortion can be excellently maintained in a wide imaging range of the magnification conjugate point. In addition, the distance between the magnification conjugate point and the optical system can be shortened.

In the optical system according to the present embodiment, when a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section, at least two of the optical surfaces may be eccentric to each other in the Y cross-section.

According to such a configuration, when the optical surface is eccentric to form the prism, the degree of freedom due to the difference between the curvature of the Y cross-section and the curvature of the X cross-section is increased, and the higher-order terms of the free-form surface can be utilized. The total length of the optical system can be shortened while the optical system disposed on the magnification side is kept small. Furthermore, the optical performance including distortion can be excellently maintained in a wide imaging range of the magnification conjugate point. In addition, the distance between the magnification conjugate point and the optical system can be shortened. The optical surface is not limited to a free-form surface defined by an XY polynomial, and even an aspherical surface or a spherical surface each having a rotationally symmetric optical surface, an optical action due to different curvatures in the X and Y directions can be obtained when they are eccentric to each other in the Y cross-section.

In the optical system according to the present embodiment, when a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section, the second transmission surface may be disposed on a side opposite to a coordinate origin of the first reflection surface with respect to a principal ray of the reference optical axis A in the Y cross-section.

According to such a configuration, interference between the first sub-optical system and the magnification-side light ray can be avoided, and a smaller optical system can be configured.

In the optical system according to the present embodiment, when a plane including a position where a principal ray passing through the center in the longitudinal direction of the rectangular region is reflected by the first reflection surface is defined as a Y cross-section, and a cross-section including the reference optical axis A and perpendicular to the Y cross-section is defined as an X cross-section, the coordinate system of the first reflection surface may be inclined in a direction along the intermediate image in the Y cross-section.

According to such a configuration, the interval between the intermediate imaging position and the first reflection surface can be appropriately set. Moreover, the total length of the optical system can be shortened while the optical system disposed on the magnification side including the reflection surface is kept small. Furthermore, the optical performance including distortion can be excellently maintained in a wide imaging range of the magnification conjugate point. In addition, the distance between the magnification conjugate point and the optical system can be shortened.

In the optical system according to the present embodiment, at least one coordinate origin of the optical surface may be set on the reference optical axis A.

According to such a configuration, the optical system, the lens barrel, and the housing can be efficiently designed by aligning the origin coordinates of the optical surface with the reference optical axis A.

In the optical system according to the present embodiment, both the first reflection surface and the second transmission surface may be disposed such that convex surfaces face the magnification side.

According to such a configuration, a space between the magnification conjugate point and the optical system can be secured, and the degree of freedom in installation of the optical system is increased. In addition, it is advantageous for reducing the height of the housing constituting the optical system. Furthermore, the opening can be made smaller.

A plane portion perpendicular to the reference optical axis A may be provided in a part of the outer peripheral portion of the prism.

According to such a configuration, such a flat portion serves as a reference for assembling the optical system, and the mounting and assembling accuracy can be improved.

FIGS. 35A to 35H are cross-sectional views in the Y direction illustrating various examples of the stepped structure of the prism PM according to Examples 1 to 8. Various lens elements and various prisms constituting the optical system 1 are generally attached inside a lens barrel (not illustrated) using an adhesive, a metal fitting, or the like. At that time, a highly accurate mounting structure is required to faithfully reproduce various dimensions of the optical design.

For example, an end surface PMa serving as an attachment reference is provided on a part of the outer peripheral portion of the prism PM. The end surface PMa can be formed to be a flat surface portion perpendicular to the reference optical axis Ref. On the other hand, the lens barrel is provided with a flat portion corresponding to the shape of the end surface PMa. At the time of attachment, the end surface PMa of the prism PM and the flat portion of the lens barrel are fitted to each other, so that the prism PM can be fixed to the lens barrel with high accuracy and stability.

In addition, a protective film made of a dielectric, glass, polymer, or the like may be applied to the second transmission surface T2 of the prism PM according to Examples 1 to 10. According to such a configuration, the second transmission surface T2 exposed to the outside can be protected from scratches and dirt.

Hereinafter, numerical examples of the optical system according to examples 1 to 4 are described. In each of the numerical examples, in the table, the unit of length is all "mm", and the unit of angle of view is all "°" (degree). Further, in each of the numerical examples, radius of curvature, surface interval, Nd (refractive index for d line), vd (Abbe number for d line), N550 (refractive index at a wavelength of 550 nm), eccentricity data (displacements X, Y, Z of a prism surface with respect to the previous surface and normal directions a, β, γ of the prism surface with respect to the previous surface in the optical system) are listed. Further, various data of numerical examples are calculated based on the wavelength of 550 nm. The term "variable" in the surface interval means that it can be varied depending on the size of image (e.g., 100"(inch), 80", 60", etc.) on the magnification conjugate point. Furthermore, in each of the numerical examples, the aspherical (ASP) shape is defined by the following formula, where for the aspherical coefficient, only non-zero coefficients are shown other than conic constant.

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18}$$ [Mathematical Formula 1]

where, Z is a sag height of a surface as measured in parallel to z-axis, r is a distance in the radial direction ($=\sqrt{(x^2+y^2)}$), c is a vertex curvature, k is a conic constant, and A to H are 4th to 18th order aspherical coefficients.

A free-form surface (FFS) shape is defined by the following formulas using a local Cartesian coordinate system with the vertex thereof as origin point.

$$z = \frac{cr^2}{1+\sqrt{1-(1+k)c^2r^2}} + \sum_{j=2}^{137} C_j x^m y^n$$ [Mathematical Formula 2]

$$j = \frac{(m+n)^2 + m + 3n}{2} + 1$$ [Mathematical Formula 3]

where, Z is a sag height of a surface as measured in parallel to z-axis, r is a distance in the radial direction ($=\sqrt{(x^2+y^2)}$), c is a vertex curvature, k is a conic constant, and $C_j$ is a coefficient of a monomial $X^m y^n$.

Further, in the following data table, member of ith-order of x and jth-order of y, showing a free-form surface coefficient in the polynomial formula, is expressed by the shorthand notation "X**i*Yj", For example, a notation "X2*Y" shows a free-form surface coefficient of a member of 2nd-order of x and 1st-order of y in the polynomial formula.

Numerical Example 1

Regarding the optical system of Numerical Example 1 (corresponding to Example 1), Table 1 shows lens data, Table 2 shows aspherical surface shape data of the lenses, and Table 3 shows free-form surface shape data of the prism. Table 4 shows coordinate origin positions of each of optical surfaces with respect to those of first transmission surface.

TABLE 1

| | | | | | | |
|---|---|---|---|---|---|---|
| | | | | Lens data | | |
| | SURF. NO. | | | RAD. OF CURVTURE | SURFACE INTERVAL | MATERIAL Nd vd |
| REDUC. SIDE (IMG. FORM. ELEMENT) | 1 | | | | 0.000 | |
| PA | 2 | | | | 28.000 | 1.51852 64.20 |
| | 3 | | | | 4.845 | |
| L1 | 4 | ASPHERE | | 23.640 | 12.201 | 1.69358 31.31 |
| | 5 | ASPHERE | | 163.544 | 7.188 | |
| L2 | 6 | | | 22.233 | 1.000 | 2.00898 25.46 |
| L3 | 7 | | | 14.424 | 8.820 | 1.49830 81.61 |
| L4 | 8 | | | −30.935 | 0.700 | 2.01080 28.27 |
| | 9 | | | −1777.925 | 0.100 | |
| L5 | 10 | | | 51.743 | 5.290 | 1.59710 67.73 |
| L6 | 11 | | | −22.989 | 3.247 | 1.72672 29.28 |
| | 12 | | | 168.845 | 9.618 | |
| L7 | 13 | | | 966.870 | 2.087 | 1.74283 32.33 |
| L8 | 14 | | | 18.457 | 7.131 | 1.76098 27.58 |
| | 15 | | | −54.216 | 0.100 | |
| STOP ST | 16 | | | | 15.000 | |
| L9 | 17 | | | 266.838 | 4.870 | 1.74553 28.24 |
| L10 | 18 | | | −25.551 | 12.749 | 1.74283 32.33 |
| | 19 | | | −75.949 | 1.475 | |
| L11 | 20 | | | −33.438 | 1.186 | 1.73704 51.51 |
| L12 | 21 | | | 150.101 | 5.344 | 1.74114 31.99 |
| | 22 | | | −75.102 | 17.816 | |
| L13 | 23 | | | 70.603 | 10.705 | 1.45758 90.27 |
| | 24 | | | −197.269 | 0.609 | |
| L14 | 25 | | | 37.822 | 9.458 | 1.48897 70.40 |
| | 26 | | | 1951.385 | 2.021 | |
| L15 | 27 | | | −140.596 | 1.616 | 1.76098 27.58 |
| L16 | 28 | | | 33.775 | 10.236 | 1.48895 70.03 |
| | 29 | | | −361.326 | 15.628 | |
| L17 | 30 | ASPHERE | | 244.665 | 5.622 | 1.74641 27.71 |
| | 31 | ASPHERE | | 60.187 | 5.022 | |
| L18 | 32 | ASPHERE | | −2112.796 | 7.275 | 1.56727 52.96 |
| | 33 | ASPHERE | | −52.924 | 7.034 | |
| T1 | 34 | FREE-FORM | | 20.589 | −25.580 | 1.54190 59.46 |
| R1 | 35 | FREE-FORM | REF. SURF. | −69.352 | −13.027 | 1.54190 59.46 |

TABLE 1-continued

| | | Lens data | | | | | |
|---|---|---|---|---|---|---|---|
| R2 | 36 | | REF. SURF. | ∞ (infinity) | 16.525 | 1.54190 | 59.46 |
| T1 | 37 | FREE-FORM | | −46.274 | 558.771 | | |
| MAG. SIDE (SCREEN) | 38 | | | | | | |

| | | ECCENTRICITY DATA | | | |
|---|---|---|---|---|---|
| SURF. NO. | X | Y | Z | α | β | γ |
| 1 | 0.000 | −1.500 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | 0.000 | 0.000 | 0.000 | 0.000 | 0.000 |
| 35 | 0.000 | −77.942 | 0.000 | −23.522 | 0.000 | 0.000 |
| 36 | 0.000 | 96.437 | 0.000 | 23.522 | 0.000 | 0.000 |
| 37 | 0.000 | 15.190 | 0.000 | 36.387 | 0.000 | 0.000 |
| 38 | 0.000 | −362.357 | 0.000 | −36.387 | 0.000 | 0.000 |

| SIZE OF REDUC. SIDE | | SIZE OF MAG. SIDE |
|---|---|---|
| X | 14.516 | 148 inches |
| Y | 9.072 | |
| F-number | 2.000 | |
| CONCENTRIC CIRCLE (RADIUS r) | 7.411 | |

TABLE 2

| Aspherical (ASP) shape | | | |
|---|---|---|---|
| | SURF. NO. | | |
| | 4 | 5 | 30 |
| Y RAD. OF CURV. | 23.640 | 163.544 | 244.665 |
| CONIC CONST. | −5.4882E−01 | 0.0000E+00 | 0.0000E+00 |
| 4th | −2.7759E−07 | 9.8198E−06 | 1.5164E−05 |
| 6th | −2.1728E−08 | −2.7176E−08 | −1.4803E−08 |
| 8th | 1.9017E−11 | −1.0097E−10 | 1.6813E−11 |
| 10th | −1.2832E−13 | 1.5850E−13 | −9.7800E−15 |
| 12th | −3.4297E−16 | −1.9899E−16 | −1.7306E−18 |
| 14th | 1.5056E−18 | −5.0616E−18 | −4.9402E−21 |

TABLE 2-continued

| Aspherical (ASP) shape | | | |
|---|---|---|---|
| 16th | −5.1930E−21 | 1.3672E−20 | 4.2862E−23 |
| 18th | 0.0000E+00 | 0.0000E+00 | 0.0000E+00 |
| | SURF. NO. | | |
| | 31 | 32 | 33 |
| Y RAD. OF CURV. | 60.187 | −2112.796 | −52.924 |
| CONIC CONST. | −1.2412E+01 | 0.0000E+00 | 0.0000E+00 |
| 4th | 1.8620E−06 | −6.6077E−06 | 6.9971E−06 |
| 6th | −5.4549E−09 | 3.4714E−09 | 1.5470E−09 |
| 8th | −6.2680E−13 | 1.3479E−11 | −1.0952E−11 |

TABLE 2-continued

Aspherical (ASP) shape

| | | | |
|---|---|---|---|
| 10th | 2.2122E−15 | 1.7449E−14 | −2.1705E−14 |
| 12th | 5.0329E−18 | 1.0165E−17 | 2.3433E−17 |
| 14th | 3.1670E−20 | 9.8031E−21 | 2.0946E−19 |
| 16th | 3.7710E−23 | 2.2477E−23 | 0.0000E+00 |
| 18th | 0.0000E+00 | 0.0000E+00 | 0.0000E+00 |

TABLE 3

Free-form surface (FFS) shape

| | SURFACE NO. | | |
|---|---|---|---|
| | 34 | 35 | 37 |
| Y RAD. OF CURV. | 20.589 | −69.352 | −46.274 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| $X^{**}2$ | −4.1885E−02 | 2.4475E−03 | 1.2462E−03 |
| $X * Y$ | 0.0000E+00 | 0.0000E+00 | 0.0000E+00 |
| $Y^{**}2$ | −3.5428E−02 | 1.6119E−02 | −9.1446E−05 |
| $X^{**}3$ | 0.0000E+00 | 0.0000E+00 | 0.0000E+00 |
| $X^{**}2 * Y$ | −3.5262E−04 | −1.3104E−05 | −4.3691E−05 |
| $X Y^{**}2$ | 0.0000E+00 | 0.0000E+00 | 0.0000E+00 |
| $Y^{**}3$ | 3.2228E−04 | −1.9989E−04 | −8.0218E−05 |
| $X^{**}4$ | 5.6423E−05 | 1.0191E−06 | 9.9763E−08 |
| $X^{**}3 * Y$ | 0.0000E+00 | 0.0000E+00 | 0.0000E+00 |
| $X^{**}2 * Y^{**}2$ | −1.3435E−05 | −3.6819E−06 | −1.4962E−06 |
| $X * Y^{**}3$ | 0.0000E+00 | 0.0000E+00 | 0.0000E+00 |
| $Y^{**}4$ | 1.9230E−05 | 3.3060E−06 | −1.2041E−06 |
| $X^{**}5$ | 0.0000E+00 | 0.0000E+00 | 0.0000E+00 |
| $X^{**}4 * Y$ | 1.8890E−06 | 9.4134E−09 | −1.2846E−08 |
| $X^{**}3 * Y^{**}2$ | 0.0000E+00 | 0.0000E+00 | 0.0000E+00 |
| $X^{**}2 * Y^{**}3$ | −3.3514E−06 | 4.6533E−08 | −1.1310E−08 |
| $X * Y^{**}4$ | 0.0000E+00 | 0.0000E+00 | 0.0000E+00 |
| $Y^{**}5$ | 1.8464E−07 | −2.1638E−08 | −4.0665E−08 |
| $X^{**}6$ | −3.9714E−07 | 2.8470E−09 | −4.9033E−11 |
| $X^{**}5 * Y$ | 0.0000E+00 | 0.0000E+00 | 0.0000E+00 |
| $X^{**}4 * Y^{**}2$ | −7.6403E−07 | 1.7307E−09 | −8.7616E−10 |
| $X^{**}3 * Y^{**}3$ | 0.0000E+00 | 0.0000E+00 | 0.0000E+00 |
| $X^{**}2 * Y^{**}4$ | −2.0128E−07 | 2.9834E−10 | −1.2454E−09 |
| $X * Y^{**}5$ | 0.0000E+00 | 0.0000E+00 | 0.0000E+00 |
| $Y^{**}6$ | −6.0419E−08 | −1.6056E−11 | 7.4300E−10 |
| $X^{**}7$ | 0.0000E+00 | 0.0000E+00 | 0.0000E+00 |
| $X^{**}6 * Y$ | −4.9115E−08 | 1.4778E−10 | −2.5621E−11 |
| $X^{**}5 * Y^{**}2$ | 0.0000E+00 | 0.0000E+00 | 0.0000E+00 |
| $X^{**}4 * Y^{**}3$ | −3.9977E−08 | −7.3244E−11 | −8.6215E−11 |
| $X^{**}3 * Y^{**}4$ | 0.0000E+00 | 0.0000E+00 | 0.0000E+00 |
| $X^{**}2 * Y^{**}5$ | 1.1684E−08 | 1.9077E−12 | 0.0000E+00 |
| $X * Y^{**}6$ | 0.0000E+00 | 0.0000E+00 | 0.0000E+00 |
| $Y^{**}7$ | 1.4863E−09 | 6.0110E−13 | 0.0000E+00 |
| $X^{**}8$ | 3.8864E−10 | −5.7780E−11 | 0.0000E+00 |
| $X^{**}7 * Y$ | 0.0000E+00 | 0.0000E+00 | 0.0000E+00 |
| $X^{**}6 * Y^{**}2$ | −2.9960E−09 | 6.3389E−13 | 0.0000E+00 |
| $X^{**}5 * Y^{**}3$ | 0.0000E+00 | 0.0000E+00 | 0.0000E+00 |
| $X^{**}4 * Y^{**}4$ | −5.6010E−10 | 8.9959E−13 | 0.0000E+00 |
| $X^{**}3 * Y^{**}5$ | 0.0000E+00 | 0.0000E+00 | 0.0000E+00 |

TABLE 3-continued

Free-form surface (FFS) shape

| | SURFACE NO. | | |
|---|---|---|---|
| | 34 | 35 | 37 |
| $X^{**}2 * Y^{**}6$ | 3.0872E−10 | −3.6558E−13 | 0.0000E+00 |
| $X * Y^{**}7$ | 0.0000E+00 | 0.0000E+00 | 0.0000E+00 |
| $Y^{**}8$ | 8.8320E−11 | 1.2558E−15 | 0.0000E+00 |
| $X^{**}9$ | 0.0000E+00 | 0.0000E+00 | 0.0000E+00 |
| $X^{**}8 * Y$ | 6.9722E−11 | 3.6903E−13 | 0.0000E+00 |
| $X^{**}7 * Y^{**}2$ | 0.0000E+00 | 0.0000E+00 | 0.0000E+00 |
| $X^{**}6 * Y^{**}3$ | −1.5558E−10 | 8.6180E−15 | 0.0000E+00 |
| $X^{**}5 * Y^{**}4$ | 0.0000E+00 | 0.0000E+00 | 0.0000E+00 |
| $X^{**}4 * Y^{**}5$ | 5.2994E−11 | −9.0027E−15 | 0.0000E+00 |
| $X^{**}3 * Y^{**}6$ | 0.0000E+00 | 0.0000E+00 | 0.0000E+00 |
| $X^{**}2 * Y^{**}7$ | −1.0799E−11 | 4.3654E−15 | 0.0000E+00 |
| $X * Y^{**}8$ | 0.0000E+00 | 0.0000E+00 | 0.0000E+00 |
| $Y^{**}9$ | −2.9822E−12 | −2.1695E−17 | 0.0000E+00 |
| $X^{**}10$ | 5.1353E−13 | −4.9231E−14 | 0.0000E+00 |
| $X^{**}9 * Y$ | 0.0000E+00 | 0.0000E+00 | 0.0000E+00 |
| $X^{**}8 * Y^{**}2$ | 1.5077E−12 | 1.1525E−14 | 0.0000E+00 |
| $X^{**}7 * Y^{**}3$ | 0.0000E+00 | 0.0000E+00 | 0.0000E+00 |
| $X^{**}6 * Y^{**}4$ | −6.5078E−12 | −9.8054E−16 | 0.0000E+00 |
| $X^{**}5 * Y^{**}5$ | 0.0000E+00 | 0.0000E+00 | 0.0000E+00 |
| $X^{**}4 * Y^{**}6$ | −5.9960E−13 | 9.4822E−17 | 0.0000E+00 |
| $X^{**}3 * Y^{**}7$ | 0.0000E+00 | 0.0000E+00 | 0.0000E+00 |
| $X^{**}2 * Y^{**}8$ | −1.6619E−12 | −1.5563E−17 | 0.0000E+00 |
| $X * Y^{**}9$ | 0.0000E+00 | 0.0000E+00 | 0.0000E+00 |
| $Y^{**}10$ | −4.4198E−13 | 3.8976E−20 | 0.0000E+00 |

TABLE 4

Coordinate origin positions of each of optical surfaces with respect to those of first transmission surface

| | | X | Y | Z | α | β | γ |
|---|---|---|---|---|---|---|---|
| 34 | 1ST TRANS. SURF. | 0.000 | 0.000 | 0.000 | 0.000 | 0.000 | 0.000 |
| 35 | 1ST REF. SURF. | 0.000 | −77.942 | −25.580 | −23.522 | 0.000 | 0.000 |
| 36 | 2ND REF. SURF. | 0.000 | 15.680 | 0.964 | 0.000 | 0.000 | 0.000 |
| 37 | 2ND TRANS. SURF. | 0.000 | 30.870 | 17.489 | 36.388 | 0.000 | 0.000 |

Numerical Example 2

Regarding the optical system of Numerical Example 2 (corresponding to Example 2), Table 5 shows lens data, Table 6 shows aspherical surface shape data of the lenses, and Table 7 shows free-form surface shape data of the prism. Table 8 shows coordinate origin positions of each of optical surfaces with respect to those of first transmission surface.

TABLE 5

Lens data

| SURF. NO. | RAD. OF CURVTURE | SURFACE INTERVAL | MATERIAL | |
|---|---|---|---|---|
| | | | Nd | vd |
| REDUC. SIDE (IMG. FORM. ELEMENT) PA | 1 | | 0.000 | |
| | 2 | | 28.202 | 1.51852 64.20 |
| | 3 | | 23.256 | |

TABLE 5-continued

| | | | Lens data | | | |
|---|---|---|---|---|---|---|
| L1 | 4 | ASPHERE | −948.096 | 3.401 | 1.69945 | 56.11 |
| | 5 | ASPHERE | −80.612 | 0.100 | | |
| L2 | 6 | | 44.796 | 4.459 | 1.95693 | 17.98 |
| | 7 | | −411.082 | 1.839 | | |
| L3 | 8 | | 628.338 | 0.757 | 1.61584 | 27.04 |
| | 9 | | 264.992 | 0.272 | | |
| L4 | 10 | | 80.827 | 3.609 | 1.64278 | 60.20 |
| | 11 | | −254.749 | 0.118 | | |
| L5 | 12 | | 33.729 | 10.494 | 1.67483 | 65.13 |
| L6 | 13 | | −24.707 | 0.700 | 1.73519 | 22.70 |
| | 14 | | 16.710 | 5.870 | | |
| STOP ST | 15 | | | 7.701 | | |
| L7 | 16 | | −16.736 | 0.700 | 1.71540 | 23.44 |
| L8 | 17 | | 21.790 | 5.089 | 1.69944 | 56.18 |
| | 18 | | −28.551 | 0.100 | | |
| L9 | 19 | | −34890.621 | 3.263 | 1.62088 | 63.85 |
| | 20 | | −61.961 | 33.007 | | |
| L10 | 21 | | 92.442 | 9.915 | 1.86204 | 24.80 |
| | 22 | | −84.262 | 0.840 | | |
| | 23 | | −73.326 | 0.700 | 1.59425 | 68.37 |
| | 24 | | −1208.954 | 0.121 | | |
| L12 | 25 | | 53.063 | 7.564 | 2.00898 | 25.46 |
| | 26 | | 170.419 | 25.766 | | |
| L13 | 27 | | −78.231 | 0.704 | 1.43798 | 95.10 |
| | 28 | | 26.704 | 16.016 | | |
| L14 | 29 | ASPHERE | 28.451 | 10.097 | 1.80768 | 46.59 |
| | 30 | | −314.698 | 0.128 | | |
| L15 | 31 | | 98.248 | 6.405 | 1.64278 | 60.20 |
| | 32 | | −106.344 | 0.131 | | |
| L16 | 33 | | −695.963 | 2.528 | 2.00826 | 29.13 |
| | 34 | ASPHERE | −214.531 | 0.144 | | |
| L17 | 35 | | 25.686 | 0.700 | 1.90832 | 21.35 |
| L18 | 36 | | 14.393 | 14.015 | 1.69812 | 59.08 |
| | 37 | | −48.463 | 0.225 | | |
| L19 | 38 | | −44.404 | 0.700 | 1.75843 | 25.05 |
| | 39 | | 55.877 | 3.219 | | |
| L20 | 40 | | −66.891 | 0.742 | 1.75843 | 25.05 |
| | 41 | | 35.250 | 1.890 | | |
| L21 | 42 | | 43.691 | 5.212 | 1.64278 | 60.20 |
| | 43 | | −37.989 | 11.153 | | |
| L22 | 44 | | 689.032 | 3.615 | 1.95693 | 17.98 |
| | 45 | | −38.665 | 11.575 | | |
| L23 | 46 | | −36.458 | 0.700 | 1.85416 | 23.78 |
| | 47 | | −268.652 | 0.961 | | |
| L24 | 48 | | 53.834 | 4.715 | 1.63458 | 63.77 |
| | 49 | | −189.526 | 0.221 | | |
| L25 | 50 | | 37.841 | 6.054 | 1.69945 | 56.11 |
| | 53 | | −992.466 | 0.960 | | |
| L26 | 52 | | −135.450 | 0.700 | 1.95693 | 17.98 |
| | 53 | | 48.146 | 0.100 | | |
| L27 | 54 | | 36.509 | 5.544 | 1.43798 | 95.10 |
| | 55 | | 37.529 | 10.858 | | |
| L28 | 56 | ASPHERE | −400.743 | 20.887 | 2.00826 | 29.13 |
| | 57 | ASPHERE | 144.830 | 10.069 | | |
| T1 | 58 | FREE-FORM | −33.884 | −37.049 | 1.53202 | 55.84 |
| R1 | 59 | FREE-FORM | REF. SURF. | −118.565 | −27.107 | 1.53202 | 55.84 |
| R2 | 60 | | REF. SURF. | ∞ (infinity) | 39.153 | 1.53202 | 55.84 |
| T2 | 61 | FREE-FORM | | −59.858 | 231.542 | | |
| MAG. SIDE (SCREEN) | 62 | | | | | | |

| | | ECCENTRICITY DATA | | | | |
|---|---|---|---|---|---|---|
| SURF. NO. | X | Y | Z | α | β | γ |
| 1 | 0.000 | 1.565 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |

TABLE 5-continued

| | | | Lens data | | | |
|---|---|---|---|---|---|---|
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | 0.000 | 0.000 | 0.000 | 0.000 | 0.000 |
| 30 | 0.000 | 0.000 | 0.000 | 0.000 | 0.000 | 0.000 |
| 31 | 0.000 | 0.000 | 0.000 | 0.000 | 0.000 | 0.000 |
| 32 | 0.000 | 0.000 | 0.000 | 0.000 | 0.000 | 0.000 |
| 33 | 0.000 | 0.000 | 0.000 | 0.000 | 0.000 | 0.000 |
| 34 | 0.000 | 0.000 | 0.000 | 0.000 | 0.000 | 0.000 |
| 35 | 0.000 | 0.000 | 0.000 | 0.000 | 0.000 | 0.000 |
| 36 | 0.000 | 0.000 | 0.000 | 0.000 | 0.000 | 0.000 |
| 37 | 0.000 | 0.000 | 0.000 | 0.000 | 0.000 | 0.000 |
| 38 | 0.000 | 0.000 | 0.000 | 0.000 | 0.000 | 0.000 |
| 39 | 0.000 | 0.000 | 0.000 | 0.000 | 0.000 | 0.000 |
| 40 | 0.000 | 0.000 | 0.000 | 0.000 | 0.000 | 0.000 |
| 41 | 0.000 | 0.000 | 0.000 | 0.000 | 0.000 | 0.000 |
| 42 | 0.000 | 0.000 | 0.000 | 0.000 | 0.000 | 0.000 |
| 43 | 0.000 | 0.000 | 0.000 | 0.000 | 0.000 | 0.000 |
| 44 | 0.000 | 0.000 | 0.000 | 0.000 | 0.000 | 0.000 |
| 45 | 0.000 | 0.000 | 0.000 | 0.000 | 0.000 | 0.000 |
| 46 | 0.000 | 0.000 | 0.000 | 0.000 | 0.000 | 0.000 |
| 47 | 0.000 | 0.000 | 0.000 | 0.000 | 0.000 | 0.000 |
| 48 | 0.000 | 0.000 | 0.000 | 0.000 | 0.000 | 0.000 |
| 49 | 0.000 | 0.000 | 0.000 | 0.000 | 0.000 | 0.000 |
| 50 | 0.000 | 0.000 | 0.000 | 0.000 | 0.000 | 0.000 |
| 51 | 0.000 | 0.000 | 0.000 | 0.000 | 0.000 | 0.000 |
| 52 | 0.000 | 0.000 | 0.000 | 0.000 | 0.000 | 0.000 |
| 53 | 0.000 | 0.000 | 0.000 | 0.000 | 0.000 | 0.000 |
| 54 | 0.000 | 0.000 | 0.000 | 0.000 | 0.000 | 0.000 |
| 55 | 0.000 | 0.000 | 0.000 | 0.000 | 0.000 | 0.000 |
| 56 | 0.000 | 0.000 | 0.000 | 0.000 | 0.000 | 0.000 |
| 57 | 0.000 | 0.000 | 0.000 | 0.000 | 0.000 | 0.000 |
| 58 | 0.000 | 0.000 | 0.000 | 0.000 | 0.000 | 0.000 |
| 59 | 0.000 | −70.875 | 0.000 | −42.543 | 0.000 | 0.000 |
| 60 | 0.000 | 7.632 | 0.000 | −2.600 | 0.000 | 0.000 |
| 61 | 0.000 | 90.386 | 0.000 | 5.147 | 0.000 | 0.000 |
| 62 | 0.000 | −84.514 | 0.000 | −50.005 | 0.000 | 0.000 |

| SIZE OF REDUC. SIDE | | SIZE OF MAG. SIDE |
|---|---|---|
| X | 14.516 | 110 inches |
| Y | −9.072 | |
| F-number | 2.041 | |
| CONCENTRIC CIRCLE (RADIUS r) | 7.425 | |

TABLE 6

| Aspherical (ASP) shape | | | |
|---|---|---|---|
| | SURF. NO. | | |
| | 4 | 5 | 29 |
| Y RAD. OF CURV. | −948.096 | −80.612 | 28.451 |
| CONIC CONST. | 0.0000E+00 | 0.0000E+00 | −3.2292E−01 |
| 4th | −7.8152E−07 | 5.2645E−07 | −1.1772E−05 |
| 6th | −5.8790E−09 | −2.3210E−09 | 5.1972E−09 |

TABLE 6-continued

| Aspherical (ASP) shape | | | |
|---|---|---|---|
| 8th | −8.3198E−12 | −1.1065E−11 | 1.3692E−11 |
| 10th | −7.9640E−14 | −6.6064E−14 | −1.3987E−15 |
| 12th | 0.0000E+00 | 0.0000E+00 | −1.7480E−16 |
| 14th | 0.0000E+00 | 0.0000E+00 | 3.3071E−19 |
| 16th | 0.0000E+00 | 0.0000E+00 | −2.0987E−22 |
| 18th | 0.0000E+00 | 0.0000E+00 | 0.0000E+00 |

TABLE 6-continued

Aspherical (ASP) shape

| | SURF. NO. | | |
|---|---|---|---|
| | 34 | 56 | 57 |
| Y RAD. OF CURV. | −214.531 | −400.743 | 144.830 |
| CONIC CONST. | 0.0000E+00 | 0.0000E+00 | 0.0000E+00 |
| 4th | 2.3860E−05 | 2.0560E−05 | 4.8255E−06 |
| 6th | −3.6426E−08 | −2.1909E−08 | −1.4037E−08 |
| 8th | 7.6424E−11 | 2.1111E−11 | 2.8128E−11 |
| 10th | 6.4978E−14 | −1.1991E−14 | 5.3867E−15 |
| 12th | −3.3727E−16 | 4.4943E−18 | −5.3792E−17 |
| 14th | −1.0666E−18 | −5.8270E−22 | −2.8504E−20 |
| 16th | 2.1447E−21 | 1.2992E−24 | 1.1835E−22 |
| 18th | 0.0000E+00 | 0.0000E+00 | 0.0000E+00 |

TABLE 7

Free-form surface (FFS) shape

| | SURFACE NO. | | |
|---|---|---|---|
| | 58 | 59 | 61 |
| Y RAD. OF CURV. | −33.884 | −118.565 | −59.858 |
| CONIC CONST. | 0.0000E+00 | −5.9097E−01 | 0.0000E+00 |
| X | 0.0000E+00 | 0.0000E+00 | 0.0000E+00 |
| Y | 0.0000E+00 | 0.0000E+00 | 0.0000E+00 |
| $X^{**}2$ | 2.7961E−03 | 1.0045E−03 | −1.4270E−04 |
| $X * Y$ | 0.0000E+00 | 0.0000E+00 | 0.0000E+00 |
| $Y^{**}2$ | −1.1644E−03 | 1.7101E−02 | −3.5335E−04 |
| $X^{**}3$ | 0.0000E+00 | 0.0000E+00 | 0.0000E+00 |
| $X^{**}2 * Y$ | −7.8284E−05 | −7.3196E−05 | −2.4025E−06 |
| $X Y^{**}2$ | 0.0000E+00 | 0.0000E+00 | 0.0000E+00 |
| $Y^{**}3$ | −3.0204E−04 | −2.6638E−04 | −2.5118E−05 |
| $X^{**}4$ | 1.5719E−05 | −3.9465E−06 | −1.0248E−08 |
| $X^{**}3 * Y$ | 0.0000E+00 | 0.0000E+00 | 0.0000E+00 |
| $X^{**}2 * Y^{**}2$ | 4.1857E−06 | −4.8040E−06 | −5.6643E−07 |
| $X * Y^{**}3$ | 0.0000E+00 | 0.0000E+00 | 0.0000E+00 |
| $Y^{**}4$ | −5.1505E−06 | 3.4570E−06 | −3.8464E−07 |
| $X^{**}5$ | 0.0000E+00 | 0.0000E+00 | 0.0000E+00 |
| $X^{**}4 * Y$ | 1.5954E−06 | 1.4078E−07 | −4.5840E−09 |
| $X^{**}3 * Y^{**}2$ | 0.0000E+00 | 0.0000E+00 | 0.0000E+00 |
| $X^{**}2 * Y^{**}3$ | −2.4740E−07 | 6.5439E−08 | −1.9277E−09 |
| $X * Y^{**}4$ | 0.0000E+00 | 0.0000E+00 | 0.0000E+00 |
| $Y^{**}5$ | 4.1944E−07 | −2.5417E−08 | 1.7968E−08 |
| $X^{**}6$ | −6.3945E−08 | −1.0104E−09 | −2.7795E−11 |
| $X^{**}5 * Y$ | 0.0000E+00 | 0.0000E+00 | 0.0000E+00 |
| $X^{**}4 * Y^{**}2$ | −1.6349E−07 | 1.7336E−09 | −1.0812E−10 |
| $X^{**}3 * Y^{**}3$ | 0.0000E+00 | 0.0000E+00 | 0.0000E+00 |
| $X^{**}2 * Y^{**}4$ | −1.0580E−07 | 4.9318E−10 | 2.7682E−10 |
| $X * Y^{**}5$ | 0.0000E+00 | 0.0000E+00 | 0.0000E+00 |
| $Y^{**}6$ | −2.3423E−08 | −6.7386E−12 | −6.6373E−10 |
| $Y^{**}7$ | 0.0000E+00 | 0.0000E+00 | 0.0000E+00 |
| $X^{**}6 * Y$ | −4.2696E−09 | 4.2101E−11 | 4.7772E−13 |
| $X^{**}5 * Y^{**}2$ | 0.0000E+00 | 0.0000E+00 | 0.0000E+00 |
| $X^{**}4 * Y^{**}3$ | −9.6126E−09 | −1.2241E−10 | 4.6431E−13 |
| $X^{**}3 * Y^{**}4$ | 0.0000E+00 | 0.0000E+00 | 0.0000E+00 |
| $X^{**}2 * Y^{**}5$ | 3.5095E−09 | 4.1969E−12 | −2.5150E−11 |
| $X * Y^{**}6$ | 0.0000E+00 | 0.0000E+00 | 0.0000E+00 |
| $Y^{**}7$ | −5.9721E−10 | 8.9309E−13 | 4.4057E−12 |
| $X^{**}8$ | 5.2742E−11 | 5.7830E−13 | 3.1815E−15 |
| $X^{**}7 * Y$ | 0.0000E+00 | 0.0000E+00 | 0.0000E+00 |

TABLE 7-continued

Free-form surface (FFS) shape

| | SURFACE NO. | | |
|---|---|---|---|
| | 58 | 59 | 61 |
| $X^{**}6 * Y^{**}2$ | −1.6568E−11 | −1.3549E−12 | 9.3216E−14 |
| $X^{**}5 * Y^{**}3$ | 0.0000E+00 | 0.0000E+00 | 0.0000E+00 |
| $X^{**}4 * Y^{**}4$ | 7.5446E−12 | 1.3605E−12 | 6.0695E−14 |
| $X^{**}3 * Y^{**}5$ | 0.0000E+00 | 0.0000E+00 | 0.0000E+00 |
| $X^{**}2 * Y^{**}6$ | 2.8012E−10 | −4.8451E−13 | 1.1410E−12 |
| $X * Y^{**}7$ | 0.0000E+00 | 0.0000E+00 | 0.0000E+00 |
| $Y^{**}8$ | 1.6563E−11 | 2.1699E−15 | 3.1560E−13 |
| $X^{**}9$ | 0.0000E+00 | 0.0000E+00 | 0.0000E+00 |
| $X^{**}8 * Y$ | 0.0000E+00 | −1.1720E−14 | −1.0031E−15 |
| $X^{**}7 * Y^{**}2$ | 0.0000E+00 | 0.0000E+00 | 0.0000E+00 |
| $X^{**}6 * Y^{**}3$ | 0.0000E+00 | 2.5714E−14 | −2.7391E−15 |
| $X^{**}5 * Y^{**}4$ | 0.0000E+00 | 0.0000E+00 | 0.0000E+00 |
| $X^{**}4 * Y^{**}5$ | 0.0000E+00 | −1.8991E−15 | 4.2030E−15 |
| $X^{**}3 * Y^{**}6$ | 0.0000E+00 | 0.0000E+00 | 0.0000E+00 |
| $X^{**}2 * Y^{**}7$ | 0.0000E+00 | 5.8314E−15 | −1.3066E−14 |
| $X * Y^{**}8$ | 0.0000E+00 | 0.0000E+00 | 0.0000E+00 |
| $Y^{**}9$ | 0.0000E+00 | −3.6328E−17 | 4.2357E−15 |
| $X^{**}10$ | 0.0000E+00 | 5.4930E−17 | −4.4160E−19 |
| $X^{**}9 * Y$ | 0.0000E+00 | 0.0000E+00 | 0.0000E+00 |
| $X^{**}8 * Y^{**}2$ | 0.0000E+00 | 1.3468E−17 | −1.9957E−17 |
| $X^{**}7 * Y^{**}3$ | 0.0000E+00 | 0.0000E+00 | 0.0000E+00 |
| $X^{**}6 * Y^{**}4$ | 0.0000E+00 | −1.6811E−16 | −5.1964E−17 |
| $X^{**}5 * Y^{**}5$ | 0.0000E+00 | 0.0000E+00 | 0.0000E+00 |
| $X^{**}4 * Y^{**}6$ | 0.0000E+00 | −2.3847E−17 | −3.8540E−16 |
| $X^{**}3 * Y^{**}7$ | 0.0000E+00 | 0.0000E+00 | 0.0000E+00 |
| $X^{**}2 * Y^{**}8$ | 0.0000E+00 | −2.1977E−17 | −2.2976E−16 |
| $X * Y^{**}9$ | 0.0000E+00 | 0.0000E+00 | 0.0000E+00 |
| $Y^{**}10$ | 0.0000E+00 | −2.8657E−20 | −3.8231E−16 |

TABLE 8

Coordinate origin positions of each of optical surfaces with respect to those of first transmission surface

| | | X | Y | Z | α | β | γ |
|---|---|---|---|---|---|---|---|
| 59 | 1ST TRANS. SURF. | 0.000 | 0.000 | 0.000 | 0.000 | 0.000 | 0.000 |
| 59 | 1ST REF. SURF. | 0.000 | −70.875 | −37.049 | −42.543 | 0.000 | 0.000 |
| 60 | 2ND REF. SURF. | 0.000 | −46.924 | −51.861 | −45.142 | 0.000 | 0.000 |
| 61 | 2ND TRANS. SURF. | 0.000 | −10.925 | 39.827 | −39.996 | 0.000 | 0.000 |

Numerical Example 3

Regarding the optical system of Numerical Example 3 (corresponding to Example 3), Table 9 shows lens data, Table 10 shows aspherical surface shape data of the lenses, and Table 11 shows free-form surface shape data of the prism. Table 12 shows coordinate origin positions of each of optical surfaces with respect to those of first transmission surface.

TABLE 9

Lens data

| | | | | | |
|---|---|---|---|---|---|
| | | | | Material | |
| SURF. NO. | | RAD. OF CURVTURE | SURFACE INTERVAL | Nd | vd |
| REDUC. SIDE (IMG. | 1 | | 0.000 | | |

TABLE 9-continued

| | | | Lens data | | | | |
|---|---|---|---|---|---|---|---|
| FORM. ELEMENT) | | | | | | | |
| PA | 2 | | | | 25.900 | 1.51852 | 64.20 |
| | 3 | | | | 12.928 | | |
| L1 | 4 | ASPHERE | | 18.685 | 8.157 | 1.51805 | 64.06 |
| | 5 | ASPHERE | | −67.394 | 4.904 | | |
| L2 | 6 | | | 23.336 | 8.096 | 1.48897 | 70.44 |
| L3 | 7 | | | −18.588 | 1.000 | 1.81123 | 33.27 |
| L4 | 8 | | | 11.185 | 5.498 | 1.59539 | 67.00 |
| | 9 | | | −106.572 | 8.679 | | |
| STOP ST | 10 | | | | 1.012 | | |
| L5 | 11 | | | −156.126 | 5.341 | 1.81184 | 25.46 |
| L6 | 12 | | | −10.815 | 1.000 | 1.74283 | 32.33 |
| | 13 | | | −48.901 | 34.200 | | |
| L7 | 14 | | | −17.936 | 1.500 | 1.73201 | 54.67 |
| | 15 | | | −30.729 | 1.235 | | |
| L8 | 16 | | | 31.828 | 8.487 | 1.64100 | 55.45 |
| | 17 | | | 250.608 | 0.251 | | |
| L9 | 18 | | | 32.290 | 13.017 | 1.57013 | 42.84 |
| L10 | 19 | | | −58.600 | 2.000 | 1.85416 | 23.78 |
| | 20 | | | 45.496 | 10.217 | | |
| T1 | 21 | FREE-FORM | | −26.769 | 23.308 | 1.51132 | 56.47 |
| R1 | 22 | FREE-FORM | REF. SURF. | −22.631 | −24.332 | 1.51132 | 56.47 |
| T2 | 23 | FREE-FORM | | 17.334 | −774.823 | | |
| MAG. SIDE (SCREEN) | 24 | | | | | | |

| | | ECCENTRICITY DATA | | | | |
|---|---|---|---|---|---|---|
| SURF. NO. | X | Y | Z | α | β | γ |
| 1 | 0.000 | −1.000 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0,000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0,000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0,000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |

| | SIZE OF REDUC. SIDE | SIZE OF MAG. SIDE |
|---|---|---|
| X | 10.588 | 100 inches |
| Y | 5.956 | |
| F-number | 2.000 | |
| CONCENTRIC CIRCLE (RADIUS r) | 5.388 | |

TABLE 10

Aspherical (ASP) shape

| | SURF. NO. | |
|---|---|---|
| | 4 | 5 |
| Y RAD. OF CURV. | 18.685 | −67.394 |
| CONIC CONST. | 0.0000E+00 | 0.0000E+00 |
| 4th | −8.0524E−06 | 1.7615E−05 |
| 6th | 0.0000E+00 | 0.0000E+00 |
| 8th | 0.0000E+00 | 0.0000E+00 |
| 10th | 0.0000E+00 | 0.0000E+00 |
| 12th | 0.0000E+00 | 0.0000E+00 |
| 14th | 0.0000E+00 | 0.0000E+00 |
| 16th | 0.0000E+00 | 0.0000E+00 |
| 18th | 0.0000E+00 | 0.0000E+00 |

TABLE 11

Free-form surface (FFS) shape

| | SURFACE NO. | | |
|---|---|---|---|
| | 21 | 22 | 23 |
| Y RAD. OF CURV. | −26.769 | −22.631 | 17.334 |
| CONIC CONST. | 0.0000E+00 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| $X^{**}2$ | 0.0000E+00 | 0.0000E+00 | 0.0000E+00 |
| $X*Y$ | 0.0000E+00 | 0.0000E+00 | 0.0000E+00 |
| $Y^{**}2$ | 0.0000E+00 | 0.0000E+00 | 0.0000E+00 |
| $X^{**}3$ | 0.0000E+00 | 0.0000E+00 | 0.0000E+00 |
| $X^{**}2*Y$ | 0.0000E+00 | 0.0000E+00 | 0.0000E+00 |
| $X\,Y^{**}2$ | 0.0000E+00 | 0.0000E+00 | 0.0000E+00 |
| $Y^{**}3$ | 0.0000E+00 | 0.0000E+00 | 0.0000E+00 |
| $X^{**}4$ | 2.1898E−04 | 1.1453E−05 | −3.1695E−05 |
| $X^{**}3*Y$ | 0.0000E+00 | 0.0000E+00 | 0.0000E+00 |
| $X^{**}2*Y^{**}2$ | 4.3539E−04 | 2.2767E−05 | −6.3449E−05 |
| $X*Y^{**}3$ | 0.0000E+00 | 0.0000E+00 | 0.0000E+00 |
| $Y^{**}4$ | 2.1834E−04 | 1.1663E−05 | −3.2089E−05 |
| $X^{**}5$ | 0.0000E+00 | 0.0000E+00 | 0.0000E+00 |
| $X^{**}4*Y$ | 0.0000E+00 | 0.0000E+00 | 0.0000E+00 |
| $X^{**}3*Y^{**}2$ | 0.0000E+00 | 0.0000E+00 | 0.0000E+00 |
| $X^{**}2*Y^{**}3$ | 0.0000E+00 | 0.0000E+00 | 0.0000E+00 |
| $X*Y^{**}4$ | 0.0000E+00 | 0.0000E+00 | 0.0000E+00 |
| $Y^{**}5$ | 0.0000E+00 | 0.0000E+00 | 0.0000E+00 |
| $X^{**}6$ | −8.9338E−07 | 7.7831E−08 | 2.6821E−07 |
| $X^{**}5*Y$ | 0.0000E+00 | 0.0000E+00 | 0.0000E+00 |
| $X^{**}4*Y^{**}2$ | −2.6813E−06 | 2.3322E−07 | 8.1753E−07 |
| $X^{**}3*Y^{**}3$ | 0.0000E+00 | 0.0000E+00 | 0.0000E+00 |
| $X^{**}2*Y^{**}4$ | −2.6160E−06 | 2.3692E−07 | 8.1605E−07 |
| $X*Y^{**}5$ | 0.0000E+00 | 0.0000E+00 | 0.0000E+00 |
| $Y^{**}6$ | −9.0224E−07 | 7.3632E−08 | 2.8347E−07 |
| $X^{**}7$ | 0.0000E+00 | 0.0000E+00 | 0.0000E+00 |
| $X^{**}6*Y$ | 0.0000E+00 | 0.0000E+00 | 0.0000E+00 |
| $X^{**}5*Y^{**}2$ | 0.0000E+00 | 0.0000E+00 | 0.0000E+00 |
| $X^{**}4*Y^{**}3$ | 0.0000E+00 | 0.0000E+00 | 0.0000E+00 |
| $X^{**}3*Y^{**}4$ | 0.0000E+00 | 0.0000E+00 | 0.0000E+00 |
| $X^{**}2*Y^{**}5$ | 0.0000E+00 | 0.0000E+00 | 0.0000E+00 |
| $X*Y^{**}6$ | 0.0000E+00 | 0.0000E+00 | 0.0000E+00 |

TABLE 11-continued

Free-form surface (FFS) shape

| | SURFACE NO. | | |
|---|---|---|---|
| | 21 | 22 | 23 |
| $Y^{**}7$ | 0.0000E+00 | 0.0000E+00 | 0.0000E+00 |
| $X^{**}8$ | 2.4383E−09 | −3.6144E−10 | −1.0157E−09 |
| $X^{**}7*Y$ | 0.0000E+00 | 0.0000E+00 | 0.0000E+00 |
| $X^{**}6*Y^{**}2$ | 9.7667E−09 | −1.4163E−09 | −3.9768E−09 |
| $X^{**}5*Y^{**}3$ | 0.0000E+00 | 0.0000E+00 | 0.0000E+00 |
| $X^{**}4*Y^{**}4$ | 1.4413E−08 | −2.1863E−09 | −6.3807E−09 |
| $X^{**}3*Y^{**}5$ | 0.0000E+00 | 0.0000E+00 | 0.0000E+00 |
| $X^{**}2*Y^{**}6$ | 9.3686E−09 | −1.4370E−09 | −4.1627E−09 |
| $X*Y^{**}7$ | 0.0000E+00 | 0.0000E+00 | 0.0000E+00 |
| $Y^{**}8$ | 2.5492E−09 | −3.3122E−10 | −1.1501E−09 |
| $X^{**}9$ | 0.0000E+00 | 0.0000E+00 | 0.0000E+00 |
| $X^{**}8*Y$ | 0.0000E+00 | 0.0000E+00 | 0.0000E+00 |
| $X^{**}7*Y^{**}2$ | 0.0000E+00 | 0.0000E+00 | 0.0000E+00 |
| $X^{**}6*Y^{**}3$ | 0.0000E+00 | 0.0000E+00 | 0.0000E+00 |
| $X^{**}5*Y^{**}4$ | 0.0000E+00 | 0.0000E+00 | 0.0000E+00 |
| $X^{**}4*Y^{**}5$ | 0.0000E+00 | 0.0000E+00 | 0.0000E+00 |
| $X^{**}3*Y^{**}6$ | 0.0000E+00 | 0.0000E+00 | 0.0000E+00 |
| $X^{**}2*Y^{**}7$ | 0.0000E+00 | 0.0000E+00 | 0.0000E+00 |
| $X*Y^{**}8$ | 0.0000E+00 | 0.0000E+00 | 0.0000E+00 |
| $Y^{**}9$ | 0.0000E+00 | 0.0000E+00 | 0.0000E+00 |
| $X^{**}10$ | −3.0137E−12 | 8.8554E−13 | 2.0087E−12 |
| $X^{**}9*Y$ | 0.0000E+00 | 0.0000E+00 | 0.0000E+00 |
| $X^{**}8*Y^{**}2$ | −1.5095E−11 | 4.2879E−12 | 9.2857E−12 |
| $X^{**}7*Y^{**}3$ | 0.0000E+00 | 0.0000E+00 | 0.0000E+00 |
| $X^{**}6*Y^{**}4$ | −2.9070E−11 | 8.8228E−12 | 1.9364E−11 |
| $X^{**}5*Y^{**}5$ | 0.0000E+00 | 0.0000E+00 | 0.0000E+00 |
| $X^{**}4*Y^{**}6$ | −3.0155E−11 | 8.7043E−12 | 2.1961E−11 |
| $X^{**}3*Y^{**}7$ | 0.0000E+00 | 0.0000E+00 | 0.0000E+00 |
| $X^{**}2*Y^{**}8$ | −1.4150E−11 | 4.3360E−12 | 1.0000E−11 |
| $X*Y^{**}9$ | 0.0000E+00 | 0.0000E+00 | 0.0000E+00 |
| $Y^{**}10$ | −3.3426E−12 | 8.0983E−13 | 2.4088E−12 |

TABLE 12

Coordinate origin positions of each of optical surfaces with respect to those of first transmission surface

| | | X | Y | Z | α | β | γ |
|---|---|---|---|---|---|---|---|
| 21 | 1ST TRANS. SURF. | 0.000 | 0.000 | 0.000 | 0.000 | 0.000 | 0.000 |
| 22 | 1ST REF. SURF. | 0.000 | 0.000 | 23.308 | 0.000 | 0.000 | 0.000 |
| 23 | 2ND TRANS. SURF. | 0.000 | 0.000 | −1.024 | 0.000 | 0.000 | 0.000 |

Numerical Example 4

Regarding the optical system of Numerical Example 4 (corresponding to Example 4), Table 13 shows lens data, Table 14 shows aspherical surface shape data of the lenses, and Table 15 shows free-form surface shape data of the prism. Table 16 shows coordinate origin positions of each of optical surfaces with respect to those of first transmission surface.

TABLE 13

Lens data

| SURF. NO. | RAD. OF CURVTURE | SURFACE INTERVAL | MATERIAL | |
|---|---|---|---|---|
| | | | Nd | vd |
| REDUC. SIDE (IMG. FORM. ELEMENT) PA | 1 | | 0.000 | | |
| | 2 | | 25.900 | 1.51852 | 64.20 |
| | 3 | | 12.928 | | |

TABLE 13-continued

Lens data

| | | | | | | |
|---|---|---|---|---|---|---|
| L1 | 4 | ASPHERE | 17.176 | 9.324 | 1.51132 | 56.47 |
| | 5 | ASPHERE | −51.764 | 3.184 | | |
| L2 | 6 | | 15.978 | 7.422 | 1.48897 | 70.44 |
| L3 | 7 | | −17.759 | 1.000 | 1.81184 | 25.46 |
| L4 | 8 | | 9.030 | 6.991 | 1.59625 | 35.31 |
| | 9 | | 72.383 | 5.536 | | |
| STOP ST | 10 | | | 0.332 | | |
| L5 | 11 | | −313.589 | 5.046 | 1.81554 | 22.76 |
| L6 | 12 | | −9.242 | 1.000 | 1.73517 | 32.23 |
| | 13 | | −51.104 | 23.948 | | |
| L7 | 14 | | −13.804 | 1.000 | 1.73201 | 54.67 |
| | 15 | | −28.927 | 1.831 | | |
| L8 | 16 | | 36.886 | 10.295 | 1.58446 | 40.89 |
| | 17 | | −232.997 | 2.188 | | |
| L9 | 18 | | 29.993 | 14.346 | 1.57013 | 42.84 |
| L10 | 19 | | −50.152 | 1.500 | 1.87876 | 20.02 |
| | 20 | | 77.826 | 11.840 | | |
| T1 | 21 | FREE-FORM | −26.093 | 25.000 | 1.51132 | 56.47 |
| R1 | 22 | FREE-FORM | REF. SURF. | −21.829 | −24.647 | 1.51132 | 56.47 |
| T2 | 23 | FREE-FORM | | 19.250 | −620.000 | | |
| MAG. SIDE (SCREEN) | 24 | | | | | |

| | ECCENTRICITY DATA | | | | | |
|---|---|---|---|---|---|---|
| SURF. NO. | X | Y | Z | α | β | γ |
| 1 | 0.000 | −1.000 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |

| | SIZE OF REDUC. SIDE | SIZE OF MAG. SIDE |
|---|---|---|
| X | 10.588 | 99 inches |
| Y | 5.956 | |
| F-number | 2.000 | |
| CONCENTRIC CIRCLE (RADIUS r) | 5.388 | |

TABLE 14

Aspherical (ASP) shape

| | SURF. NO. | |
|---|---|---|
| | 4 | 5 |
| Y RAD. OF CURV. | 17.176 | −51.764 |
| CONIC CONST. | 0.0000E+00 | 0.0000E+00 |
| 4th | −7.1800E−06 | 2.6300E−05 |
| 6th | 3.1600E−09 | 4.6100E−09 |

TABLE 14-continued

Aspherical (ASP) shape

| | SURF. NO. | |
|---|---|---|
| | 4 | 5 |
| 8th | −2.9600E−13 | −1.1200E−11 |
| 10th | −5.4200E−14 | −8.8400E−14 |
| 12th | 0.0000E+00 | 0.0000E+00 |
| 14th | 0.0000E+00 | 0.0000E+00 |

TABLE 14-continued

Aspherical (ASP) shape

| | SURF. NO. | |
|---|---|---|
| | 4 | 5 |
| 16th | 0.0000E+00 | 0.0000E+00 |
| 18th | 0.0000E+00 | 0.0000E+00 |

TABLE 15

Free-form surface (FFS) shape

| | SURFACE NO. | | |
|---|---|---|---|
| | 21 | 22 | 23 |
| Y RAD. OF CURV. | −26.093 | −21.829 | 19.250 |
| CONIC CONST. | 0.0000E+00 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| X**2 | 0.0000E+00 | 0.0000E+00 | 0.0000E+00 |
| X * Y | 0.0000E+00 | 0.0000E+00 | 0.0000E+00 |
| Y**2 | 0.0000E+00 | 0.0000E+00 | 0.0000E+00 |
| X**3 | 0.0000E+00 | 0.0000E+00 | 0.0000E+00 |
| X**2 * Y | 0.0000E+00 | 0.0000E+00 | 0.0000E+00 |
| X Y**2 | 0.0000E+00 | 0.0000E+00 | 0.0000E+00 |
| Y**3 | 2.8362E−05 | 5.0231E−04 | −1.8745E−05 |
| X**4 | 2.2789E−04 | 1.4604E−05 | −3.0913E−05 |
| X**3 * Y | 0.0000E+00 | 0.0000E+00 | 0.0000E+00 |
| X**2 * Y**2 | 4.2407E−04 | 5.0069E−05 | −4.6641E−05 |
| X * Y**3 | 0.0000E+00 | 0.0000E+00 | 0.0000E+00 |
| Y**4 | 3.7034E−04 | 2.3844E−04 | −5.3125E−05 |
| X**5 | 0.0000E+00 | 0.0000E+00 | 0.0000E+00 |
| X**4 * Y | 0.0000E+00 | 0.0000E+00 | 0.0000E+00 |
| X**3 * Y**2 | 0.0000E+00 | 0.0000E+00 | 0.0000E+00 |
| X**2 * Y**3 | 8.6531E−06 | 2.0616E−06 | 2.5886E−06 |
| X * Y**4 | 0.0000E+00 | 0.0000E+00 | 0.0000E+00 |
| Y**5 | 4.6791E−05 | 3.7455E−05 | 1.2021E−05 |
| X**6 | −9.7438E−07 | 8.8760E−08 | 3.3999E−07 |
| X**5 * Y | 0.0000E+00 | 0.0000E+00 | 0.0000E+00 |
| X**4 * Y**2 | −2.5262E−06 | 2.6293E−07 | 8.0930E−07 |
| X**3 * Y**3 | 0.0000E+00 | 0.0000E+00 | 0.0000E+00 |
| X**2 * Y**4 | −1.2817E−06 | −5.0293E−07 | −9.1833E−09 |
| X * Y**5 | 0.0000E+00 | 0.0000E+00 | 0.0000E+00 |
| Y**6 | 4.7855E−06 | 3.2121E−06 | −1.5003E−06 |
| X**7 | 0.0000E+00 | 0.0000E+00 | 0.0000E+00 |
| X**6 * Y | 0.0000E+00 | 0.0000E+00 | 0.0000E+00 |
| X**5 * Y**2 | 0.0000E+00 | 0.0000E+00 | 0.0000E+00 |
| X**4 * Y**3 | −6.6709E−08 | −9.7742E−10 | −1.8883E−08 |
| X**3 * Y**4 | 0.0000E+00 | 0.0000E+00 | 0.0000E+00 |
| X**2 * Y**5 | −2.8204E−08 | −1.3894E−07 | 1.0055E−07 |
| X * Y**6 | 0.0000E+00 | 0.0000E+00 | 0.0000E+00 |
| Y**7 | 3.1652E−07 | 1.3426E−07 | 1.13676E−07 |
| X**8 | 2.5615E−09 | −3.3241E−10 | −1.4181E−09 |
| X**7 * Y | 0.0000E+00 | 0.0000E+00 | 0.0000E+00 |
| X**6 * Y**2 | 8.6199E−09 | −2.0208E−09 | −5.1559E−09 |
| X**5 * Y**3 | 0.0000E+00 | 0.0000E+00 | 0.0000E+00 |
| X**4 * Y**4 | 7.7244E−09 | 6.7638E−10 | −7.5249E−09 |
| X**3 * Y**5 | 0.0000E+00 | 0.0000E+00 | 0.0000E+00 |
| X**2 * Y**6 | −1.9888E−09 | −8.5595E−09 | −1.4363E−08 |
| X * Y**7 | 0.0000E+00 | 0.0000E+00 | 0.0000E+00 |
| Y**8 | 9.5195E−09 | 2.1672E−09 | −3.9605E−09 |
| X**9 | 0.0000E+00 | 0.0000E+00 | 0.0000E+00 |
| X**8 *Y | 0.0000E+00 | 0.0000E+00 | 0.0000E+00 |
| X**7 * Y**2 | 0.0000E+00 | 0.0000E+00 | 0.0000E+00 |
| X**6 * Y**3 | 2.4894E−10 | −1.4612E−11 | 3.0292E−10 |
| X**5 * Y**4 | 0.0000E+00 | 0.0000E+00 | 0.0000E+00 |
| X**4 * Y**5 | 1.2684E−10 | 3.3980E−10 | 4.7743E−10 |
| X**3 * Y**6 | 0.0000E+00 | 0.0000E+00 | 0.0000E+00 |
| X**2 * Y**7 | −4.5770E−10 | −3.9301E−11 | 6.9677E−10 |
| X * Y**8 | 0.0000E+00 | 0.0000E+00 | 0.0000E+00 |
| Y**9 | 0.0000E+00 | 0.0000E+00 | 0.0000E+00 |
| X**10 | −2.1267E−12 | 7.4942E−13 | 2.3516E−12 |
| X**9 * Y | 0.0000E+00 | 0.0000E+00 | 0.0000E+00 |
| X**8 * Y**2 | −1.1891E−11 | 5.1275E−12 | 1.0498E−11 |
| X**7 * Y**3 | 0.0000E+00 | 0.0000E+00 | 0.0000E+00 |
| X**6 * Y**4 | −2.5766E−12 | 8.0651E−12 | −2.2089E−12 |
| X**5 * Y**5 | 0.0000E+00 | 0.0000E+00 | 0.0000E+00 |
| X**4 * Y**6 | −1.4237E−11 | 1.8181E−11 | 1.1044E−12 |
| X**3 * Y**7 | 0.0000E+00 | 0.0000E+00 | 0.0000E+00 |
| X**2 * Y**8 | −1.5294E−11 | 7.9595E−12 | −1.0182E−11 |
| X * Y**9 | 0.0000E+00 | 0.0000E+00 | 0.0000E+00 |
| Y**10 | −4.1384E−12 | 3.2889E−13 | 2.7310E−12 |

TABLE 16

Coordinate origin positions of each of optical surfaces with respect to those of first transmission surface

| | | X | Y | Z | α | β | γ |
|---|---|---|---|---|---|---|---|
| 21 | 1ST TRANS. SURF. | 0.000 | 0.000 | 0.000 | 0.000 | 0.000 | 0.000 |
| 22 | 1ST REF. SURF. | 0.000 | 0.000 | 25.000 | 0.000 | 0.000 | 0.000 |
| 23 | 2ND TRANS. SURF. | 0.000 | 0.000 | 0.353 | 0.000 | 0.000 | 0.000 |

Numerical Example 5

Regarding the optical system of Numerical Example 5 (corresponding to Example 5), Table 17 shows lens data, Table 18 shows aspherical surface shape data of the lenses, and Table 19 shows free-form surface shape data of the prism. Table 20 shows coordinate origin positions of each of optical surfaces with respect to those of first transmission surface.

TABLE 17

Lens data

| | SURF. NO. | | RAD. OF CURVTURE | SURFACE INTERVAL | MATERIAL | |
|---|---|---|---|---|---|---|
| | | | | | Nd | vd |
| REDUC. SIDE (IMG. FORM. ELEMENT) | 1 | | | 0.000 | | |
| PA | 2 | | | 25.900 | 1.51680 | 64.20 |
| | 3 | | | 17.103 | | |
| L1 | 4 | ASPHERE | 23.960 | 11.520 | 1.65800 | 36.87 |
| | 5 | ASPHERE | 173.553 | 1.250 | | |
| L2 | 6 | | 23.721 | 1.000 | 2.00100 | 29.13 |

TABLE 17-continued

| Lens data | | | | | | | |
|---|---|---|---|---|---|---|---|
| L3 | 7 | | | 14.400 | 11.000 | 1.49700 | 81.61 |
| L4 | 8 | | | -32.652 | 1.400 | 2.00069 | 25.46 |
| | 9 | | | -552.166 | 9.990 | | |
| L5 | 10 | | | -314.863 | 1.000 | 2.00100 | 29.13 |
| L6 | 11 | | | 34.837 | 4.100 | 1.61800 | 63.39 |
| | 12 | | | -70.619 | 20.300 | | |
| STOP ST | 13 | | | | 4.500 | | |
| L7 | 14 | | | 824.850 | 3.900 | 1.80809 | 22.76 |
| | 15 | | | -51.387 | variable | | |
| L8 | 16 | | | -34.210 | 1.500 | 1.72916 | 54.67 |
| L9 | 17 | | | -159.343 | 4.100 | 1.94595 | 17.98 |
| | 18 | | | 90.228 | 0.400 | | |
| L10 | 19 | | | 60.310 | 10.900 | 1.94814 | 45.82 |
| | 20 | | | -119.325 | 0.300 | | |
| L11 | 21 | | | 48.869 | 14.480 | 1.49700 | 81.61 |
| L12 | 22 | | | -65.098 | 2.000 | 1.94595 | 17.98 |
| | 23 | | | 123.600 | variable | | |
| L13 | 24 | ASPHERE | | 500.000 | 7.980 | 1.92286 | 20.88 |
| | 25 | ASPHERE | | 122.774 | variable | | |
| L14 | 26 | ASPHERE | | -1000.000 | 6.600 | 1.61035 | 57.93 |
| | 27 | ASPHERE | | -179.063 | 9.370 | | |
| T1 | 28 | FREE-FORM | | 42.167 | -24.290 | 1.53996 | 59.46 |
| R1 | 29 | FREE-FORM | REF. SURF. | -71.071 = (infinity) | -13.290 16.890 | 1.53996 1.53996 | 59.46 59.46 |
| R2 | 30 | | REF. SURF. | -45.779 | variable | | |
| T2 | 31 | FREE-FORM | | | | | |
| MAG. SIDE (SCREEN) | 32 | | | | | | |

| | ECCENTRICITY DATA | | | | | |
|---|---|---|---|---|---|---|
| SURF. NO. | X | Y | Z | α | β | γ |
| 1 | 0.000 | -1.300 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0,000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | -77.380 | 0.000 | -23.450 | 0.000 | 0.000 |
| 30 | 0.000 | 97.513 | 0.000 | 23.450 | 0.000 | 0.000 |
| 31 | 0.000 | 11.530 | 0.000 | 36.600 | 0.000 | 0.000 |
| 32 | 0.000 | -376.653 | 0.000 | -36.600 | 0.000 | 0.000 |

| SIZE OF REDUC. SIDE | |
|---|---|
| X | 14.516 |
| Y | 9.072 |
| F-number | 2.500 |
| CONCENTRIC CIRCLE (RADIUS r) | 7.374 |

TABLE 17-continued

Lens data

DISPLACEMENT

| SURF. NO. | 150" | 125" | 100" |
|---|---|---|---|
| S15 | 64.610 | 64.275 | 64.089 |
| S23 | 28.480 | 28.748 | 28.759 |
| S25 | 5.100 | 5.167 | 5.342 |
| S31 | 487.825 | 354.800 | 221.500 |

TABLE 18

Aspherical (ASP) shape

| | SURF. NO. | | |
|---|---|---|---|
| | 4 | 5 | 24 |
| Y RAD. OF CURV. | 23.960 | 173.553 | 500.000 |
| CONIC CONST. | −4.7022E−01 | 0.0000E+00 | 0.0000E+00 |
| 4th | 4.3156E−07 | 7.3808E−06 | 1.4192E−05 |
| 6th | −5.1790E−09 | −1.3725E−08 | −1.5026E−08 |
| 8th | 4.0662E−12 | −7.4657E−11 | 1.6139E−11 |
| 10th | −1.1328E−13 | 1.3068E−13 | −1.0561E−14 |
| 12th | −1.9395E−16 | −3.0128E−16 | 1.7798E−18 |
| 14th | 1.5368E−18 | −5.4151E−18 | 1.9731E−21 |
| 16th | −6.2522E−21 | 1.3216E−20 | 8.6819E−25 |
| 18th | 0.0000E+00 | 0.0000E+00 | 0.0000E+00 |

| | SURF. NO. | | |
|---|---|---|---|
| | 25 | 26 | 27 |
| Y RAD. OF CURV. | 122.774 | −1000.000 | −179.063 |
| CONIC CONST. | −2.1757E+01 | 0.0000E+00 | 0.0000E+00 |
| 4th | 3.1323E−06 | −8.7753E−08 | 3.3126E−07 |
| 6th | −5.2708E−09 | 1.1703E−09 | 1.6620E−09 |
| 8th | 3.3919E−12 | 3.4219E−12 | 4.5501E−13 |
| 10th | 3.1707E−15 | 3.2899E−15 | −2.9197E−16 |
| 12th | −6.7312E−18 | −4.5968E−19 | 3.9051E−18 |
| 14th | 7.3714E−21 | −4.9760E−22 | 2.3443E−21 |
| 16th | 1.0655E−24 | 2.9521E−24 | −6.6118E−25 |
| 18th | 0.0000E+00 | −9.4296E−28 | −6.8668E−27 |

TABLE 20

Free-form surface (FFS) shape

| | SURFACE NO. | | |
|---|---|---|---|
| | 28 | 29 | 31 |
| Y RAD. OF CURV. | 42.167 | −71.071 | −45.779 |
| CONIC CONST. | 0.0000E+00 | −5.9100E+01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −2.3227E+02 | 3.4910E−03 | 8.0921E+04 |
| X * Y | 0.0000E+00 | 0.0000E+00 | 0.0000E+00 |
| Y**2 | −1.6757E−02 | 1.6171E−02 | −3.0578E−04 |
| X**3 | 0.0000E+00 | 0.0000E+00 | 0.0000E+00 |
| X**2 * Y | −2.7436E−04 | −1.5445E+05 | −3.7987E−05 |
| X Y**2 | 0.0000E+00 | 0.0000E+00 | 0.0000E+00 |
| Y**3 | 2.2761E−04 | −2.0314E+04 | −6.6502E−05 |
| X**4 | 6.1467E−05 | −8.2937E−07 | 2.1514E−08 |
| X**3 * Y | 0.0000E+00 | 0.0000E+00 | 0.0000E+00 |
| X**2 * Y**2 | 1.4486E−05 | −3.9486E−06 | −1.6068E−06 |
| X * Y**3 | 0.0000E+00 | 0.0000E+00 | 0.0000E+00 |
| Y**4 | 8.3263E−06 | 3.2574E−06 | −9.0398E−07 |
| X**5 | 0.0000E+00 | 0.0000E+00 | 0.0000E+00 |
| X**4 * Y | 3.0473E−06 | −6.1856E+11 | −7.8296E−09 |
| X**3 * Y**2 | 0.0000E+00 | 0.0000E+00 | 0.0000E+00 |
| X**2 * Y**3 | −1.8257E−06 | 4.8268E−08 | 1.4669E−08 |
| X * Y**4 | 0.0000E+00 | 0.0000E+00 | 0.0000E+00 |
| Y**5 | −3.9293E−07 | −2.1878E−08 | −2.6332E−08 |
| X**6 | −2.4088E−07 | −4.4056E−09 | −1.6914E−10 |
| X**5 * Y | 0.0000E+00 | 0.0000E+00 | 0.0000E+00 |
| X**4 * Y**2 | −3.1905E−07 | 1.9652E−09 | −2.8604E−10 |
| X**3 * Y**3 | 0.0000E+00 | 0.0000E+00 | 0.0000E+00 |
| X**2 * Y**4 | −1.0764E−07 | 2.9257E−10 | −4.0405E−10 |
| X * Y**5 | 0.0000E+00 | 0.0000E+00 | 0.0000E+00 |
| Y**6 | −2.0078E−08 | −1.4417E−11 | 9.4215E−10 |
| X**7 | 0.0000E+00 | 0.0000E+00 | 0.0000E+00 |
| X**6 * Y | −1.4528E−08 | 5.8376E−11 | −2.0978E−11 |
| X**5 * Y**2 | 0.0000E+00 | 0.0000E+00 | 0.0000E+00 |
| X**4 * Y**3 | −2.2985E−08 | −6.1511E−11 | −8.0067E−11 |
| X**3 * Y**4 | 0.0000E+00 | 0.0000E+00 | 0.0000E+00 |
| X**2 * Y**5 | 5.7129E−09 | 1.3020E−12 | 0.0000E+00 |
| X * Y**6 | 0.0000E+00 | 0.0000E+00 | 0.0000E+00 |
| Y**7 | 9.2513E−10 | 6.4071E−13 | 0.0000E+00 |
| X**8 | 2.3020E−10 | −4.3711E−12 | 0.0000E+00 |
| X**7 * Y | 0.0000E+00 | 0.0000E+00 | 0.0000E+00 |
| X**6 * Y**2 | −3.6799E−10 | 1.9493E−13 | 0.0000E+00 |
| X**5 * Y**3 | 0.0000E+00 | 0.0000E+00 | 0.0000E+00 |
| X**4 * Y**4 | −7.1765E−10 | 9.6946E−13 | 0.0000E+00 |
| X**3 * Y**5 | 0.0000E+00 | 0.0000E+00 | 0.0000E+00 |
| X**2 * Y**6 | 1.5466E−10 | −3.6367E−13 | 0.0000E+00 |
| X * Y**7 | 0.0000E+00 | 0.0000E+00 | 0.0000E+00 |
| Y**8 | 6.8585E−12 | 1.4978E−15 | 0.0000E+00 |
| X**9 | 0.0000E+00 | 0.0000E+00 | 0.0000E+00 |
| X**8 * Y | −8.8683E−13 | 1.0353E−13 | 0.0000E+00 |
| X**7 * Y**2 | 0.0000E+00 | 0.0000E+00 | 0.0000E+00 |
| X**6 * Y**3 | −1.0835E−12 | 2.3213E−14 | 0.0000E+00 |
| X**5 * Y**4 | 0.0000E+00 | 0.0000E+00 | 0.0000E+00 |
| X**4 * Y**5 | 2.0774E−13 | −9.0412E−15 | 0.0000E+00 |
| X**3 * Y**6 | 0.0000E+00 | 0.0000E+00 | 0.0000E+00 |
| X**2 * Y**7 | −8.8748E−14 | 4.4286E−15 | 0.0000E+00 |
| X * Y**8 | 0.0000E+00 | 0.0000E+00 | 0.0000E+00 |
| Y**9 | −1.1771E−14 | −2.1709E−17 | 0.0000E+00 |
| X**10 | 1.7731E−14 | −7.6362E−15 | 0.0000E+00 |
| X**9 * Y | 0.0000E+00 | 0.0000E+00 | 0.0000E+00 |
| X**8 * Y**2 | −9.1400E−14 | 1.4007E−15 | 0.0000E+00 |
| X**7 * Y**3 | 0.0000E+00 | 0.0000E+00 | 0.0000E+00 |
| X**6 * Y**4 | 7.6790E−14 | −5.4798E−16 | 0.0000E+00 |
| X**5 * Y**5 | 0.0000E+00 | 0.0000E+00 | 0.0000E+00 |
| X**4 * Y**6 | −3.4014E−14 | 6.5204E−17 | 0.0000E+00 |
| X**3 * Y**7 | 0.0000E+00 | 0.0000E+00 | 0.0000E+00 |
| X**2 * Y**8 | 4.7637E−15 | −1.5416E−17 | 0.0000E+00 |
| X * Y**9 | 0.0000E+00 | 0.0000E+00 | 0.0000E+00 |
| Y**10 | 4.4601E−18 | −3.1192E−20 | 0.0000E+00 |

TABLE 20

Coordinate origin positions of each of optical surfaces with respect to those of first transmission surface

| | | X | Y | Z | α | β | γ |
|---|---|---|---|---|---|---|---|
| 28 | 1ST TRANS. SURF. | 0.000 | 0.000 | 0.000 | 0.000 | 0.000 | 0.000 |
| 29 | 1ST REF. SURF. | 0.000 | −77.380 | −24.290 | −23.450 | 0.000 | 0.000 |

TABLE 20-continued

Coordinate origin positions of each of optical surfaces with respect to those of first transmission surface

| | | X | Y | Z | α | β | γ |
|---|---|---|---|---|---|---|---|
| 30 | 2ND REF. SURF. | 0.000 | 17.368 | 2.323 | 0.000 | 0.000 | 0.000 |
| 31 | 2ND TRANS. SURF. | 0.000 | 28.898 | 19.213 | 36.600 | 0.000 | 0.000 |

Numerical Example 6

Regarding the optical system of Numerical Example 6 (corresponding to Example 6), Table 21 shows lens data, Table 22 shows aspherical surface shape data of the lenses, and Table 23 shows free-form surface shape data of the prism. Table 24 shows coordinate origin positions of each of optical surfaces with respect to those of first transmission surface.

TABLE 21

Lens data

| | SURF. NO. | | RAD. OF CURVTURE | SURFACE INTERVAL | MATERIAL Nd | vd |
|---|---|---|---|---|---|---|
| REDUC. SIDE (IMG. FORM. ELEMENT) | 1 | | | 0.000 | | |
| PA | 2 | | | 25.900 | 1.51680 | 64.20 |
| | 3 | | | 13.638 | | |
| L1 | 4 | ASPHERE | 17.060 | 10.000 | 1.61800 | 63.39 |
| | 5 | ASPHERE | 80.120 | variable | | |
| L2 | 6 | | 15.090 | 0.700 | 2.00100 | 29.13 |
| L3 | 7 | | 9.920 | 11.400 | 1.49700 | 81.61 |
| L4 | 8 | | −20.371 | 0.700 | 1.95375 | 32.32 |
| | 9 | | 963.890 | variable | | |
| L5 | 10 | | −152.245 | 0.700 | 2.00100 | 29.13 |
| L6 | 11 | | 22.793 | 4.400 | 1.56732 | 42.84 |
| | 12 | | −48.810 | 14.000 | | |
| STOP ST | 13 | | | 1.100 | | |
| L7 | 14 | | 378.131 | 9.000 | 1.84666 | 23.78 |
| | 15 | | −33.560 | 33.190 | | |
| L8 | 16 | | −19.195 | 1.200 | 1.77250 | 49.62 |
| | 17 | | −65.610 | 0.300 | | |
| L9 | 18 | | 39.045 | 6.000 | 1.58144 | 40.89 |
| | 19 | | −132.990 | 6.240 | | |
| L10 | 20 | | 29.455 | 12.400 | 1.43700 | 95.10 |
| L11 | 21 | | −36.800 | 1.500 | 2.00272 | 19.32 |
| | 22 | | 214.536 | variable | | |
| L12 | 23 | ASPHERE | −768.012 | 9.000 | 1.92119 | 23.96 |
| | 24 | ASPHERE | 44.630 | 2.800 | | |
| L13 | 25 | | 57.218 | 8.500 | 1.62041 | 60.34 |
| | 26 | | −47.834 | variable | | |
| T1 | 27 | FREE-FORM | 81.710 | −30.763 | 1.52996 | 55.84 |
| R1 | 28 | FREE-FORM REF. SURF. | −48.193 | −19.382 | 1.52996 | 55.84 |
| R2 | 29 | FREE-FORM REF. SURF. | = (infinity) | 13.566 | 1.52996 | 55.84 |
| T2 | 30 | | −29.511 | variable | | |
| MAG. SIDE (SCREEN) | 31 | | | | | |

| | ECCENTRICITY DATA | | | | | |
|---|---|---|---|---|---|---|
| SURF. NO. | X | Y | Z | α | β | γ |
| 1 | 0.000 | −2.000 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | 0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |

TABLE 21-continued

Lens data

| | | | | | | |
|---|---|---|---|---|---|---|
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | −47.380 | 0.000 | −48.770 | 0.000 | 0.000 |
| 29 | 0.000 | 79.600 | 0.000 | 2.620 | 0.000 | 0.000 |
| 30 | 0.000 | −1.580 | 0.000 | 37.910 | 0.000 | 0.000 |
| 31 | 0.000 | −261.015 | 0.000 | −81.762 | 0.000 | 0.000 |

SIZE OF REDUC. SIDE

| | |
|---|---|
| X | 10.588 |
| Y | 6.956 |
| F-number | 2.796 |
| CONCENTRIC CIRCLE (RADIUS r) | 5.659 |

DISPLACEMENT

| SURF. NO. | 100" | 80" | 60" |
|---|---|---|---|
| S5 | 1.428 | 1.500 | 1.566 |
| S9 | 2.682 | 2.610 | 2.544 |
| S22 | 22.145 | 22.040 | 21.837 |
| S26 | 2.895 | 3.000 | 3.203 |
| S30 | 890.000 | 337.739 | −212.800 |

TABLE 22

Aspherical (ASP) shape

| | SURF. NO. | | | |
|---|---|---|---|---|
| | 4 | 5 | 23 | 24 |
| Y RAD. OF CURV. | 17.060 | 80.120 | −768.012 | 44.630 |
| CONIC CONST. | −4.3827E−01 | 0.0000E+00 | 0.0000E+00 | 1.7682E+00 |
| 4th | 4.4126E−06 | 2.3059E−05 | 5.7493E−05 | 1.9949E−05 |
| 6th | −1.4161E−08 | −1.3206E−08 | −1.5100E−07 | −6.9656E−08 |
| 8th | 1.5349E−11 | −9.5211E−10 | 3.9099E−10 | 1.9160E−10 |
| 10th | 6.9128E−14 | 3.4350E−12 | −5.9278E−13 | 2.8521E−13 |
| 12th | −1.2152E−14 | 6.7620E−15 | 3.6158E−16 | −1.4532E−15 |
| 14th | 9.0561E−17 | −2.3105E−16 | 2.1397E−19 | 6.0833E−19 |
| 16th | −3.0077E−18 | 7.0088E−19 | −2.6529E−22 | 2.7249E−21 |
| 18th | 0.0000E+00 | 0.0000E+00 | 0.0000E+00 | 0.0000E+00 |

TABLE 23

Free-form surface (FFS) shape

| | SURFACE NO. | | |
|---|---|---|---|
| | 27 | 28 | 29 |
| Y RAD. OF CURV. | 81.710 | −48.193 | −29.511 |
| CONIC CONST. | 0.0000E+00 | −5.9097E−01 | 0.0000E+00 |
| X | 0.0000E+00 | 0.0000E+00 | 0.0000E+00 |
| Y | 0.0000E+00 | 0.0000E+00 | 0.0000E+00 |
| $X^{**}2$ | 0.0000E+00 | 4.2163E−03 | 0.0000E+00 |
| $X * Y$ | 0.0000E+00 | 0.0000E+00 | 0.0000E+00 |
| $Y^{**}2$ | −3.7834E−03 | 2.3559E−02 | −1.8646E−03 |
| $X^{**}3$ | 0.0000E+00 | 0.0000E+00 | 0.0000E+00 |
| $X^{**}2 * Y$ | −4.5061E−04 | −3.7905E−05 | −4.4431E−06 |

TABLE 23-continued

Free-form surface (FFS) shape

| | SURFACE NO. | | |
|---|---|---|---|
| | 27 | 28 | 29 |
| $X Y^{**}2$ | 0.0000E+00 | 0.0000E+00 | 0.0000E+00 |
| $Y^{**}3$ | −2.4864E−04 | −5.3760E−04 | 2.8952E−06 |
| $X^{**}4$ | 2.9601E−05 | −1.8075E−06 | −3.2490E−07 |
| $X^{**}3 * Y$ | 0.0000E+00 | 0.0000E+00 | 0.0000E+00 |
| $X^{**}2 * Y^{**}2$ | −9.5001E−06 | −1.5516E−05 | 8.9302E−07 |
| $X * Y^{**}3$ | 0.0000E+00 | 0.0000E+00 | 0.0000E+00 |
| $Y^{**}4$ | −2.1195E−06 | 1.2656E−05 | 2.4827E−06 |
| $X^{**}5$ | 0.0000E+00 | 0.0000E+00 | 0.0000E+00 |
| $X^{**}4 * Y$ | 9.2859E−07 | 4.1627E−08 | −2.2883E−08 |

TABLE 23-continued

Free-form surface (FFS) shape

| | SURFACE NO. | | |
|---|---|---|---|
| | 27 | 28 | 29 |
| $X^{**}3 * Y^{**}2$ | 0.0000E+00 | 0.0000E+00 | 0.0000E+00 |
| $X^{**}2 * Y^{**}3$ | 8.0312E−07 | 3.1675E−07 | 1.7533E−07 |
| $X * Y^{**}4$ | 0.0000E+00 | 0.0000E+00 | 0.0000E+00 |
| $Y^{**}5$ | −4.0581E−07 | −1.3957E−07 | 3.1900E−08 |
| $X^{**}6$ | −3.1116E−07 | −4.8925E−08 | 7.9375E−10 |
| $X^{**}5 * Y$ | 0.0000E+00 | 0.0000E+00 | 0.0000E+00 |
| $X^{**}4 * Y^{**}2$ | −7.6025E−07 | 1.9347E−08 | 1.0228E−09 |
| $X^{**}3 * Y^{**}3$ | 0.0000E+00 | 0.0000E+00 | 0.0000E+00 |
| $X^{**}2 * Y^{**}4$ | −4.1987E−07 | 3.0593E−09 | 8.0796E−09 |
| $X * Y^{**}5$ | 0.0000E+00 | 0.0000E+00 | 0.0000E+00 |
| $Y^{**}6$ | −1.5297E−07 | −1.3543E−10 | 1.4515E−10 |
| $X^{**}7$ | 0.0000E+00 | 0.0000E+00 | 0.0000E+00 |
| $X^{**}6 * Y$ | −7.1286E−09 | 9.0594E−10 | −1.5908E−12 |
| $X^{**}5 * Y^{**}2$ | 0.0000E+00 | 0.0000E+00 | 0.0000E+00 |
| $X^{**}4 * Y^{**}3$ | −1.5597E−08 | −1.0348E−09 | 1.1618E−10 |
| $X^{**}3 * Y^{**}4$ | 0.0000E+00 | 0.0000E+00 | 0.0000E+00 |
| $X^{**}2 * Y^{**}5$ | −1.4393E−09 | 4.9343E−11 | 0.0000E+00 |
| $X * Y^{**}6$ | 0.0000E+00 | 0.0000E+00 | 0.0000E+00 |
| $Y^{**}7$ | 6.7106E−10 | 1.0754E−11 | 0.0000E+00 |
| $X^{**}8$ | 2.8747E−10 | −1.7991E−10 | 0.0000E+00 |
| $X^{**}7 * Y$ | 0.0000E+00 | 0.0000E+00 | 0.0000E+00 |
| $X^{**}6 * Y^{**}2$ | 7.7759E−10 | 5.7596E−12 | 0.00008+00 |
| $X^{**}5 * Y^{**}3$ | 0.0000E+00 | 0.0000E+00 | 0.0000E+00 |
| $X^{**}4 * Y^{**}4$ | 6.6699E−10 | 2.3734E−11 | 0.0000E+00 |
| $X^{**}3 * Y^{**}5$ | 0.0000E+00 | 0.0000E+00 | 0.0000E+00 |
| $X^{**}2 * Y^{**}6$ | 3.0014E−10 | −8.6300E−12 | 0.0000E+00 |
| $X * Y^{**}7$ | 0.0000E+00 | 0.0000E+00 | 0.0000E+00 |
| $X^{**}8$ | 9.4282E−11 | 5.5794E−14 | 0.0000E+00 |
| $X^{**}9$ | 0.0000E+00 | 0.0000E+00 | 0.0000E+00 |
| $X^{**}8 * Y$ | 0.0000E+00 | 7.0212E−13 | 0.0000E+00 |
| $X^{**}7 * Y^{**}2$ | 0.0000E+00 | 0.0000E+00 | 0.0000E+00 |
| $X^{**}6 * Y^{**}3$ | 0.0000E+00 | 1.1197E−12 | 0.0000E+00 |
| $X^{**}5 * Y^{**}4$ | 0.0000E+00 | 0.0000E+00 | 0.0000E+00 |
| $X^{**}4 * Y^{**}5$ | 0.0000E+00 | −3.8515E+13 | 0.0000E+00 |
| $X^{**}3 * Y^{**}6$ | 0.0000E+00 | 0.0000E+00 | 0.0000E+00 |
| $X^{**}2 * Y^{**}7$ | 0.0000E+00 | 1.7608E−13 | 0.0000E+00 |
| $X * Y^{**}8$ | 0.0000E+00 | 0.0000E+00 | 0.0000E+00 |
| $Y^{**}9$ | 0.0000E+00 | −6.4324E−16 | 0.0000E+00 |
| $X^{**}10$ | 0.0000E+00 | −5.8693E−14 | 0.0000E+00 |
| $X^{**}9 * Y$ | 0.0000E+00 | 0.0000E+00 | 0.0000E+00 |
| $X^{**}8 * Y^{**}2$ | 0.0000E+00 | 4.7781E−14 | 0.0000E+00 |
| $X^{**}7 * Y^{**}3$ | 0.0000E+00 | 0.0000E+00 | 0.0000E+00 |
| $X^{**}6 * Y^{**}4$ | 0.0000E+00 | −2.2445E−14 | 0.0000E+00 |
| $X^{**}5 * Y^{**}5$ | 0.0000E+00 | 0.0000E+00 | 0.0000E+00 |
| $X^{**}4 * Y^{**}6$ | 0.0000E+00 | 3.2578E−15 | 0.0000E+00 |
| $X^{**}3 * Y^{**}7$ | 0.0000E+00 | 0.0000E+00 | 0.0000E+00 |
| $X^{**}2 * Y^{**}8$ | 0.0000E+00 | −1.1615E−15 | 0.0000E+00 |
| $X * Y^{**}9$ | 0.0000E+00 | 0.0000E+00 | 0.0000E+00 |
| $Y^{**}10$ | 0.0000E+00 | −2.7341E−18 | 0.0000E+00 |

TABLE 24

Coordinate origin positions of each of optical surfaces with respect to those of first transmission surface

| | | X | Y | Z | α | β | γ |
|---|---|---|---|---|---|---|---|
| 27 | 1ST TRANS. SURF. | 0.000 | 0.000 | 0.000 | 0.000 | 0.000 | 0.000 |
| 28 | 1ST REF. SURF. | 0.000 | −47.380 | −30.763 | −48.770 | 0.000 | 0.000 |
| 29 | 2ND REF. SURF. | 0.000 | 19.660 | 16.327 | −46.150 | 0.000 | 0.000 |
| 30 | 2ND TRANS. SURF. | 0.000 | 8.782 | 24.586 | −8.240 | 0.000 | 0.000 |

Numerical Example 7

Regarding the optical system of Numerical Example 7 (corresponding to Example 7), Table 25 shows lens data, Table 26 shows aspherical surface shape data of the lenses, and Table 27 shows free-form surface shape data of the prism. Table 28 shows coordinate origin positions of each of optical surfaces with respect to those of first transmission surface.

TABLE 25

Lens data

| SURF. | NO. | | RAD. OF CURVTURE | SURFACE INTERVAL | MATERIAL Nd | vd |
|---|---|---|---|---|---|---|
| REDUC. SIDE (IMG. FORM. ELEMENT) | 1 | | | 0.000 | | |
| PA | 2 | | | 25.900 | 1.51680 | 64.20 |
| | 3 | | | 17.103 | | |
| L1 | 4 | ASPHERE | 23.930 | 11.520 | 1.65800 | 36.87 |
| | 5 | ASPHERE | 173.550 | 1.250 | | |
| L2 | 6 | | 23.741 | 1.000 | 2.00100 | 29.13 |
| L3 | 7 | | 14.400 | 11.000 | 1.49700 | 81.61 |
| L4 | 8 | | −32.652 | 1.400 | 2.00069 | 25.46 |
| | 9 | | −559.196 | 9.990 | | |
| L5 | 10 | | −312.402 | 1.000 | 2.00100 | 29.13 |
| L6 | 11 | | 34.837 | 4.100 | 1.61800 | 63.39 |
| | 12 | | −70.875 | 20.300 | | |
| STOP ST | 13 | | | 4.500 | | |
| L7 | 14 | | 827.441 | 3.900 | 1.80809 | 22.76 |
| | 15 | | −51.369 | variable | | |
| L8 | 16 | | −34.395 | 1.500 | 1.72916 | 54.67 |
| L9 | 17 | | −159.343 | 4.100 | 1.94595 | 17.98 |
| | 18 | | −90.401 | 0.400 | | |
| L10 | 19 | | 60.646 | 10.900 | 1.54814 | 45.82 |
| | 20 | | −118.434 | 0.300 | | |

TABLE 25-continued

| Lens data | | | | | | | |
|---|---|---|---|---|---|---|---|
| L11 | 21 | | | 48.595 | 14.480 | 1.49700 | 81.61 |
| L12 | 22 | | | −65.058 | 2.000 | 1.94599 | 17.98 |
| | 23 | | | 122.588 | variable | | |
| L13 | 24 | ASPHERE | | 467.714 | 7.980 | 1.92286 | 20.88 |
| | 25 | ASPHERE | | 126.596 | variable | | |
| L14 | 26 | ASPHERE | | −964.988 | 6.600 | 1.61035 | 57.93 |
| | 27 | ASPHERE | | −178.108 | 9.370 | | |
| T1 | 28 | FREE-FORM | | 42.265 | −24.290 | 1.53996 | 59.46 |
| R1 | 29 | FREE-FORM | REF. SURF. | −71.074 | −33.373 | 1.53996 | 59.46 |
| T2 | 30 | FREE-FORM | | 45.666 | variable | | |
| MAG. SIDE (SCREEN) | 31 | | | | | | |

| ECCENTRICITY DATA | | | | | | |
|---|---|---|---|---|---|---|
| SURF. NO. | X | Y | Z | α | β | γ |
| 1 | 0.000 | −1.300 | 0.000 | 0.000 | 0.000 | 0.000 |
| 2 | 0.000 | 0.000 | 0.000 | 0.000 | 0.000 | 0.000 |
| 3 | 0.000 | 0.000 | 0.000 | 0.000 | .0.000 | 0.000 |
| 4 | 0.000 | 0.000 | 0.000 | 0.000 | 0.000 | 0.000 |
| 5 | 0.000 | 0.000 | 0.000 | 0.000 | 0.000 | 0.000 |
| 6 | 0.000 | 0.000 | 0.000 | 0.000 | 0.000 | 0.000 |
| 7 | 0.000 | 0.000 | 0.000 | 0.000 | 0.000 | 0.000 |
| 8 | 0.000 | 0.000 | 0.000 | 0.000 | 0.000 | 0.000 |
| 9 | 0.000 | 0.000 | 0.000 | 0.000 | 0.000 | 0.000 |
| 10 | 0.000 | 0.000 | 0.000 | 0.000 | 0.000 | 0.000 |
| 11 | 0.000 | 0.000 | 0.000 | 0.000 | 0.000 | 0.000 |
| 12 | 0.000 | 0.000 | 0.000 | 0.000 | 0.000 | 0.000 |
| 13 | 0.000 | 0.000 | 0.000 | 0.000 | 0.000 | 0.000 |
| 14 | 0.000 | 0.000 | 0.000 | 0.000 | 0.000 | 0.000 |
| 15 | 0.000 | 0.000 | 0.000 | 0.000 | 0.000 | 0.000 |
| 16 | 0.000 | 0.000 | 0.000 | 0.000 | 0.000 | 0.000 |
| 17 | 0.000 | 0.000 | 0.000 | 0.000 | 0.000 | 0.000 |
| 18 | 0.000 | 0.000 | 0.000 | 0.000 | 0.000 | 0.000 |
| 19 | 0.000 | 0.000 | 0.000 | 0.000 | 0.000 | 0.000 |
| 20 | 0.000 | 0.000 | 0.000 | 0.000 | 0.000 | 0.000 |
| 21 | 0.000 | 0.000 | 0.000 | 0.000 | 0.000 | 0.000 |
| 22 | 0.000 | 0.000 | 0.000 | 0.000 | 0.000 | 0.000 |
| 23 | 0.000 | 0.000 | 0.000 | 0.000 | 0.000 | 0.000 |
| 24 | 0.000 | 0.000 | 0.000 | 0.000 | 0.000 | 0.000 |
| 25 | 0.000 | 0.000 | 0.000 | 0.000 | 0.000 | 0.000 |
| 26 | 0.000 | 0.000 | 0.000 | 0.000 | 0.000 | 0.000 |
| 27 | 0.000 | 0.000 | 0.000 | 0.000 | 0.000 | 0.000 |
| 28 | 0.000 | 0.000 | 0.000 | 0.000 | 0.000 | 0.000 |
| 29 | 0.000 | −77.380 | 0.000 | −23.450 | 0.000 | 0.000 |
| 30 | 0.000 | 101.369 | 0.000 | −13.150 | 0.000 | 0.000 |
| 31 | 0.000 | −388.865 | 0.000 | 36.600 | 0.000 | 0.000 |

| SIZE OF REDUC. SIDE | |
|---|---|
| X | 14.516 |
| Y | 9.072 |
| F-number | 2.500 |
| CONCENTRIC CIRCLE (RADIUS r) | 7.374 |

| DISPLACEMENT | | | |
|---|---|---|---|
| SURF. NO. | 150" | 125" | 100" |
| S15 | 64.61 | 64.32 | 64.15 |
| S23 | 28.48 | 28.70 | 28.70 |
| S25 | 5.10 | 5.17 | 5.34 |
| S30 | −504.00 | −367.00 | −229.70 |

TABLE 26

Aspherical (ASP) shape

| | SURF. NO. | | |
|---|---|---|---|
| | 4 | 5 | 24 |
| Y RAD. OF CURV. | 23.930 | 173.550 | 467.714 |
| CONIC CONST. | −4.7040E−01 | 0.0000E+00 | 0.0000E+00 |
| 4th | 4.3332E−07 | 7.3910E−06 | 1.4181E−05 |
| 6th | −5.2299E−09 | −1.3721E−08 | −1.5031E−08 |
| 8th | 4.0353E−12 | −7.4701E−11 | 1.6141E−11 |
| 10th | −1.1308E−13 | 1.3079E−13 | −1.0558E−14 |
| 12th | −1.9308E−16 | −2.9973E−16 | 1.7820E−18 |
| 14th | 1.5390E−18 | −5.4098E−18 | 1.9746E−21 |
| 16th | −6.2475E−21 | 1.3204E−20 | 8.6988E−25 |
| 18th | 0.0000E+00 | 0.0000E+00 | 0.0000E+00 |

| | SURF. NO. | | |
|---|---|---|---|
| | 25 | 26 | 27 |
| Y RAD. OF CURV. | 126.596 | −964.988 | −178.108 |
| CONIC CONST. | −1.98628E+01 | 0.0000E+00 | 0.0000E+00 |
| 4th | 3.1555E−06 | −1.3757E−07 | 3.4295E−07 |
| 6th | −5.3284E−09 | 1.2908E−09 | 1.6866E−09 |
| 8th | 3.4047E−12 | 3.3829E−12 | 4.6620E−13 |
| 10th | 3.1724E−15 | 3.2851E−15 | −2.9710E−16 |
| 12th | −6.7184E−18 | −4.9206E−19 | 3.8858E−18 |
| 14th | 7.3850E−21 | −5.4858E−22 | 2.3066E−21 |
| 16th | 1.0627E−24 | 2.9560E−24 | −7.4248E−25 |
| 18th | 0.0000E+00 | −7.6209E−28 | −7.0748E−27 |

TABLE 27

Free-form surface (FFS) shape

| | SURFACE NO. | | |
|---|---|---|---|
| | 28 | 29 | 30 |
| Y RAD. OF CURV. | 42.269 | −71.074 | 45.666 |
| CONIC CONST. | 0.0000E+00 | −5.9100E−01 | 0.0000E+00 |
| X | 0.0000E+00 | 0.0000E+00 | 0.0000E+00 |
| Y | 0.0000E+00 | 0.0000E+00 | 0.0000E+00 |
| X**2 | −2.3186E−02 | 3.4878E−03 | −8.0092E−04 |
| X * Y | 0.0000E+00 | 0.0000E+00 | 0.0000E+00 |
| Y**2 | −1.6771E−02 | 1.6168E−02 | 3.2245E−04 |
| X**3 | 0.0000E+00 | 0.0000E+00 | 0.0000E+00 |
| X**2 * Y | −2.7465E−04 | −1.5428E−05 | 3.9531E−05 |
| X Y**2 | 0.0000E+00 | 0.0000E+00 | 0.0000E+00 |
| Y**3 | 2.2596E−04 | −2.0327E−04 | 6.7716E−05 |
| X**4 | 6.2496E−05 | −8.5092E−07 | −2.1511E−08 |
| X**3 * Y | 0.0000E+00 | 0.0000E+00 | 0.0000E+00 |
| X**2 * Y**2 | 1.4612E−05 | −3.9454E−06 | 1.5553E−06 |
| X * Y**3 | 0.0000E+00 | 0.0000E+00 | 0.0000E+00 |
| Y**4 | 8.4165E−06 | 3.2559E−06 | 8.2897E−07 |
| X**5 | 0.0000E+00 | 0.0000E+00 | 0.0000E+00 |
| X**4 * Y | 3.0153E−06 | −2.5629E−10 | 8.5673E−09 |
| X**3 * Y**2 | 0.0000E+00 | 0.0000E+00 | 0.0000E+00 |
| X**2 * Y**3 | −1.8219E−06 | 4.8325E−08 | −1.4379E−08 |
| X * Y**4 | 0.0000E+00 | 0.0000E+00 | 0.0000E+00 |
| Y**5 | −3.9641E−07 | −2.1893E−08 | 2.2504E−08 |
| X**6 | −2.4234E−07 | −4.4683E−09 | 1.5191E−10 |
| X**5 * Y | 0.0000E+00 | 0.0000E+00 | 0.0000E+00 |
| X**4 * Y**2 | −3.1772E−07 | 1.9646E−09 | 2.7256E−10 |
| X**3 * Y**3 | 0.0000E+00 | 0.0000E+00 | 0.0000E+00 |
| X**2 * Y**4 | −1.0816E−07 | 2.9316E−10 | 6.3586E−10 |
| X * Y**5 | 0.0000E+00 | 0.0000E+00 | 0.0000E+00 |
| X**6 | −1.9963E−08 | −1.4515E−11 | −9.3526E−10 |
| X**7 | 0.0000E+00 | 0.0000E+00 | 0.0000E+00 |
| X**6 * Y | −1.4582E−08 | 5.8345E−11 | 2.1111E−11 |
| X**5 * Y**2 | 0.0000E+00 | 0.0000E+00 | 0.0000E+00 |
| X**4 * Y**3 | −2.3025E−08 | −6.1514E−11 | 7.2089E−11 |
| X**3 * Y**4 | 0.0000E+00 | 0.0000E+00 | 0.0000E+00 |
| X**2 * Y**5 | 5.7390E−09 | 1.3057E−12 | −2.4001E−12 |
| X * Y**6 | 0.0000E+00 | 0.0000E+00 | 0.0000E+00 |
| Y**7 | 9.2275E−10 | 6.4014E−13 | −6.8477E−13 |

TABLE 27-continued

Free-form surface (FFS) shape

| | SURFACE NO. | | |
|---|---|---|---|
| | 28 | 29 | 30 |
| X**8 | 2.2072E−10 | −4.4499E−12 | 5.8417E−16 |
| X**7 * Y | 0.0000E+00 | 0.0000E+00 | 0.0000E+00 |
| X**6 * Y**2 | −3.6973E−10 | 1.9882E−13 | 2.6514E−14 |
| X**5 * Y**3 | 0.0000E+00 | 0.0000E+00 | 0.0000E+00 |
| X**4 * Y**4 | −7.1561E−10 | 9.6946E−13 | 2.2191E−13 |
| X**3 * Y**5 | 0.0000E+00 | 0.0000E+00 | 0.0000E+00 |
| X**2 * Y**6 | 1.5355E−10 | −3.6367E−13 | −2.0545E−14 |
| X * Y**7 | 0.0000E+00 | 0.0000E+00 | 0.0000E+00 |
| Y**8 | 6.7786E−12 | 1.4964E−15 | 8.2991E−14 |
| X**9 | 0.0000E+00 | 0.0000E+00 | 0.0000E+00 |
| X**8 * Y | −9.6096E−13 | 1.0442E−13 | −7.1535E−16 |
| X**7 * Y**2 | 0.0000E+00 | 0.0000E+00 | 0.0000E+00 |
| X**6 * Y**3 | −9.3751E−13 | 2.3303E−14 | −4.0309E−15 |
| X**5 * Y**4 | 0.0000E+00 | 0.0000E+00 | 0.0000E+00 |
| X**4 * Y**5 | 2.3400E−14 | −9.0416E+15 | −3.7781E−15 |
| X**3 * Y**6 | 0.0000E+00 | 0.0000E+00 | 0.0000E+00 |
| X**2 * Y**7 | −2.2620E−14 | 4.4284E−15 | −2.7684E−14 |
| X * Y**8 | 0.0000E+00 | 0.0000E+00 | 0.0000E+00 |
| Y**9 | 3.3707E−15 | −2.1678E−17 | 1.2251E−15 |
| X**10 | 1.7312E−14 | −7.5122E−15 | 1.6482E−17 |
| X**9 * Y | 0.0000E+00 | 0.0000E+00 | 0.0000E+00 |
| X**8 * Y**2 | −1.8995E−13 | 1.4264E−15 | 2.6618E−17 |
| X**7 * Y**3 | 0.0000E+00 | 0.0000E+00 | 0.0000E+00 |
| X**6 * Y**4 | 8.1565E−14 | −5.4659E−16 | −7.0883E−16 |
| X**5 * Y**5 | 0.0000E+00 | 0.0000E+00 | 0.0000E+00 |
| X**4 * Y**6 | −1.9002E−14 | 6.5193E−17 | −3.6114E−16 |
| X**3 * Y**7 | 0.0000E+00 | 0.0000E+00 | 0.0000E+00 |
| X**2 * Y**8 | −1.4307E−15 | −1.5418E−17 | −1.0264E−15 |
| X * Y**9 | 0.0000E+00 | 0.0000E+00 | 0.0000E+00 |
| Y**10 | −1.3015E−15 | −3.0468E−20 | 1.4001E−16 |

TABLE 28

Coordinate origin positions of each of optical surfaces with respect to those of first transmission surface

| | | X | Y | Z | α | β | γ |
|---|---|---|---|---|---|---|---|
| 28 | 1ST TRANS. SURF. | 0.000 | 0.000 | 0.000 | 0.000 | 0.000 | 0.000 |
| 29 | 1ST REF. SURF. | 0.000 | −77.380 | −24.290 | −23.450 | 0.000 | 0.000 |
| 30 | 2ND REF. SURF. | 0.000 | 28.898 | −14.567 | −36.600 | 0.000 | 0.000 |

Numerical Example 8

Regarding the optical system of Numerical Example 8 (corresponding to Example 8), Table 29 shows lens data, and Table 30 shows free-form surface shape data of the prism. Table 31 shows coordinate origin positions of each of optical surfaces with respect to those of first transmission surface. Only regarding Example 8 the lens data show absolute value coordinates with respect to the first surface.

TABLE 29

| | Lens data | | | | |
|---|---|---|---|---|---|
| | SURF. NO. | | RAD. OF CURVTURE | MATERIAL Nd | vd |
| REDUC. SIDE (IMG. FORM. ELEMENT) | 1 | | | | |
| L1 | 2 | SPHERE | 12.287 | 1.65844 | 50.85 |
| | 3 | SPHERE | −25.540 | | |
| L2 | 4 | SPHERE | −6.823 | 1.74330 | 49.22 |
| | 5 | SPHERE | −7.353 | | |
| L3 | 6 | SPHERE | −9.625 | 1.78472 | 25.72 |
| | 7 | SPHERE | −15.319 | | |
| STOP ST | 8 | | | | |
| Q1 | 9 | FREE-FORM | −20.967 | 1.60740 | 27.00 |
| K1 | 10 | FREE-FORM REF. SURF. | −43.333 | 1.60740 | 27.00 |
| K2 | 11 | FREE-FORM REF. SURF. | −908.725 | 1.60740 | 27.00 |
| K3 | 12 | FREE-FORM REF. SURF. | 7214.055 | 1.60740 | 27.00 |
| | 13 | FREE-FORM | −24.928 | | |
| T1 | 14 | FREE-FORM | −18.078 | 1.52996 | 55.84 |
| R1 | 15 | FREE-FORM REF. SURF. | 24.983 | 1.52996 | 55.84 |
| R2 | 16 | FREE-FORM REF. SURF. | 1519.213 | 1.52996 | 55.84 |
| T2 | 17 | FREE-FORM | 21.846 | | |
| MAG. SIDE (SCREEN) | 18 | | | | |

| SURF. NO. | GLOBAL COORDINATE BASED ON FIRST SURFACE | | | | | |
|---|---|---|---|---|---|---|
| | X | Y | Z | α | β | γ |
| 1 | 0.0000 | 0.0000 | 0.0000 | 0.0000 | 0.0000 | 0.0000 |
| 2 | 0.0000 | −0.9803 | 6.8804 | 0.0000 | 0.0000 | 0.0000 |
| 3 | 0.0000 | −0.9803 | 10.0787 | 0.0000 | 0.0000 | 0.0000 |
| 4 | 0.0000 | −0.9803 | 10.7616 | 0.0000 | 0.0000 | 0.0000 |
| 5 | 0.0000 | −0.9803 | 13.8231 | 0.0000 | 0.0000 | 0.0000 |
| 6 | 0.0000 | −0.9803 | 13.9231 | 0.0000 | 0.0000 | 0.0000 |
| 7 | 0.0000 | −0.9803 | 15.1271 | 0.0000 | 0.0000 | 0.0000 |
| 8 | 0.0000 | −0.9803 | 16.1271 | 0.0000 | 0.0000 | 0.0000 |
| 9 | 0.0000 | −0.9803 | 18.1271 | 0.0000 | 0.0000 | 0.0000 |
| 10 | 0.0000 | −0.9803 | 28.0995 | 25.0297 | 0.0000 | 0.0000 |
| 11 | 0.0000 | −12.5083 | 18.4467 | 0.4450 | 0.0000 | 0.0000 |
| 12 | 0.0000 | −23.3907 | 27.8503 | −24.4659 | 0.0000 | 0.0000 |
| 13 | 0.0000 | −24.1872 | 16.6160 | 0.2375 | 0.0000 | 0.0000 |
| 14 | 0.0000 | −27.2329 | 13.6286 | 0.2375 | 0.0000 | 0.0000 |
| 15 | 0.0000 | −53.1386 | 13.0220 | 25.8122 | 0.0000 | 0.0000 |
| 16 | 0.0000 | −52.8304 | 13.6593 | 15.8045 | 0.0000 | 0.0000 |
| 17 | 0.0000 | −12.9535 | −4.6730 | −25.6103 | 0.0000 | 0.0000 |
| 18 | 0.0000 | −73.7791 | −192.6897 | 30.0004 | 0.0000 | 0.0000 |

| SIZE OF REDUC. SIDE | | SIZE OF MAG. SIDE |
|---|---|---|
| X | 6.912 | 50 inches |
| Y | 3.880 | |
| F-number | 2.500 | |
| CONCENTRIC CIRCLE (RADIUS r) | 3.592 | |

TABLE 30

Free-form surface (FFS) shape

| | SURFACE NO. | | |
|---|---|---|---|
| | 9 | 10 | 11 |
| Y RAD. OF CURV. | −20.967 | −43.333 | −908.725 |
| CONIC CONST. | 0.0000E+00 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| X**2 | 2.5338E-03 | −6.9717E-03 | −3.4397E-02 |
| X * Y | 0.0000E+00 | 0.0000E+00 | 0.0000E+00 |
| Y**2 | 2.4814E-03 | −2.1609E-03 | −6.8431E-03 |
| X**3 | 0.0000E+00 | 0.0000E+00 | 0.0000E+00 |
| X**2 * Y | −5.6418E-04 | −3.5034E-05 | 8.4204E-04 |
| X Y**2 | 0.0000E+00 | 0.0000E+00 | 0.0000E+00 |
| Y**3 | −5.3139E-04 | −9.6788E-06 | 3.0342E-04 |
| X**4 | 4.5446E-05 | 6.0947E-06 | 4.9247E-05 |
| X**3 * Y | 0.0000E+00 | 0.0000E+00 | 0.0000E+00 |
| X**2 * Y**2 | 8.0617E-05 | 6.4227E-06 | −4.8427E-05 |
| X * Y**3 | 0.0000E+00 | 0.0000E+00 | 0.0000E+00 |
| Y**4 | 2.6995E-05 | 3.2537E-06 | −3.9760E-06 |
| X**5 | 0.0000E+00 | 0.0000E+00 | 0.0000E+00 |
| X**4 * Y | 0.0000E+00 | 3.3419E-07 | 8.8527E-06 |
| X**3 * Y**2 | 0.0000E+00 | 0.0000E+00 | 0.0000E+00 |
| X**2 * Y**3 | 0.0000E+00 | −3.8864E-08 | −2.7391E-06 |
| X * Y**4 | 0.0000E+00 | 0.0000E+00 | 0.0000E+00 |
| Y**5 | 0.0000E+00 | 2.0063E-07 | 1.7606E-07 |
| X**6 | 0.0000E+00 | 2.9985E-08 | 9.8920E-07 |
| X**5 * Y | 0.0000E+00 | 0.0000E+00 | 0.0000E+00 |
| X**4 * Y**2 | 0.0000E+00 | 1.3137E-07 | 1.3178E-06 |
| X**3 * Y**3 | 0.0000E+00 | 0.0000E+00 | 0.0000E+00 |
| X**2 * Y**4 | 0.0000E+00 | 4.0023E-08 | −3.2412E-07 |
| X * Y**5 | 0.0000E+00 | 0.0000E+00 | 0.0000E+00 |
| Y**6 | 0.0000E+00 | 3.0002E-08 | −7.0897E-08 |
| X**7 | 0.0000E+00 | 0.0000E+00 | 0.0000E+00 |
| X**6 * Y | 0.0000E+00 | −2.2842E-09 | −7.8343E-07 |
| X**5 * Y**2 | 0.0000E+00 | 0.0000E+00 | 0.0000E+00 |
| X**4 * Y**3 | 0.0000E+00 | 1.1316E+08 | −1.5829E-07 |
| X**3 * Y**4 | 0.0000E+00 | 0.0000E+00 | 0.0000E+00 |
| X**2 * Y**5 | 0.0000E+00 | −1.5421E-09 | −3.0587E-08 |
| X * Y**6 | 0.0000E+00 | 0.0000E+00 | 0.0000E+00 |
| Y**7 | 0.0000E+00 | 2.7342E-10 | 1.0688E-08 |
| X**8 | 0.0000E+00 | −2.8114E-10 | −1.1116E-07 |
| X**7 * Y | 0.0000E+00 | 0.0000E+00 | 0.0000E+00 |
| X**6 * Y**2 | 0.0000E+00 | −6.2156E-10 | −1.1414E-07 |
| X**5 * Y**3 | 0.0000E+00 | 0.0000E+00 | 0.0000E+00 |
| X**4 * Y**4 | 0.0000E+00 | 2.1392E-10 | 3.5203E-09 |
| X**3 * Y**5 | 0.0000E+00 | 0.0000E+00 | 0.0000E+00 |
| X**2 * Y**6 | 0.0000E+00 | −3.2857E-10 | 7.6307E-09 |
| X * Y**7 | 0.0000E+00 | 0.0000E+00 | 0.0000E+00 |
| Y**8 | 0.0000E+00 | 2.6756E-11 | 4.8423E-09 |
| Y**9 | 0.0000E+00 | 0.0000E+00 | 0.0000E+00 |
| X**8 * Y | 0.0000E+00 | 5.1324E-11 | 1.5675E-08 |
| X**7 * Y**2 | 0.0000E+00 | 0.0000E+00 | 0.0000E+00 |
| X**6 * Y**3 | 0.0000E+00 | −5.3018E-10 | 5.3280E-10 |
| X**5 * Y**4 | 0.0000E+00 | 0.0000E+00 | 0.0000E+00 |
| X**4 * Y**5 | 0.0000E+00 | −4.7320E-10 | −9.0151E-10 |
| X**3 * Y**6 | 0.0000E+00 | 0.0000E+00 | 0.0000E+00 |
| X**2 * Y**7 | 0.0000E+00 | −5.9996E-11 | 1.1109E-10 |
| X * Y**8 | 0.0000E+00 | 0.0000E+00 | 0.0000E+00 |
| Y**9 | 0.0000E+00 | 1.6689E-11 | 4.0676E-10 |
| X**10 | 0.0000E+00 | 1.3092E-11 | 3.3086E-09 |
| X**9 * Y | 0.0000E+00 | 0.0000E+00 | 0.0000E+00 |
| X**8 * Y**2 | 0.0000E+00 | −8.7819E-12 | 2.1475E-09 |
| X**7 * Y**3 | 0.0000E+00 | 0.0000E+00 | 0.0000E+00 |
| X**6 * Y**4 | 0.0000E+00 | −8.4586E-11 | −2.4283E-10 |
| X**5 * Y**5 | 0.0000E+00 | 0.0000E+00 | 0.0000E+00 |
| X**4 * Y**6 | 0.0000E+00 | −4.8887E-11 | −3.7118E-10 |
| X**3 * Y**7 | 0.0000E+00 | 0.0000E+00 | 0.0000E+00 |
| X**2 * Y**8 | 0.0000E+00 | −6.7579E-12 | −4.8846E-11 |
| X * Y**9 | 0.0000E+00 | 0.0000E+00 | 0.0000E+00 |
| X**10 | 0.0000E+00 | 8.7857E-13 | 1.0070E-11 |

| | SURFACE NO. | | |
|---|---|---|---|
| | 12 | 13 | 14 |
| Y RAD. OF CURV. | 7214.055 | −24.928 | −18.078 |
| CONIC CONST. | 0.0000E+00 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| X**2 | −9.8569E-03 | −5.8939E-03 | −7.6935E-04 |
| X * Y | 0.0000E+00 | 0.0000E+00 | 0.0000E+00 |
| Y**2 | −4.5919E-03 | −1.3863E-02 | −3.0660E-03 |
| X**3 | 0.0000E+00 | 0.0000E+00 | 0.0000E+00 |
| X**2 * Y | 2.1387E-04 | −9.9693E-04 | −8.7147E-04 |
| X Y**2 | 0.0000E+00 | 0.0000E+00 | 0.0000E+00 |
| Y**3 | 2.0417E-04 | 1.3063E-04 | 1.2088E-03 |
| X**4 | −6.9069E-06 | 9.0172E-05 | 1.3722E-04 |
| X**3 * Y | 0.0000E+00 | 0.0000E+00 | 0.0000E+00 |
| X**2 * Y**2 | −5.4022E-05 | −1.1676E-04 | 1.0989E-04 |
| X * Y**3 | 0.0000E+00 | 0.0000E+00 | 0.0000E+00 |
| Y**4 | −1.2158E-05 | −2.2299E-05 | −1.4668E-05 |
| X**5 | 0.0000E+00 | 0.0000E+00 | 0.0000E+00 |
| X**4 * Y | −1.0934E-06 | 8.1899E-07 | 7.9340E-06 |
| X**3 * Y**2 | 0.0000E+00 | 0.0000E+00 | 0.0000E+00 |
| X**2 * Y**3 | −1.0282E-06 | −1.5047E-07 | −1.6871E-05 |
| X * Y**4 | 0.0000E+00 | 0.0000E+00 | 0.0000E+00 |
| Y**5 | 3.1731E-07 | −5.7000E-07 | −5.3054E-05 |
| X**6 | 7.7224E-08 | 1.2112E-08 | −2.6215E-06 |
| X**5 * Y | 0.0000E+00 | 0.0000E+00 | 0.0000E+00 |
| X**4 * Y**2 | −1.0416E-07 | 1.2772E-07 | −2.2403E-06 |
| X**3 * Y**3 | 0.0000E+00 | 0.0000E+00 | 0.0000E+00 |
| X**2 * Y**4 | 9.7467E-08 | −5.4180E-08 | −1.3075E-06 |
| X * Y**5 | 0.0000E+00 | 0.0000E+00 | 0.0000E+00 |
| Y**6 | 1.3412E-08 | 2.8289E-08 | 3.6745E-06 |
| X**7 | 0.0000E+00 | 0.0000E+00 | 0.0000E+00 |
| X**6 * Y | −8.3529E-09 | 1.5822E-08 | −3.3455E-07 |
| X**5 * X**2 | 0.0000E+00 | 0.0000E+00 | 0.0000E+00 |
| X**4 * Y**3 | −3.2469E-08 | −2.6999E-08 | 1.0753E-07 |
| X**3 * Y**4 | 0.0000E+00 | 0.0000E+00 | 0.0000E+00 |
| X**2 * Y**5 | −3.2451E-10 | 1.6082E-08 | −2.1370E-06 |
| X * Y**6 | 0.0000E+00 | 0.0000E+00 | 0.0000E+00 |
| Y**7 | −1.1674E-09 | −5.8004E-11 | 3.5790E-06 |
| X**8 | −2.1359E-09 | −6.4105E-11 | 4.9160E-08 |
| X**7 * Y | 0.0000E+00 | 0.0000E+00 | 0.0000E+00 |
| X**6 * Y**2 | 6.6735E-10 | −9.3155E-10 | 1.4608E-07 |
| X**5 * Y**3 | 0.0000E+00 | 0.0000E+00 | 0.0000E+00 |
| X**4 * Y**4 | −7.5413E-10 | 5.8419E-10 | 1.5787E-07 |
| X**3 * Y**5 | 0.0000E+00 | 0.0000E+00 | 0.0000E+00 |
| X**2 * Y**6 | −8.6805E-11 | −2.0537E-09 | −1.1679E-07 |
| X * Y**7 | 0.0000E+00 | 0.0000E+00 | 0.0000E+00 |
| Y**8 | 8.3085E-11 | −8.3547E-11 | 6.1289E-07 |
| X**9 | 0.0000E+00 | 0.0000E+00 | 0.0000E+00 |
| X**8 * Y | 4.5529E-11 | 2.1522E-10 | 4.9906E-09 |
| X**7 * Y**2 | 0.0000E+00 | 0.0000E+00 | 0.0000E+00 |
| X**6 * Y**3 | 5.6993E-10 | −1.4204E-10 | 1.6507E-10 |
| X**5 * Y**4 | 0.0000E+00 | 0.0000E+00 | 0.0000E+00 |
| X**4 * Y**5 | 1.9949E-10 | 3.9480E-10 | 3.9747E-08 |
| X**3 * Y**6 | 0.0000E+00 | 0.0000E+00 | 0.0000E+00 |
| X**2 * Y**7 | 1.8005E-11 | 2.0986E-10 | 1.1914E-07 |
| X * Y**8 | 0.0000E+00 | 0.0000E+00 | 0.0000E+00 |
| Y**9 | 8.5447E-12 | 2.7615E-11 | 7.0468E-09 |
| X**10 | 1.2480E-11 | −1.0892E-11 | −2.3622E-10 |
| X**9 * Y | 0.0000E+00 | 0.0000E+00 | 0.0000E+00 |
| X**8 * Y**2 | 1.2123E-11 | −4.1006E-11 | −1.3804E-09 |
| X**7 * Y**3 | 0.0000E+00 | 0.0000E+00 | 0.0000E+00 |
| X**6 * Y**4 | 3.4647E-11 | 1.0606E-11 | −2.7567E-09 |
| X**5 * Y**5 | 0.0000E+00 | 0.0000E+00 | 0.0000E+00 |
| X**4 * Y**6 | 5.7723E-12 | −1.1523E-10 | 6.2419E-09 |
| X**3 * Y**7 | 0.0000E+00 | 0.0000E+00 | 0.0000E+00 |
| X**2 * Y**8 | 4.0365E-13 | −1.3529E-11 | 1.2106E-08 |
| X * Y**9 | 0.0000E+00 | 0.0000E+00 | 0.0000E+00 |
| Y**10 | 4.1988E-14 | −4.7376E-12 | −4.5881E-09 |

| | SURFACE NO. | | |
|---|---|---|---|
| | 15 | 16 | 17 |
| Y RAD. OF CURV. | 24.983 | 1519.213 | 21.846 |
| CONIC CONST. | −5.9097E-01 | 0.0000E+00 | 0.0000E+00 |
| X | 0.0000E+00 | 0.0000E+00 | 0.0000E+00 |
| Y | 0.0000E+00 | 0.0000E+00 | 0.0000E+00 |
| X**2 | −1.1501E-02 | 2.9996E-04 | −8.9452E-03 |
| X * Y | 0.0000E+00 | 0.0000E+00 | 0.0000E+00 |
| Y**2 | −4.2118E-02 | −1.2990E-04 | 5.2574E-03 |
| X**3 | 0.0000E+00 | 0.0000E+00 | 0.0000E+00 |

TABLE 30-continued

Free-form surface (FFS) shape

| | | | |
|---|---|---|---|
| $X^{**}2 * Y$ | 2.7320E−04 | 4.5103E−06 | 3.2038E−04 |
| $X Y^{**}2$ | 0.0000E+00 | 0.0000E+00 | 0.0000E+00 |
| $Y^{**}3$ | 1.2022E−03 | 1.6014E−07 | 7.3028E−04 |
| $X^{**}4$ | −2.3434E−05 | −2.5299E−07 | 1.0301E−05 |
| $X^{**}3 * Y$ | 0.0000E+00 | 0.0000E+00 | 0.0000E+00 |
| $X^{**}2 * Y^{**}2$ | −2.7715E−06 | 5.7076E−08 | 2.0908E−05 |
| $X * Y^{**}3$ | 0.0000E+00 | 0.0000E+00 | 0.0000E+00 |
| $Y^{**}4$ | −4.6472E−05 | 5.6311E−09 | −7.9317E−06 |
| $X^{**}5$ | 0.0000E+00 | 0.0000E+00 | 0.0000E+00 |
| $X^{**}4 * Y$ | 5.6118E−07 | −2.9059E−09 | −4.2231E−07 |
| $X^{**}3 * Y^{**}2$ | 0.0000E+00 | 0.0000E+00 | 0.0000E+00 |
| $X^{**}2 * Y^{**}3$ | 4.3914E−07 | 7.5388E−10 | −3.2760E−06 |
| $X * Y^{**}4$ | 0.0000E+00 | 0.0000E+00 | 0.0000E+00 |
| $Y^{**}5$ | 7.5868E−07 | 1.0190E−10 | −4.1124E−06 |
| $X^{**}6$ | −8.2116E−08 | −1.4470E−09 | −3.0198E−08 |
| $X^{**}5 * Y$ | 0.0000E+00 | 0.0000E+00 | 0.0000E+00 |
| $X^{**}4 * Y^{**}2$ | −2.7247E−09 | −3.8903E−11 | −5.6616E−08 |
| $X^{**}3 * Y^{**}3$ | 0.0000E+00 | 0.0000E+00 | 0.0000E+00 |
| $X^{**}2 * Y^{**}4$ | 1.0701E−08 | 7.8086E−12 | 3.8337E−08 |
| $X * Y^{**}5$ | 0.0000E+00 | 0.0000E+00 | 0.0000E+00 |
| $Y^{**}6$ | 6.6657E−10 | 1.2568E−12 | 1.0851E−06 |
| $X^{**}7$ | 0.0000E+00 | 0.0000E+00 | 0.0000E+00 |
| $X^{**}6 * Y$ | −6.9684E−09 | −4.7661E−11 | −1.3969E−10 |
| $X^{**}5 * Y^{**}2$ | 0.0000E+00 | 0.0000E+00 | 0.0000E+00 |
| $X^{**}4 * Y^{**}3$ | −3.3391E−10 | −2.9706E−13 | 1.7224E−08 |
| $X^{**}3 * Y^{**}4$ | 0.0000E+00 | 0.0000E+00 | 0.0000E+00 |
| $X^{**}2 * Y^{**}5$ | 1.4605E−10 | 4.0031E−14 | 7.0880E−08 |
| $X * Y^{**}6$ | 0.0000E+00 | 0.0000E+00 | 0.0000E+00 |
| $X^{**}7$ | −1.5518E−10 | 1.2020E−14 | 2.1898E−08 |
| $X^{**}8$ | 4.0724E−09 | 9.4222E−12 | 3.0032E−11 |
| $X^{**}7 * Y$ | 0.0000E+00 | 0.0000E+00 | 0.0000E+00 |
| $X^{**}6 * Y^{**}2$ | −9.0419E−11 | 3.9729E−13 | 1.3097E−10 |
| $X^{**}5 * Y^{**}3$ | 0.0000E+00 | 0.0000E+00 | 0.0000E+00 |
| $X^{**}4 * Y^{**}4$ | −1.1214E−11 | −1.7745E−14 | 1.3780E−09 |
| $X^{**}3 * Y^{**}5$ | 0.0000E+00 | 0.0000E+00 | 0.0000E+00 |
| $X^{**}2 * Y^{**}6$ | 3.2685E−12 | 4.3640E−16 | −8.5566E−10 |
| $X * Y^{**}7$ | 0.0000E+00 | 0.0000E+00 | 0.0000E+00 |
| $Y^{**}8$ | −1.4740E−12 | −8.2874E−17 | −8.2746E−09 |
| $X^{**}9$ | 0.0000E+00 | 0.0000E+00 | 0.0000E+00 |
| $X^{**}8 * Y$ | −8.2920E−11 | 5.8125E−14 | 3.4344E−12 |
| $X^{**}7 * Y^{**}2$ | 0.0000E+00 | 0.0000E+00 | 0.0000E+00 |
| $X^{**}6 * Y^{**}3$ | 1.1340E−11 | 2.1175E−15 | −1.5743E−11 |
| $X^{**}5 * Y^{**}4$ | 0.0000E+00 | 0.0000E+00 | 0.0000E+00 |
| $X^{**}4 * Y^{**}5$ | −5.4814E−13 | 1.0029E−16 | −1.3209E−11 |
| $X^{**}3 * Y^{**}6$ | 0.0000E+00 | 0.0000E+00 | 0.0000E+00 |
| $X^{**}2 * Y^{**}7$ | 7.0241E−15 | 3.8595E−17 | −3.7367E−10 |
| $X * Y^{**}8$ | 0.0000E+00 | 0.0000E+00 | 0.0000E+00 |
| $Y^{**}9$ | 2.3218E−14 | −6.4330E−18 | −1.5670E−10 |
| $X^{**}10$ | 1.3008E−11 | −3.2988E−14 | 0.0000E+00 |
| $X^{**}9 * Y$ | 0.0000E+00 | 0.0000E+00 | 0.0000E+00 |
| $X^{**}8 * Y^{**}2$ | −8.2002E−12 | 3.1901E−15 | 0.0000E+00 |
| $X^{**}7 * Y^{**}3$ | 0.0000E+00 | 0.0000E+00 | 0.0000E+00 |
| $X^{**}6 * Y^{**}4$ | 1.3387E−12 | −1.5553E−16 | 0.0000E+00 |
| $X^{**}5 * Y^{**}5$ | 0.0000E+00 | 0.0000E+00 | 0.0000E+00 |
| $X^{**}4 * Y^{**}6$ | −1.8850E−13 | −2.9247E−17 | 0.0000E+00 |
| $X^{**}3 * Y^{**}7$ | 0.0000E+00 | 0.0000E+00 | 0.0000E+00 |
| $X^{**}2 * Y^{**}8$ | 8.3387E−16 | −4.6729E−18 | 0.0000E+00 |
| $X * Y^{**}9$ | 0.0000E+00 | 0.0000E+00 | 0.0000E+00 |
| $Y^{**}10$ | 8.2647E−16 | −2.8684E−19 | 0.0000E+00 |

TABLE 31

Coordinate origin positions of each of optical surfaces with respect to those of first transmission surface

| | | X | Y | Z | α | β | γ |
|---|---|---|---|---|---|---|---|
| 15 | 1ST TRANS. SURF. | 0.000 | 0.000 | 0.000 | 0.000 | 0.000 | 0.000 |
| 16 | 1ST REF. SURF. | 0.000 | −25.903 | −0.714 | 25.575 | 0.000 | 0.000 |
| 17 | 2ND REF. SURF. | 0.000 | −25.597 | −0.075 | 15.567 | 0.000 | 0.000 |
| 18 | 2ND TRANS. SURF. | 0.000 | 14.355 | −18.242 | −25.848 | 0.000 | 0.000 |

Tables 31 to 37 below show the corresponding values of the respective conditional expressions (1) to (14) in the respective Numerical Examples 1 to 8.

TABLE 32

INCIDENT AND EXIT ANGLES ON OPTICAL SURFACES OF PRISM (EXPRESSIONS 1 to 4)

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|
| 1ST TRANS. SURF. | REDUC. SIDE | MAX | 14.713 | 14.187 | 14.297 | 20.235 | 9.587 | 4.241 | 9.479 | 28.104 |
| | | MIN | 13.536 | 10.715 | 14.181 | 19.728 | 7.560 | 3.177 | 7.610 | 23.721 |
| | | DIF | 1.178 | 3.471 | 0.116 | 0.506 | 2.027 | 1.064 | 1.869 | 4.383 |
| | MAG. SIDE | MAX | 9.481 | 9.205 | 9.404 | 13.229 | 6.201 | 2.767 | 6.132 | 17.908 |
| | | MIN | 8.731 | 6.971 | 9.329 | 12.906 | 4.895 | 2.073 | 4.927 | 15.223 |
| | | DIFF | 0.750 | 2.235 | 0.075 | 0.323 | 1.306 | 0.694 | 1.205 | 2.684 |
| 1ST REF. SURF. | REDUC. SIDE | MAX | 27.355 | 24.178 | 20.601 | 23.230 | 27.834 | 36.020 | 27.472 | 31.220 |
| | | MIN | 26.958 | 23.592 | 20.583 | 23.112 | 27.212 | 35.432 | 26.819 | 30.646 |
| | | DIFF | 0.397 | 0.586 | 0.018 | 0.119 | 0.622 | 0.588 | 0.653 | 0.574 |
| | MAG. SIDE | MAX | 27.355 | 24.178 | 20.601 | 23.230 | 27.834 | 36.020 | 27.472 | 31.220 |
| | | MIN | 26.958 | 23.592 | 20.583 | 23.112 | 27.212 | 35.432 | 26.819 | 30.646 |
| | | DIFF | 0.397 | 0.586 | 0.018 | 0.119 | 0.622 | 0.588 | 0.653 | 0.574 |
| 2ND REF. SURF. | REDUC. SIDE | MAX | 61.148 | 69.819 | — | — | 61.247 | 62.177 | — | 62.102 |
| | | MIN | 60.715 | 30.365 | | | 60.718 | 28.191 | | 52.426 |
| | | DIFF | 0.433 | 39.454 | | | 0.529 | 33.986 | | 9.676 |
| | MAG. SIDE | MAX | 61.148 | 69.819 | | | 61.247 | 62.177 | | 62.102 |
| | | MIN | 60.715 | 30.365 | | | 60.718 | 28.191 | | 52.426 |
| | | DIFF | 0.433 | 39.454 | | | 0.529 | 33.986 | | 9.676 |
| 2ND TRANS. SURF. | REDUC. SIDE | MAX | 11.106 | 7.798 | 17.525 | 20.472 | 13.968 | 2.770 | 14.433 | 12.961 |
| | | MIN | 10.702 | 7.007 | 17.497 | 20.270 | 13.526 | 1.195 | 13.899 | 3.955 |
| | | DIFF | 0.404 | 0.791 | 0.028 | 0.202 | 0.442 | 1.575 | 0.534 | 9.006 |
| | MAG. SIDE | MAX | 17.279 | 11.998 | 27.070 | 31.910 | 21.850 | 4.246 | 22.601 | 20.097 |
| | | MIN | 16.639 | 10.771 | 27.025 | 31.573 | 21.138 | 1.831 | 21.739 | 6.066 |
| | | DIFF | 0.640 | 1.227 | 0.045 | 0.337 | 0.711 | 2.415 | 0.862 | 14.031 |

TABLE 33

SAG AMOUNT ALONG REFERENCE OPTICAL AXIS A ON EACH OF OPTICAL SURFACES OF PRISM (EXPRESSIONS 5 to 8)

| | | EXAMPLE 1 | EXAMPLE 2 | EXAMPLE 3 | EXAMPLE 4 |
|---|---|---|---|---|---|
| 1ST TRANS. SURF. | MAX | 0.132 | 0.000 | 0.000 | 0.000 |
| | MIN | 0.000 | −0.780 | −0.006 | −0.012 |
| | DIFF | 0.132 | 0.780 | 0.006 | 0.012 |
| | DIFF/r | 0.018 | 0.105 | 0.001 | 0.002 |
| 1ST REF. SURF. | MAX | 0.146 | 0.000 | 0.000 | 0.030 |
| | MIN | 0.000 | −0.840 | −0.006 | −0.010 |
| | DIFF | 0.146 | 0.840 | 0.006 | 0.040 |
| | DIFF/r | 0.020 | 0.113 | 0.001 | 0.007 |
| 2ND REF. SURF. | MAX | plane | 5.088 | — | — |
| | MIN | | 0.000 | | |
| | DIFF | | 5.088 | | |
| | DIFF/r | | 0.685 | | |
| 2ND TRANS. SURF. | MAX | 0.276 | 39.888 | 0.000 | 0.068 |
| | MIN | −0.109 | 0.000 | −0.006 | 0.000 |
| | DIFF | 0.385 | 39.888 | 0.006 | 0.068 |
| | DIFF/r | 0.052 | 5.372 | 0.001 | 0.013 |

| | | EXAMPLE 5 | EXAMPLE 6 | EXAMPLE 7 | EXAMPLE 8 |
|---|---|---|---|---|---|
| 1ST TRANS. SURF. | MAX | 0.034 | 0.000 | 0.028 | 1.003 |
| | MIN | −0.050 | −0.420 | −0.063 | 0.000 |
| | DIFF | 0.083 | 0.420 | 0.091 | 1.003 |
| | DIFF/r | 0.011 | 0.074 | 0.012 | 0.279 |
| 1ST REF. SURF. | MAX | 0.116 | 0.000 | 0.198 | 0.277 |
| | MIN | 0.000 | −0.206 | 0.000 | −0.088 |
| | DIFF | 0.116 | 0.206 | 0.198 | 0.365 |
| | DIFF/r | 0.016 | 0.036 | 0.027 | 0.102 |
| 2ND REF. SURF. | MAX | plane | 3.084 | — | 0.000 |
| | MIN | | 0.000 | | −1.833 |
| | DIFF | | 3.084 | | 1.833 |
| | DIFF/r | | 0.545 | | 0.510 |
| 2ND TRANS. SURF. | MAX | 0.336 | 16.737 | 0.084 | 0.000 |
| | MIN | −0.105 | 0.000 | −0.405 | −4.581 |
| | DIFF | 0.441 | 16.737 | 0.489 | 4.581 |
| | DIFF/r | 0.060 | 2.957 | 0.066 | 1.275 |

TABLE 34

OPTICAL PATH LENGTH INSIDE PRISM (EXPRESSIONS 9 to 10)

| | | EXAMPLE 1 | EXAMPLE 2 | EXAMPLE 3 | EXAMPLE 1 |
|---|---|---|---|---|---|
| WHOLE PRISM | MAX | 84.131 | 119.762 | 48.843 | 50.991 |
| | MIN | 84.055 | 119.156 | 48.840 | 50.922 |
| | DIFF | 0.075 | 0.606 | 0.002 | 0.069 |
| | DIFF/r | 0.010 | 0.082 | 0.000 | 0.013 |
| | MAX OPT. PATH LEN./r | 11.352 | 16.130 | 9.066 | 9.465 |

| | | EXAMPLE 5 | EXAMPLE 6 | EXAMPLE 7 | EXAMPLE 8 |
|---|---|---|---|---|---|
| WHOLE PRISM | MAX | 80.376 | 56.269 | 79.712 | 44.684 |
| | MIN | 80.251 | 55.836 | 79.647 | 42.306 |
| | DIFF | 0.124 | 0.433 | 0.065 | 2.377 |
| | DIFF/r | 0.017 | 0.077 | 0.009 | 0.662 |
| | MAX OPT. PATH LEN./r | 10.901 | 9.943 | 10.811 | 12.438 |

TABLE 35

POSITION OF APERTURE STOP IN 1ST SUB-OPTICAL SYSTEM & LENGTH ALONG PRINCIPAL RAY OPTICAL PATH OF REFERENCE LIGHT RAY REF (EXPRESSION 11)

| | EXAMPLE 1 | EXAMPLE 2 | EXAMPLE 3 | EXAMPLE 4 |
|---|---|---|---|---|
| REDUCTION CONJUGATE POINT to APERTURE STOP | 90.354 | 83.104 | 75.178 | 72.302 |
| APERTURE STOP to SIDE END OF 1ST SUB-OPTICAL SYSTEM | 126.596 | 236.072 | 76.858 | 61.538 |
| RATIO | 0.714 | 0.352 | 0.978 | 1.175 |

| | EXAMPLE 5 | EXAMPLE 6 | EXAMPLE 7 | EXAMPLE 8 |
|---|---|---|---|---|
| REDUCTION CONJUGATE POINT to APERTURE STOP | 104.583 | 85.613 | 104.583 | 9.263 |
| APERTURE STOP to SIDE END OF 1ST SUB-OPTICAL SYSTEM | 154.861 | 113.122 | 154.860 | 52.684 |
| RATIO | 0.675 | 0.757 | 0.675 | 0.176 |

TABLE 36

RAY REFLECTION POSITION ON 1ST REFLECTION SURFACE Y DIFFERENCE OF PRINCIPAL RAY BETWEEN Ref AND XM1 (EXPRESSION 12)

| | EXAMPLE 1 | EXAMPLE 2 | EXAMPLE 3 | EXAMPLE 4 |
|---|---|---|---|---|
| Y COORDINATE OF REFERENCE LIGHT RAY Ref | 88.588 | 95.417 | −2.981 | −3.555 |
| Y COORDINATE OF LIGHT RAY AT X FARTHEST END | 87.472 | 86.795 | −2.115 | −2.368 |
| DIFF | −1.116 | −8.622 | 0.866 | 1.187 |
| r | 7.411 | 7.425 | 5.388 | 5.388 |
| DIFF/r | −0.151 | −1.161 | 0.161 | 0.220 |

| | EXAMPLE 5 | EXAMPLE 6 | EXAMPLE 7 | EXAMPLE 8 |
|---|---|---|---|---|
| Y COORDINATE OF REFERENCE LIGHT RAY Ref | 87.008 | 64.382 | 86.942 | 31.587 |
| Y COORDINATE OF LIGHT RAY AT X FARTHEST END | 85.687 | 61.432 | 85.650 | 30.737 |
| DIFF | −1.322 | −2.950 | −1.292 | −0.850 |
| r | 7.374 | 5.659 | 7.374 | 3.592 |
| DIFF/r | −0.179 | −0.521 | −0.175 | −0.237 |

TABLE 37

ASPECT RATIO OF EFFECTIVE DIAMETER OF EACH OF OPTICAL SURFACES (EXPRESSIONS 13 to 14)

| | | EXAMPLE 1 | EXAMPLE 2 | EXAMPLE 3 | EXAMPLE 4 |
|---|---|---|---|---|---|
| 1ST TRANS. SURF. | X EFF. DIAM. | 26.563 | 36.349 | 22.079 | 25.051 |
| | Y EFF. DIAM. | 14.815 | 16.777 | 13.092 | 14.409 |
| | ASPECT | 1.793 | 2.167 | 1.686 | 1.739 |
| 1ST REF. SURF. | X EFF. DIAM. | 33.026 | 66.032 | 23.821 | 26.126 |
| | Y EFF. DIAM. | 19.583 | 37.107 | 12.221 | 12.953 |
| | ASPECT | 1.686 | 1.780 | 1.949 | 2.017 |

TABLE 37-continued

ASPECT RATIO OF EFFECTIVE DIAMETER OF EACH OF OPTICAL SURFACES (EXPRESSIONS 13 to 14)

| | | | | | |
|---|---|---|---|---|---|
| 2ND REF. SURF. | X EFF. DIAM | 52.276 | 94.935 | — | — |
| | Y EFF. DIAM. | 28.265 | 24.992 | | |
| | ASPECT | 1.849 | 3.799 | | |
| 2ND TRANS. SURF. | X EFF. DIAM. | 79.289 | 109.885 | 21.342 | 23.970 |
| | Y EFF. DIAM. | 33.492 | 35.693 | 12.936 | 14.032 |
| | ASPECT | 2.367 | 3.079 | 1.650 | 1.708 |

| | | EXAMPLE 5 | EXAMPLE 6 | EXAMPLE 7 | EXAMPLE 8 |
|---|---|---|---|---|---|
| 1ST TRANS. SURF. | X EFF. DIAM. | 30.279 | 24.804 | 30.096 | 14.973 |
| | Y EFF. DIAM. | 16.160 | 11.361 | 16.098 | 7.959 |
| | ASPECT | 1.874 | 2.183 | 1.870 | 1.881 |
| 1ST REF. SURF. | X EFF. DIAM. | 35.984 | 26.962 | 35.648 | 15.936 |
| | Y EFF. DIAM. | 20.148 | 14.656 | 19.932 | 8.892 |
| | ASPECT | 1.786 | 1.840 | 1.788 | 1.792 |
| 2ND REF. SURF. | X EFF. DIAM. | 20.148 | 42.915 | — | 26.017 |
| | Y EFF. DIAM. | 24.664 | 8.867 | | 12.153 |
| | ASPECT | 0.817 | 4.840 | | 2.141 |
| 2ND TRANS. SURF. | X EFF. DIAM. | 74.161 | 53.152 | 72.984 | 39.040 |
| | Y EFF. DIAM. | 32.671 | 12.204 | 32.808 | 14.221 |
| | ASPECT | 2.270 | 4.355 | 2.225 | 2.745 |

FIG. 36A to 36H are graphs showing shapes of a rectangular region at the reduction conjugate point and a concentric circle in each of Numerical Examples 1 to 8.

FIG. 37A to 37D and FIG. 38E to 38H are graphs showing cross-sectional shapes and coordinate origins of each of optical surfaces with respect to the coordinate system of the first transmission surface T1 in each of Numerical Examples 1 to 8.

FIG. 39A to 39H are graphs showing distortion shapes at the magnification conjugate point, caused by distortion aberration of the optical system according to each of Numerical Examples 1 to 8. In each of the graphs the size of image at the magnification conjugate point is 148 inches in Example 1, 110 inches in Example 2, 100 inches in Example 3, 100 inches in Example 4, 150 inches in Example 5, 80 inches in Example 6, 150 inches in Example 7, 50 inches in Example 8, respectively. It can be seen from these graphs that the distortion at the magnification conjugate point of the optical system 1 according to Examples 1 to 8 is satisfactorily corrected.

Second Embodiment

Figure 40:
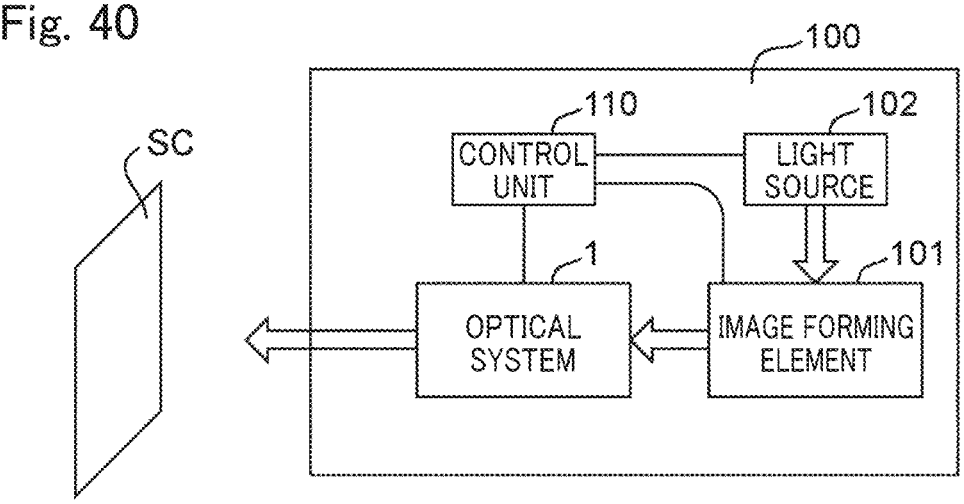
FIG. 40 is a block diagram showing an example of the image projection apparatus according to the present disclosure.

Hereinafter, a second embodiment of the present disclosure is described with reference to FIG. 40. FIG. 40 is a block diagram showing an example of the image projection apparatus according to the present disclosure. The image projection apparatus 100 includes such an optical system 1 as disclosed in First Embodiment, an image forming element 101, a light source 102, a control unit 110, and others. The image forming element 101 is constituted of, for example, liquid crystal or DMD, for generating an image to be projected through the optical system 1 onto a screen SC. The light source 102 is constituted of, for example, light emitting diode (LED) or laser, for supplying light to the image forming element 101. The control unit 110 is constituted of, for example, central processing unit (CPU) or micro-processing unit (MPU), for controlling the entire apparatus and respective components. The optical system 1 may be configured as either an interchangeable lens that can be detachably attached to the image projection apparatus 100 or a built-in lens that is integrated in the image projection apparatus 100.

The image projection apparatus 100 including the optical system according to First Embodiment can realize projection with a shorter focal length and a larger-sized screen.

Third Embodiment

Figure 41:
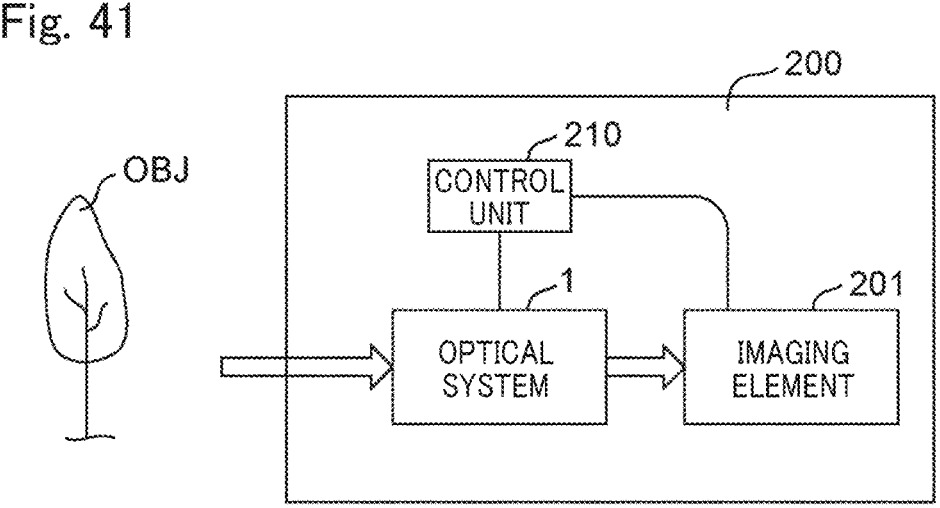
FIG. 41 is a block diagram showing an example of the imaging apparatus according to the present disclosure.

Hereinafter, a third embodiment of the present disclosure is described with reference to FIG. 41. FIG. 41 is a block diagram showing an example of the imaging apparatus according to the present disclosure. The imaging apparatus 200 includes such an optical system 1 as disclosed in First Embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as either an interchangeable lens that can be detachably attached to the imaging apparatus 200 or a built-in lens that is integrated in the imaging apparatus 200.

The imaging apparatus 200 including the optical system according to First Embodiment can realize imaging with a shorter focal length and a larger-sized screen.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

What is claimed:

1. An optical system having a reduction conjugate point on a reduction side and a magnification conjugate point on a magnification side, and internally having an intermediate imaging position that is conjugate with the reduction conjugate point and the magnification conjugate point,
wherein the reduction conjugate point has an image-forming relationship in a rectangular region having a longitudinal direction and a lateral direction,
wherein the optical system includes a first sub-optical system including an aperture stop defining a range in which a light flux can pass through the optical system, and a second sub-optical system provided closer to the magnification side than the first sub-optical system and including a prism formed of a transparent medium,
wherein the prism has a first transmission surface located on the reduction side, a second transmission surface located on the magnification side, and at least one reflection surface located on an optical path between the first transmission surface and the second transmission surface,
wherein the aperture stop is positioned between the reduction conjugate point and the intermediate imaging position,
wherein a portion or whole of an intermediate image formed at the intermediate imaging position is positioned between the first transmission surface and a first reflection surface located closest to the reduction side of the at least one reflection surface,
wherein the first reflection surface has a shape in which a concave surface is oriented in a direction in which light rays made incident on the first reflection surface are reflected,
wherein the first sub-optical system includes a plurality of rotationally symmetric lens elements,
wherein, when an axis passing through at least two centers of the rotationally symmetric lens elements is defined as a reference optical axis, at least one rotationally asymmetric optical surface among the first transmission surface, the second transmission surface, and the at least one reflection surface of the prism is formed such that, in a plane perpendicular to the reference optical axis, a maximum angle θmax and a minimum angle θmin in terms of an angle at which a principal ray of light rays having an image-forming relationship on a concentric circle centered on an intersection of the reference optical axis and a reduction conjugate point of the rectangular region intersects a normal line of the plane at a position where the principal ray is made incident on the rotationally asymmetric optical surface satisfy the following Expression (1):

$$45° > |\theta max| - |\theta min| > 0.014° \quad (1).$$

2. The optical system according to claim 1, wherein the rotationally asymmetric optical surface is the second transmission surface, and the following Expression (2a) is satisfied:

$$17° > |\theta max| - |\theta min| > 0.024° \quad (2a).$$

3. The optical system according to claim 1, wherein the rotationally asymmetric optical surface is the first transmission surface, and the following Expression (3a) is satisfied:

$$5.5° > |\theta max| - |\theta min| > 0.050° \quad (3a).$$

4. The optical system according to claim 1, wherein the rotationally asymmetric optical surface is the first reflection surface, and the following Expression (4a) is satisfied:

$$1.50° > |\theta max| - |\theta min| > 0.100° \quad (4a).$$

5. The optical system according to claim 1, wherein, when a plane including a position where a principal ray passing through the center in the longitudinal direction of the rectangular region is reflected by the first reflection surface is defined as a Y cross-section, and a cross-section including the reference optical axis and perpendicular to the Y cross-section is defined as an X cross-section, a rotationally asymmetric optical surface having a finite radius of curvature among the rotationally asymmetric optical surfaces has a symmetrical shape only with respect to the Y cross-section.

6. The optical system according to claim 1, wherein, when a plane including a position where a principal ray passing through the center in the longitudinal direction of the rectangular region is reflected by the first reflection surface is defined as a Y cross-section, and a cross-section including the reference optical axis and perpendicular to the Y cross-section is defined as an X cross-section,
in the Y cross-section, a plurality of principal rays are included between the position where the principal ray of the reference light ray is reflected by the first reflection surface and the coordinate origin position of the first reflection surface.

7. The optical system according to claim 1, wherein, when a plane including a position where a principal ray passing through the center in the longitudinal direction of the rectangular region is reflected by the first reflection surface is defined as a Y cross-section, and a cross-section including the reference optical axis and perpendicular to the Y cross-section is defined as an X cross-section,
at least two of the rotationally asymmetric optical surfaces are eccentric to each other in the Y cross-section.

8. The optical system according to claim 1, wherein, when a plane including a position where a principal ray passing through the center in the longitudinal direction of the rectangular region is reflected by the first reflection surface is defined as a Y cross-section, and a cross-section including the reference optical axis and perpendicular to the Y cross-section is defined as an X cross-section,
the second transmission surface is disposed on a side opposite to a coordinate origin of the first reflection surface with respect to a principal ray of the reference optical axis in the Y cross-section.

9. The optical system according to claim 1, wherein, when a plane including a position where a principal ray passing through the center in the longitudinal direction of the rectangular region is reflected by the first reflection surface is defined as a Y cross-section, and a cross-section including the reference optical axis and perpendicular to the Y cross-section is defined as an X cross-section,
the coordinate system of the first reflection surface is inclined in a direction along the intermediate image in the Y cross-section.

10. The optical system according to claim 1, wherein at least one coordinate origin of the rotationally asymmetric optical surface is set on the reference optical axis.

11. The optical system according to claim 1, wherein both the first reflection surface and the second transmission surface are disposed such that convex surfaces face the magnification side.

12. The optical system according to claim 1, wherein a plane portion perpendicular to the reference optical axis is provided in a part of the outer peripheral portion of the prism.

13. An image projection apparatus comprising:
the optical system according to claim 1; and
an image forming element that generates an image to be projected through the optical system onto a screen.

14. An imaging apparatus comprising:
the optical system according to claim 1; and
an imaging element that receives an optical image formed by the optical system to convert the optical image into an electrical image signal.

15. An optical system having a reduction conjugate point on a reduction side and a magnification conjugate point on a magnification side, and internally having an intermediate imaging position that is conjugate with the reduction conjugate point and the magnification conjugate point,
wherein the reduction conjugate point has an image-forming relationship in a rectangular region having a longitudinal direction and a lateral direction,
wherein the optical system includes a first sub-optical system including an aperture stop defining a range in which a light flux can pass through the optical system, and a second sub-optical system provided closer to the magnification side than the first sub-optical system and including a prism formed of a transparent medium,
wherein the prism has a first transmission surface located on the reduction side, a second transmission surface located on the magnification side, and at least one reflection surface located on an optical path between the first transmission surface and the second transmission surface,
wherein the aperture stop is positioned between the reduction conjugate point and the intermediate imaging position,
wherein a portion or whole of an intermediate image formed at the intermediate imaging position is positioned between the first transmission surface and a first reflection surface located closest to the reduction side of the at least one reflection surface,
wherein the first reflection surface has a shape in which a concave surface is oriented in a direction in which light rays made incident on the first reflection surface are reflected,
wherein the first sub-optical system includes a plurality of rotationally symmetric lens elements,
wherein, when an axis passing through centers of at least two of the rotationally symmetric lens elements is defined as a reference optical axis, in a plane perpendicular to the reference optical axis, the principal ray of the light rays has an image-forming relationship on a concentric circle centered on an intersection of the reference optical axis and a reduction conjugate point of the rectangular region, and at least one rotationally asymmetric optical surface among the first transmission surface, the second transmission surface, and the at least one reflection surface of the prism satisfies the following Expression (5):

$$10 > \Delta Smax/r > 0.001 \quad (5)$$

where $\Delta Smax$ represents a maximum sag difference of a sag amount measured in a direction along the reference optical axis on the rotationally asymmetric optical surface through which the principal ray passes, and r represents a radius of the concentric circle.

16. The optical system according to claim 15, wherein, when the rotationally asymmetric optical surface through which the principal ray passes is the second transmission surface, the following Expression (6) is satisfied:

$$10 > \Delta Smax/r > 0.001 \quad (6).$$

17. The optical system according to claim 15, wherein, when the rotationally asymmetric optical surface through which the principal ray passes is the first transmission surface, the following Expression (7) is satisfied:

$$3 > \Delta Smax/r > 0.001 \quad (7).$$

18. The optical system according to claim 15, wherein, when the rotationally asymmetric optical surface through which the principal ray passes is the first reflection surface, the following Expression (8a) is satisfied:

$$0.8 > \Delta Smax/r > 0.002 \quad (8a).$$

19. An optical system having a reduction conjugate point on a reduction side and a magnification conjugate point on a magnification side, and internally has an intermediate imaging position that is conjugate with the reduction conjugate point and the magnification conjugate point,
wherein the reduction conjugate point has an image-forming relationship in a rectangular region having a longitudinal direction and a lateral direction,
wherein the optical system includes a first sub-optical system including an aperture stop defining a range in which a light flux can pass through the optical system, and a second sub-optical system provided closer to the magnification side than the first sub-optical system and including a prism formed of a transparent medium,
wherein the prism has a first transmission surface located on the reduction side, a second transmission surface located on the magnification side, and at least one reflection surface located on an optical path between the first transmission surface and the second transmission surface,
wherein the aperture stop is positioned between the reduction conjugate point and the intermediate imaging position,
wherein a portion or whole of an intermediate image formed at the intermediate imaging position is positioned between the first transmission surface and a first reflection surface located closest to the reduction side of the at least one reflection surface,
wherein the first reflection surface has a shape in which a concave surface is oriented in a direction in which light rays made incident on the first reflection surface are reflected,
wherein the first sub-optical system includes a plurality of rotationally symmetric lens elements,
wherein, when an axis passing through centers of at least two of the rotationally symmetric lens elements is defined as a reference optical axis, in a plane perpendicular to the reference optical axis, the principal ray of the light ray has an image-forming relationship on a concentric circle centered on an intersection of the reference optical axis and a reduction conjugate point of the rectangular region, and a maximum optical path length difference $\Delta Lmax$ of an optical path in which the principal ray passes through the inside of the prism satisfies the following Expression (9a) using a radius r of the concentric circle:

$$2.5 > \Delta Lmax/r > 0.002 \quad (9a).$$

20. The optical system according to claim 19, wherein the maximum optical path length Lmax of the optical path in which the principal ray passes through the inside of the prism satisfies the following Expression (10) using the radius r of the concentric circle:

$$30 > Lmax/r > 2 \quad (10).$$

* * * * *